(12) United States Patent
Chen et al.

(10) Patent No.: US 6,680,976 B1
(45) Date of Patent: Jan. 20, 2004

(54) ROBUST, RELIABLE COMPRESSION AND PACKETIZATION SCHEME FOR TRANSMITTING VIDEO

(75) Inventors: Zhigang Chen, Savoy, IL (US); Roy H. Campbell, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/463,686

(22) PCT Filed: Jul. 28, 1998

(86) PCT No.: PCT/US98/15564
§ 371 (c)(1),
(2), (4) Date: May 9, 2000

(87) PCT Pub. No.: WO99/05602
PCT Pub. Date: Feb. 4, 1999

Related U.S. Application Data

(60) Provisional application No. 60/053,871, filed on Jul. 28, 1997.

(51) Int. Cl.[7] .............................. H04N 7/36; H04N 7/64; G06F 13/00

(52) U.S. Cl. ............................. 375/240.26; 375/240.12

(58) Field of Search ................... 348/387.1; 382/332; 375/240.26, 240.12; H04N 7/36, 7/64; G06F 13/00

(56) References Cited

U.S. PATENT DOCUMENTS

| | | | |
|---|---|---|---|
| 5,615,287 A | | 3/1997 | Fu et al. ..................... 382/232 |
| 5,621,794 A | | 4/1997 | Matsuda et al. ............ 380/217 |
| 5,629,736 A | * | 5/1997 | Haskell et al. ........... 348/387.1 |

OTHER PUBLICATIONS

Chen et al., "Real–Time Video and Audio in the World Wide Web", World Wide Web Journal, Issue One, Published by O'Reilly and Associates (Dec. 11, 1995).

* cited by examiner

*Primary Examiner*—Howard Britton
(74) *Attorney, Agent, or Firm*—Woodard, Emhardt, Moriarty, McNett & Henry LLP

(57) ABSTRACT

For transmitting digital video information over a network such as the Internet, a hybrid coding scheme (FIGS. 9–18) with wavelet I frame coding and H.263 predictive coding produces a robust, low bit rate video coding scheme. A new packetization method analyzes macroblock level dependency structure (FIG. 19) and packetizes the bit stream so as to minimize dependencies between packets and thereby minimize packet loss damage.

40 Claims, 41 Drawing Sheets

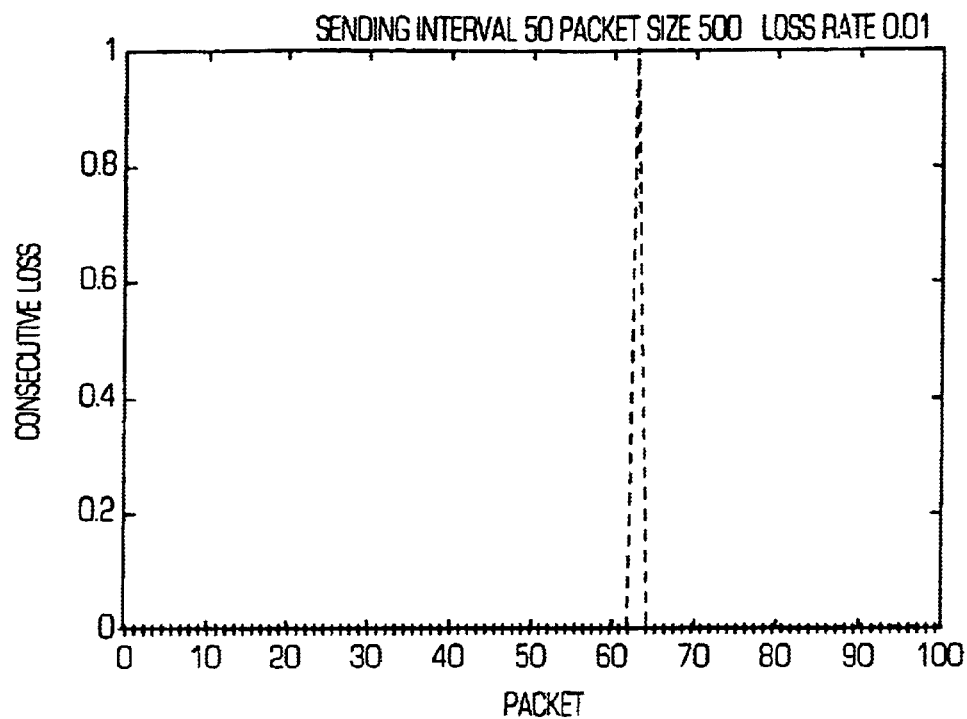
FIG. 7A(1)
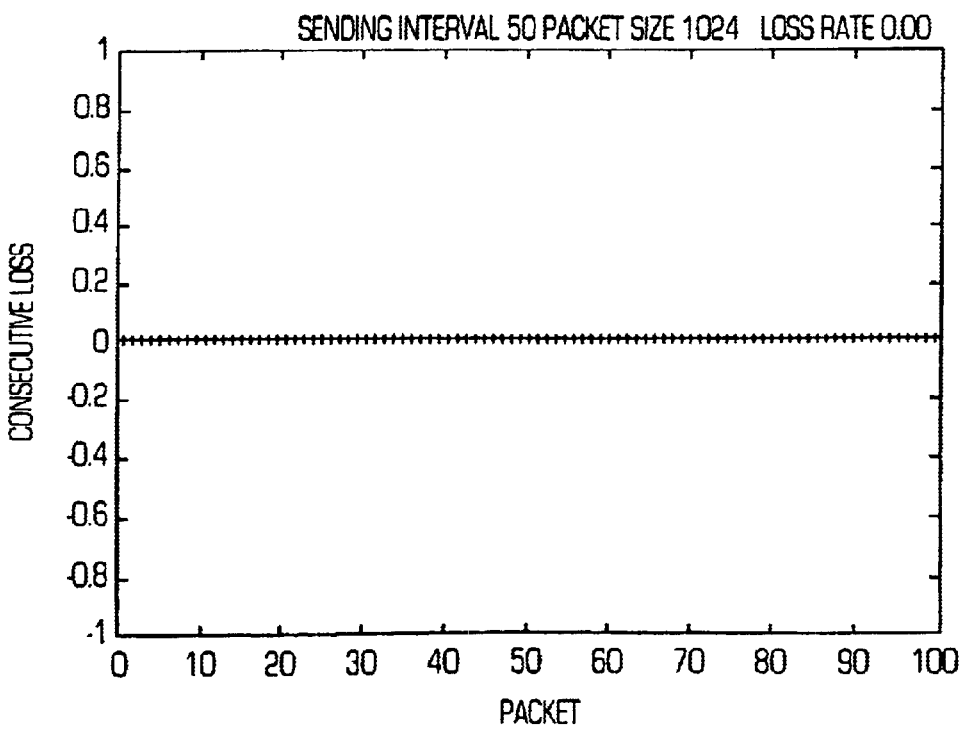
FIG. 7A(2)

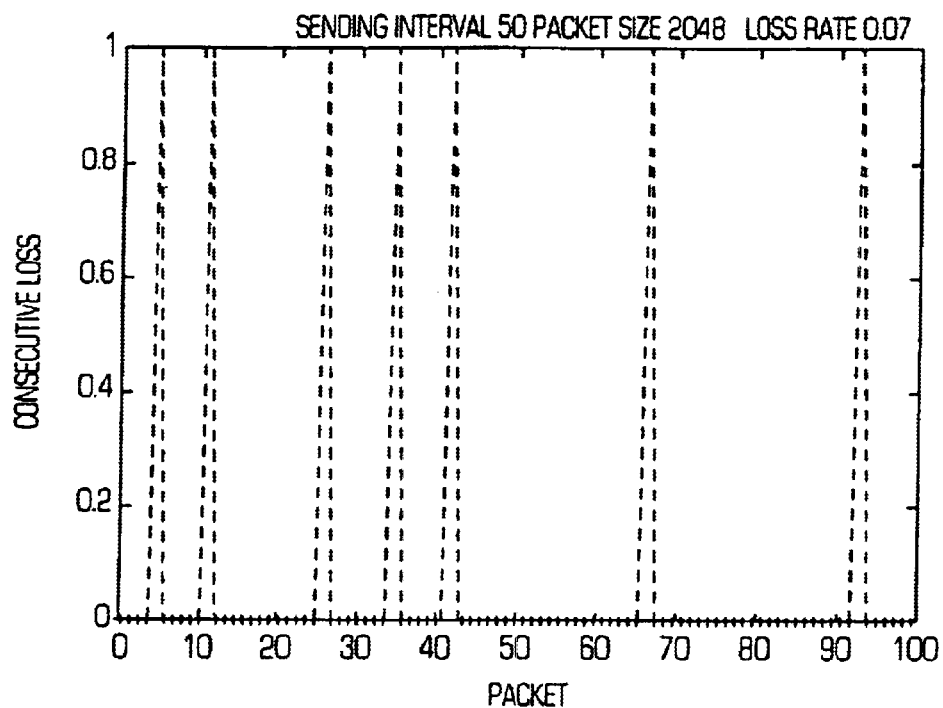
FIG. 7A(3)
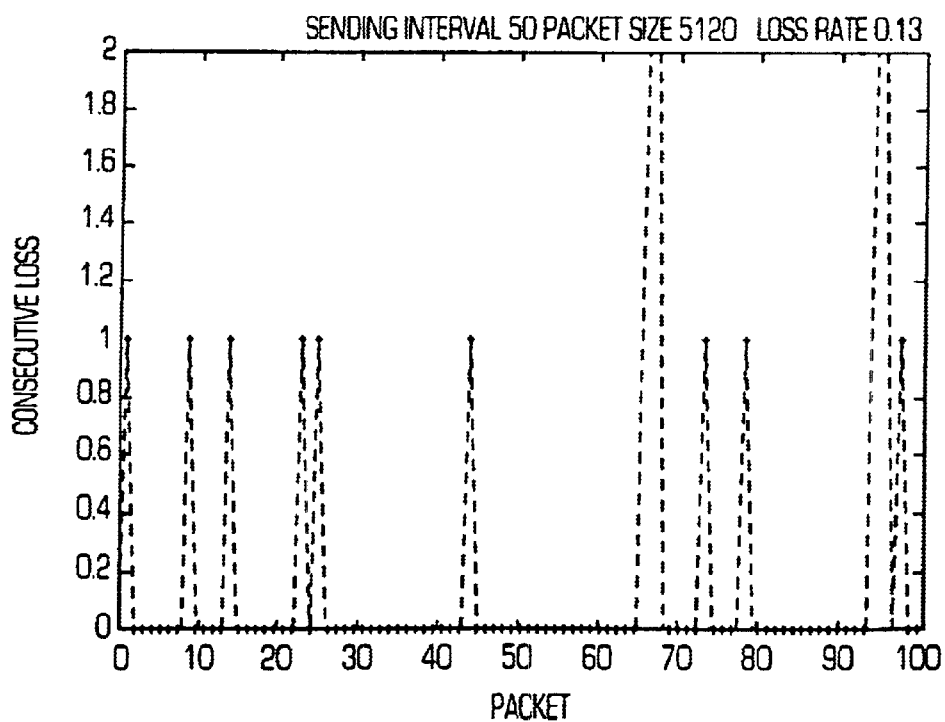
FIG. 7A(4)

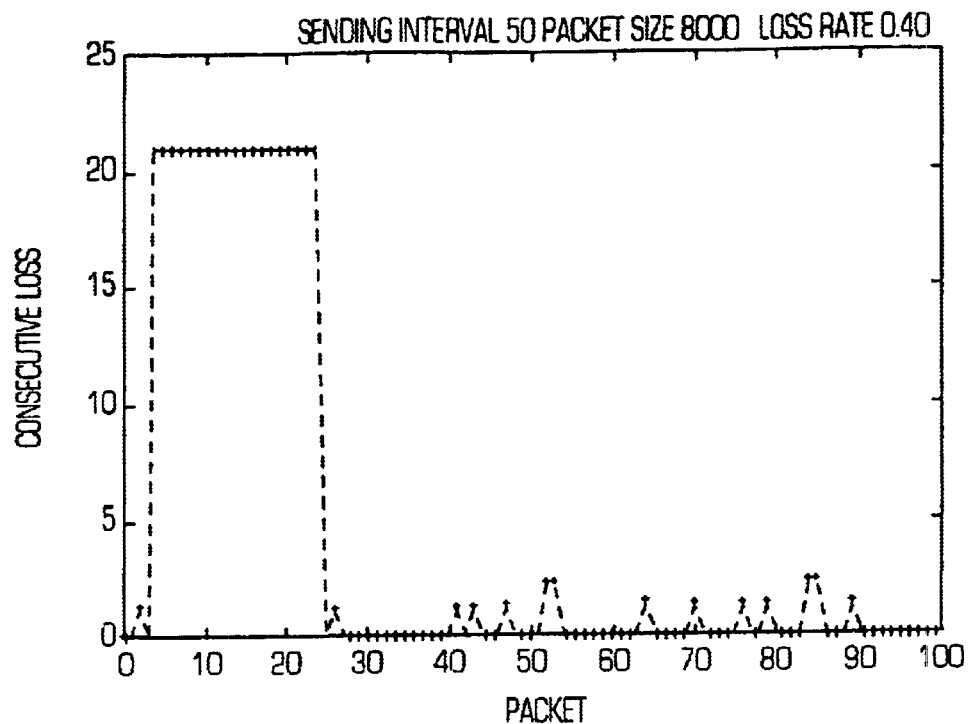
FIG. 7A(5)
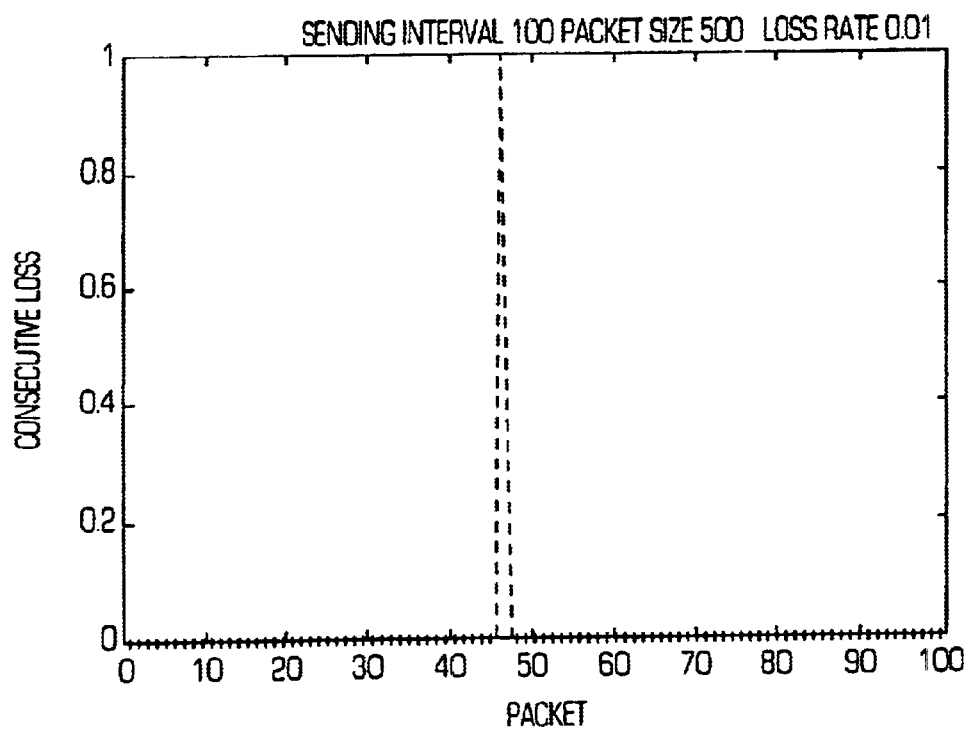
FIG. 7A(6)

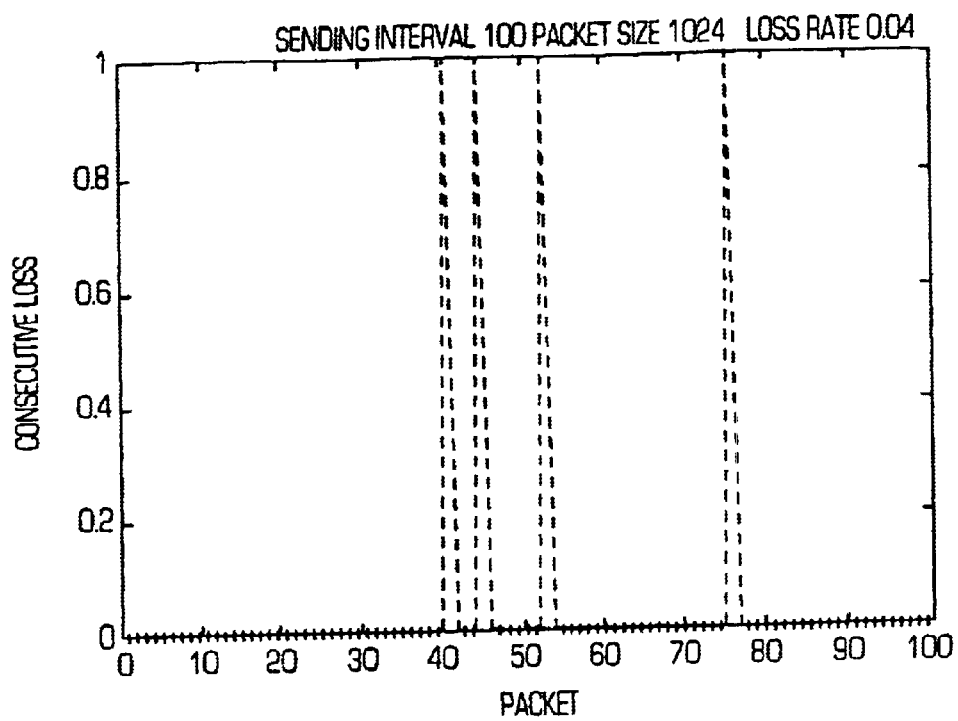
FIG. 7A(7)
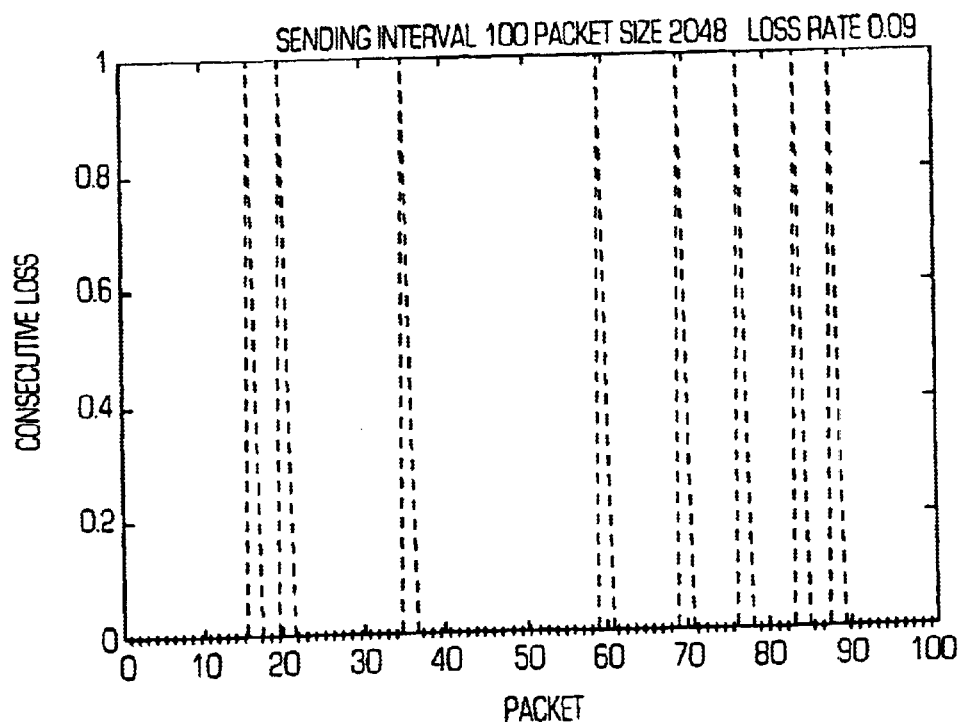
FIG. 7A(8)

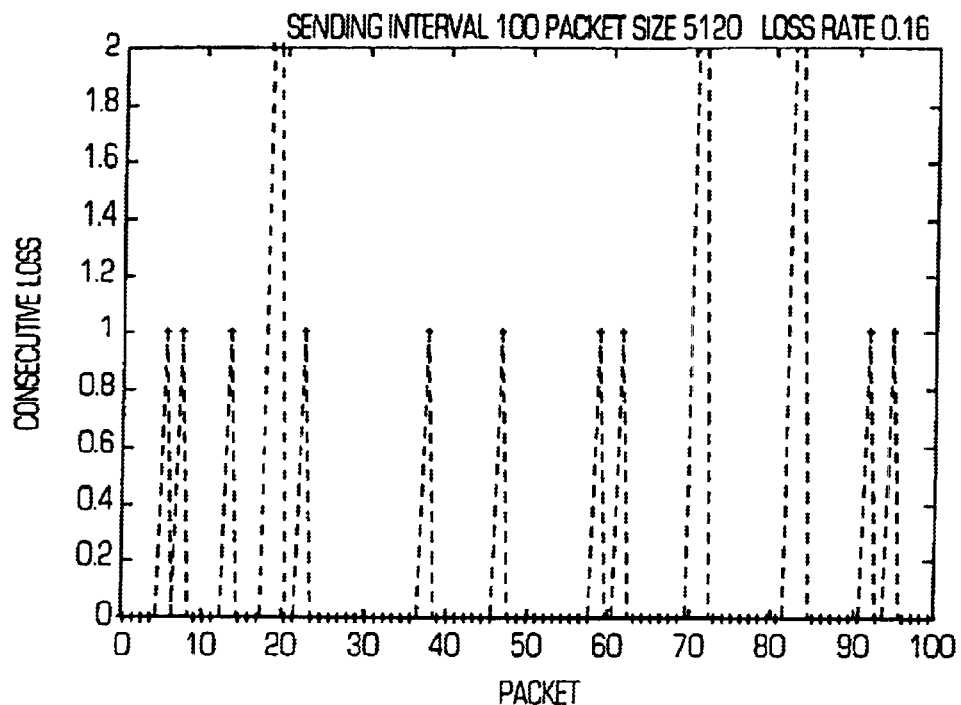
FIG. 7B(1)
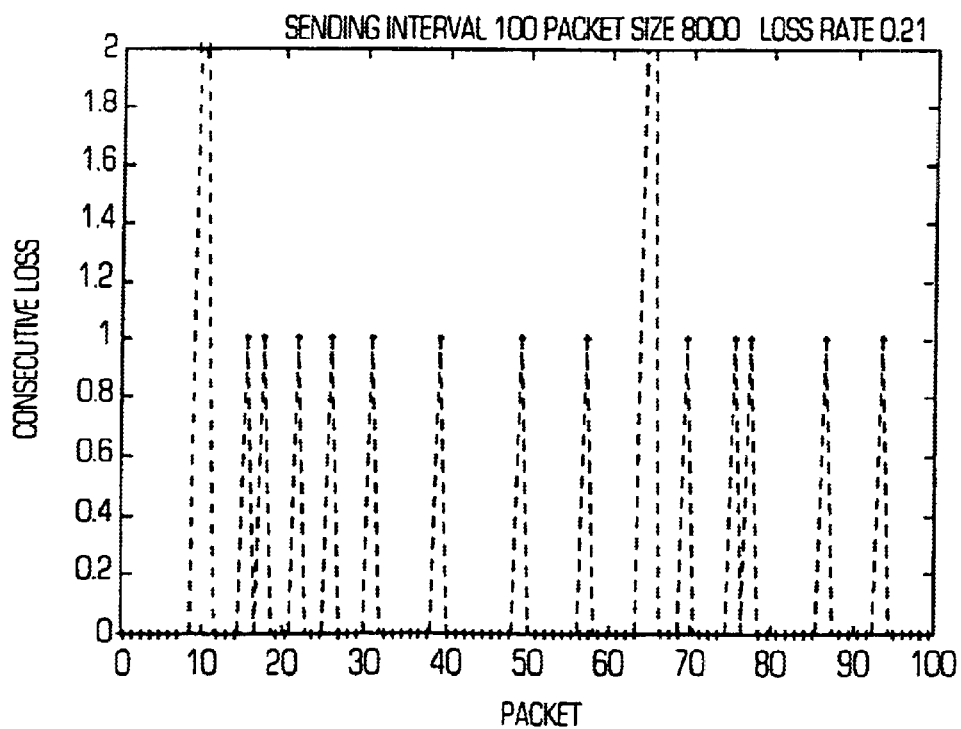
FIG. 7B(2)

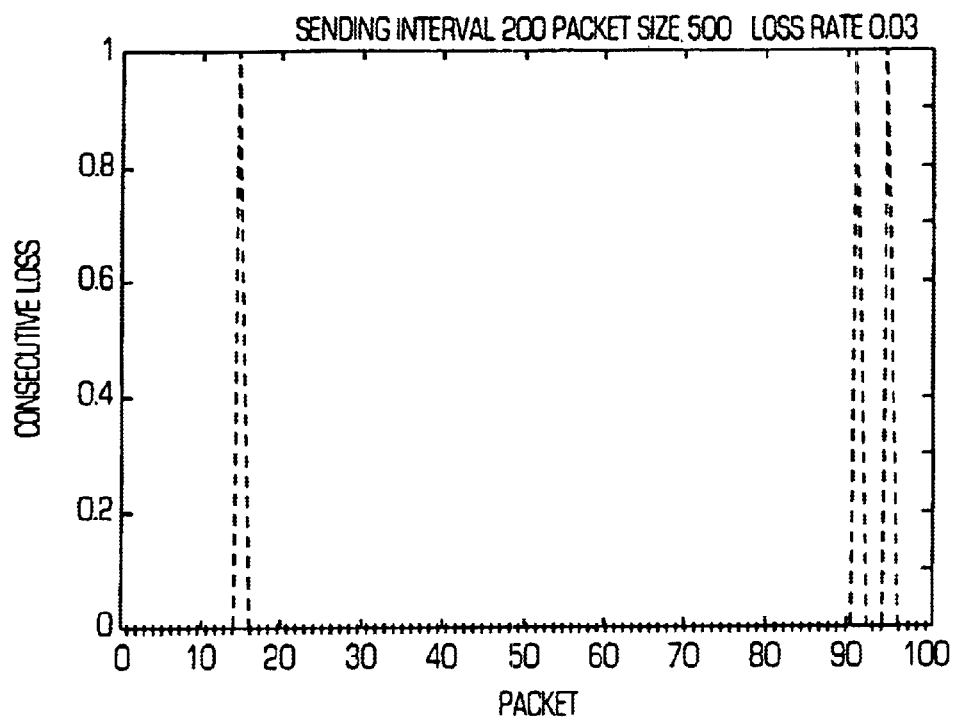
FIG. 7B(3)
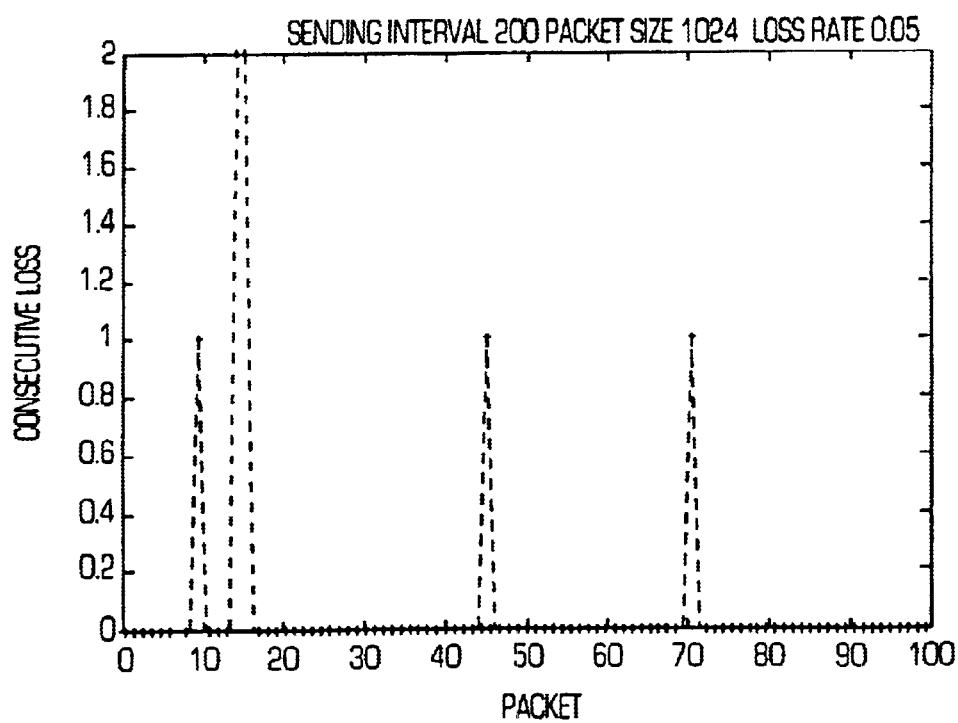
FIG. 7B(4)

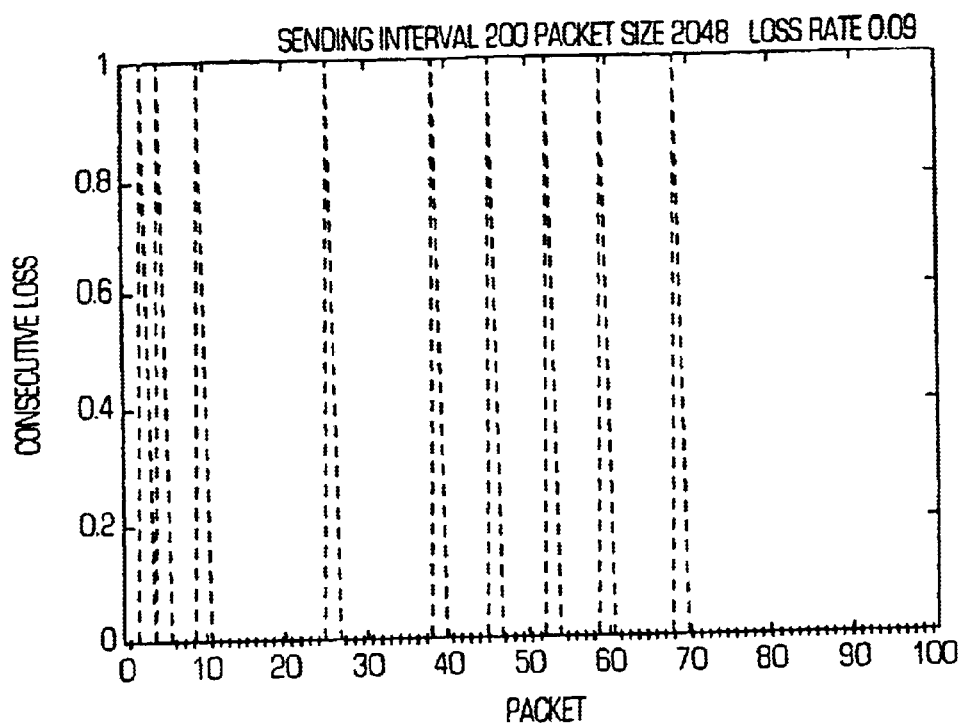
FIG. 7B(5)
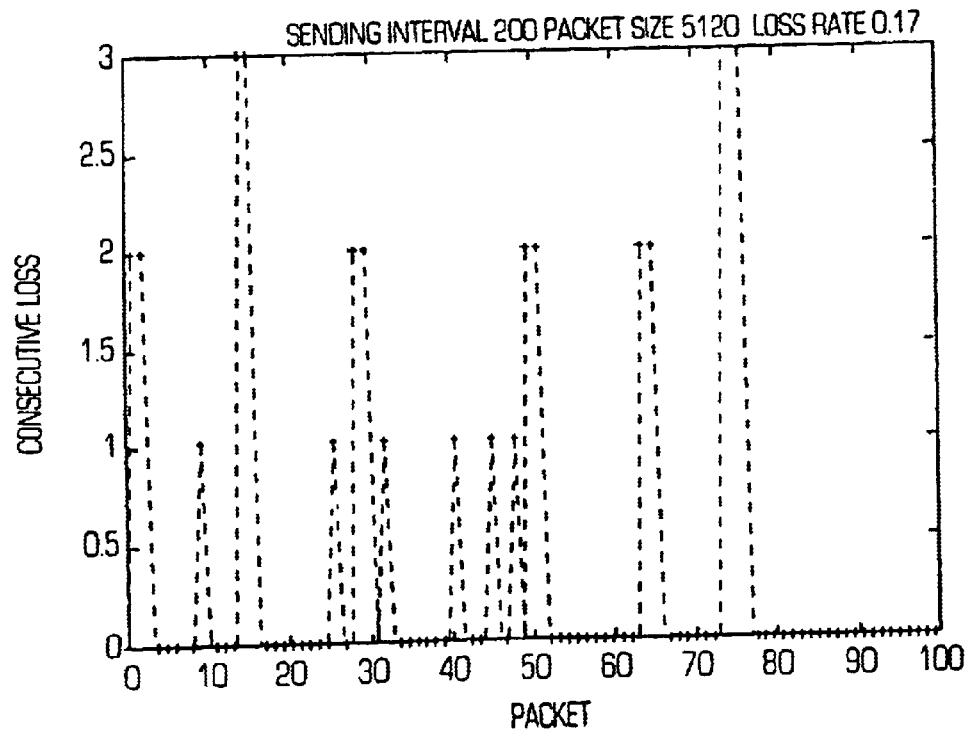
FIG. 7B(6)

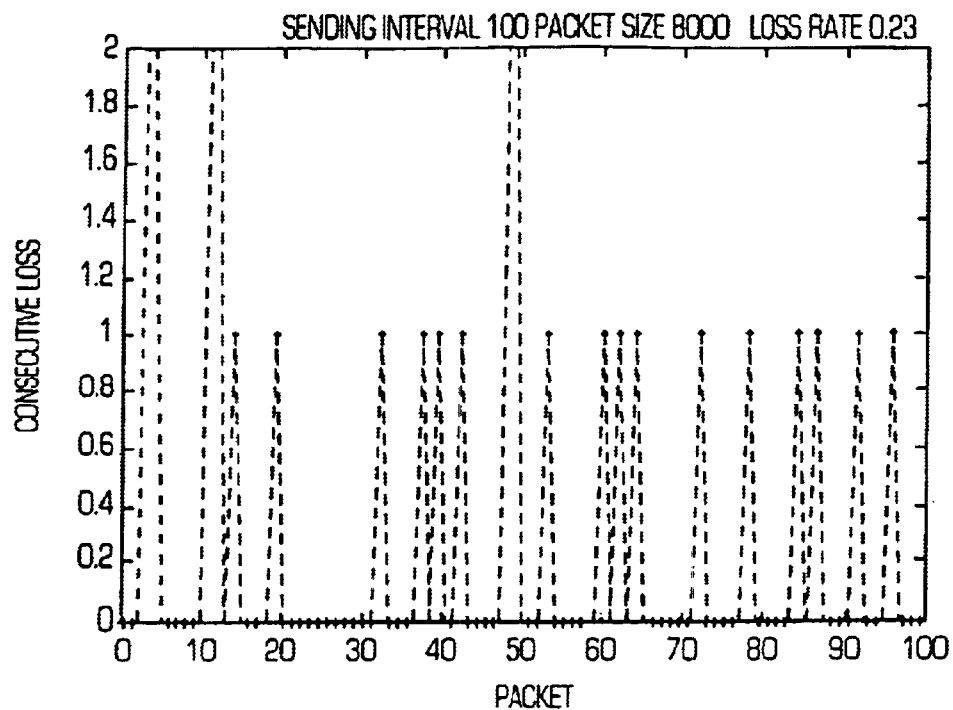
FIG. 7B(7)
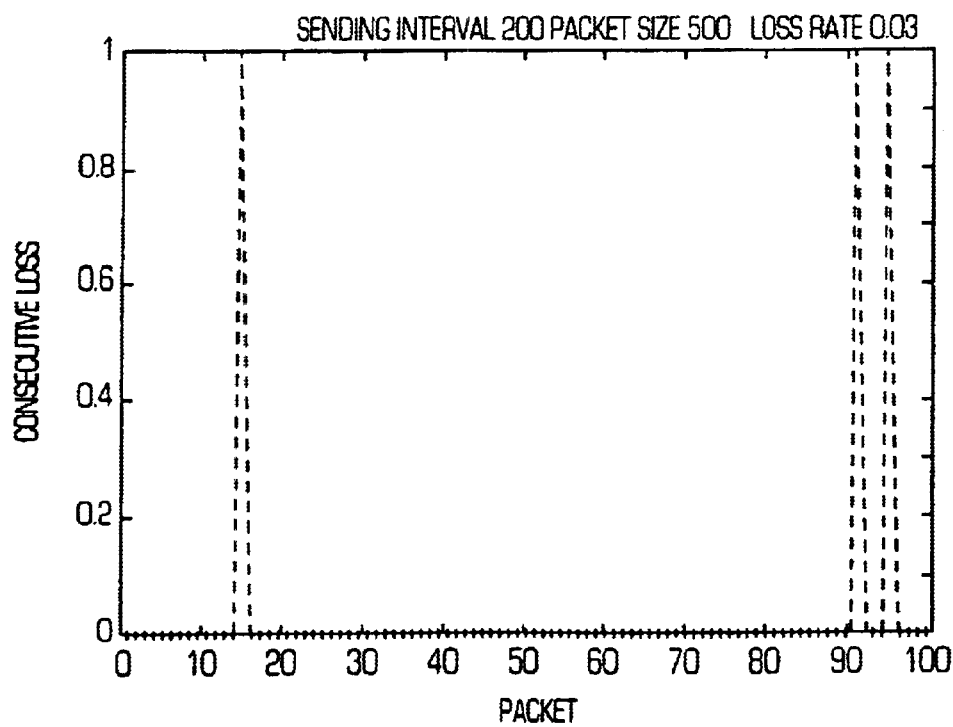
FIG. 7B(8)

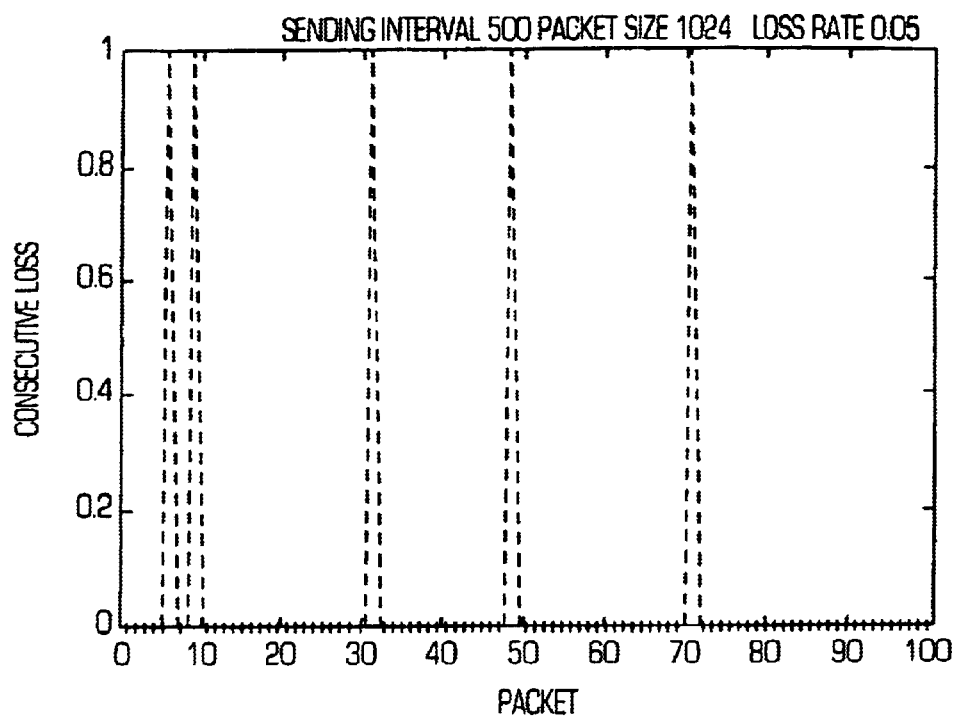
FIG. 7C(1)
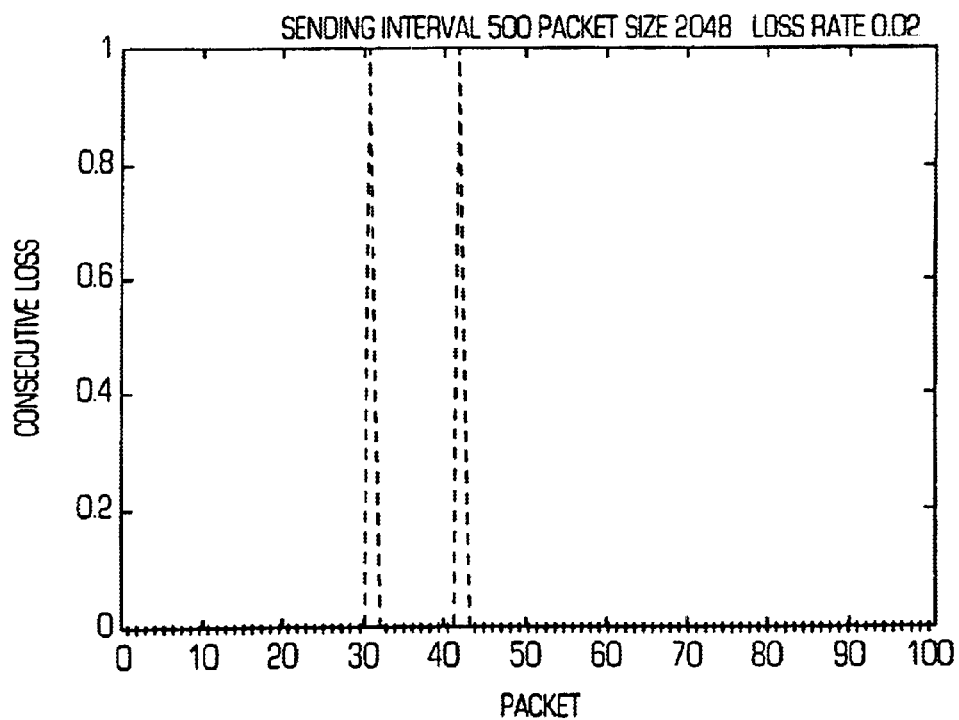
FIG. 7C(2)

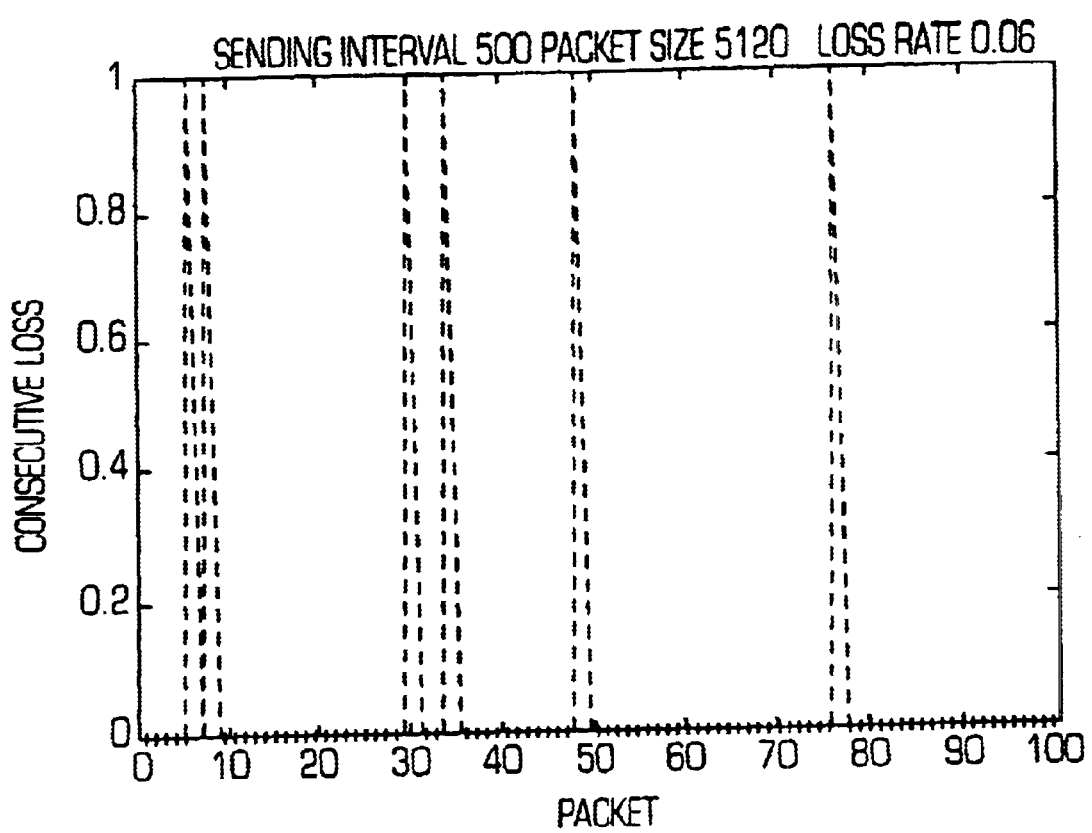
FIG. 7C(3)

```
Input: (Coefficients organized in subbands from wavelet transformation)
Output: (Embedded zero-tree compressed bitstream)
Step 1: Determine the largest coefficient, compute initial threshold
while((threshold >= 1)&&(total size so far is less than the allowed bit budget))
{
    zig-zag scanning from the lowest subband to the highest
    frequency subband{
        /* code this subband */
        encode significance map of this subband
        refine by one bit previous coded significant coefficients of this subband
    }
    threshold = threshold/2; /*next bit plane*/
}
```

FIG. 14

```
Input: (Coefficients organized in subbands from wavelet transformation)
Output: (Embedded zero-tree compressed bitstream)
Step 1: Determine the largest coefficient, compute initial threshold
while((threshold >= 1)&&(total size so far is less than the allowed bit budget))
{
    zig-zag scanning from the lowest subband to the highest
    frequency subband{
        //coding pass
        for each coefficients in this subband{
            if( this coefficient is previously determined to be significant)
                then delay it for refinement pass;
            else if( it is part of a zero-tree)
                then skip
            else if( it value >= threshold)
                then code it as significant
            else if( it is insignificant but has significant children)
                then code it as isolated zero
            else if( it is insignificant and all its children are insignificant)
                then code as zero-tree root
        }
    }
    //refinement
    for each coefficients that previously determined to be significant{
        refine its precision by coding its bit at the current bit plane
    }
    threshold = threshold/2; /*next bit plane*/
}
```

```
Input:   (Dependency trees of the macroblocks in the last P frame,
         ti, t2, ..., tn)
Output:  (p packets Packets less than S kbytes, p1, p2, ..., pm)

initialize each tree ti as one packet pi while(packets can still be combined){
    step 1: for each packet pi{
                calculate the number of common nodes with its
                neighboring packets
            } step 2: sort the packets according to the number of common
            nodes with its neighbor step 3: merge the two packets with the largest number of common nodes,
            if the combined size of the two packets does not exceed the
            maximum allowable size step 4: update neighboring information
}
output packets p1, p2, ..., pm
```

FIG. 23

MV: CURRENT MOTION VECTOR
MV1: PREVIOUS MOTION VECTOR
MV2: ABOVE MOTION VECTOR
MV3: ABOVE RIGHT MOTION VECTOR

Frame 9 block 18
  Frame 8 [18]
  Frame 7 [18]
  Frame 6 [18]
  Frame 5 [*18*]
  Frame 4 [*6*] [*7*] [*17*] [*18*]
  Frame 3 [6] [7] [*16*] [17] [*18*] [27] [*28*]
  Frame 2 [6] [7] [16] [*17*] [18] [*27*] [*28*] [*29*] [*39*] [*40*]
  Frame 1 [5] [6] [7] [15] [16] [17] [18] [26] [27] [28] [29] [*39*] [*40*]

```
Algorithm PacketizeTree
Input: a dependency tree
Ouput: one packet
Add root node to the first level of the multi-level queue
Set current level to be the first level
for(each level starting from the first level){
    for(each node in the current queue){
        calculate the children according to its motion vector
        for each children{
            test to see if its already in next level queue
            if(not in next level queue)add this child in the next level queue
        }
    }
}
```

FIG. 25

ROBUST, RELIABLE COMPRESSION AND PACKETIZATION SCHEME FOR TRANSMITTING VIDEO

The present application is based on, and claims priority from, U.S. application Ser. No. 60/053,871 filed Jul. 28, 1997, which is incorporated herein by reference.

BACKGROUND OF THE INVENTION

Transmitting digital video over the current Internet is difficult. There is a big gap between Internet bandwidth and video bit rate. The current Internet is a best effort, unreliable network with no Quality of Service (QoS) guarantees. These difficulties require that an effective Internet video coding and transmission scheme be low bit rate and robust. The conflicting requirements of low bit rate and robustness requires a delicate balance between them. Traditional coding methods are optimized for compression ratio and rely on transmission schemes to provide robustness. The current Internet environment cannot provide desired robustness without sacrificing low delay and other real time requirements. Traditional schemes dealing with packet loss and error recovery are not suitable for the Internet because they are designed for specific environments under specific assumptions.

The Internet and its most important application the World Wide Web(WWW) have experienced exponential growth and gained widespread recognition during the past few years. The Internet and the WWW show the promise of becoming a global platform for computing, communication and collaboration. One reason for the phenomenal success of the Internet and the WWW is the successful integration of textual and graphical data and transmission of these static data types. The value of real time media, like real time video and audio on the Internet and WWW has been widely recognized. See, for example, C. Adie, "A survey of distributed multimedia research, standards and products", ftp://ftp.ed.ac.uk/pub/mmsurvey/, January 1993 (Adi93); C. Adie, "Network access to multimedia information", ftp://ftp.ed.ac.uk/pub/mmsurvey/, February 1994 (Adi94); T. J. Berners-Lee, R. Cailliau, J. F. Groff, and B. Pollerman, "World Wide Web: The Information Universe", Electronic Networking: Research, Applications and Policy, 2(1):52–58, 1992 (BLCGP92); F. Kappe and N. Sherbakov, "Hyper-G: A Universal Hypermedia System", ftp://iicm.tu-graz.ac.at/pub/Hyper-G/doc/report333.txt.Z, March 1992 (KS92); Z. Chen, S. Tan, R. Campbell, and Y. Li, "Real time video and audio in the World Wide Web", In Proc Fourth International World Wide Web Conference, 1995 (CTCL95); Vosaic LLC white paper, http://choices.cs.uiuc.edu/Papers/New/www5/www5.html, February 1996 (wp96a); VXtreme Inc white paper, "Enabling Interactive Video Over the Internet", http://www.vxtreme.com/developers/wp960304.html, March 1996 (wp96b); and Progressive Networks Inc. RealVideo Technical White Paper, http://www.realaudio.com/products/realvideo/overview/index.html, 1997 (Inc97). Supporting dynamic real time media such as real time video and audio, on the Internet enables new applications like real time visual communication, entertainment and distance learning and training, while enhancing the capability of existing ones. Internet video delivery has shown great commercial potential and, therefore, has encouraged a substantial number of commercial developments, e.g., as described in Xing Technology Corporation, "StreamWorks", http://www.xingtech.com/, 1996 (Cor96b); VDOnet Corporation, "VDOLive Internet Video Servers and Players", http://www.vdolive.com/, 1996 (Cor96a); InterVU Inc., "Inervu Video Delivery Products", http://www.intervu.com/, 1996 (Inc96a); Vivo Inc., "VivoActive Video Delivery Products", http://www.vivo.com/, 1996 (Inc96c); and VXtreme Inc., "VXtreme Video Delivery Products", http://www.vxtreme.com/, 1996 (Inc96d). However, because of the shortened Internet software development cycles, these commercial developments tend to rush to product development, often skipping or shortening the research phase. Unlike browser and push products, which require less planning, research-intensive video products are not suited to the shortened Internet software development cycle. Interesting research issues arise from a number of aspects of Internet video coding and transmissions. Solutions to these research problems cannot be found in traditional video compression and network transmission literature where the problems are often addressed in different environments under very different assumptions. The present invention is directed to the problem of how to effectively encode and transmit video over the Internet.

Supporting digital video on the Internet and WWW is very difficult. Unlike textual and image data, networked digital video requires efficient compression, large storage space, and sufficient bandwidth. Some of these requirements cannot be met in the current Internet environment. As a result, Internet video applications have suffered from poor transmission and playback quality. Of the many difficulties facing these applications, the two most significant are: (1) the gap between bit rate and bandwidth, and (2) the unreliable nature of the Internet.

Bit Rate and Bandwidth Gap A large gap exists between the compressed video bit rate and Internet bandwidth. Even with sophisticated video compression, the bit rate of digital video is often too high for most Internet connections. For example, a compressed full frame rate (30 f/s) broadcast quality (720×480) video runs at a bit rate of 3–8 Mbps using MPEG compression. See, V. Bhaskaran and K. Konstantinides. *Image and Video Compression Standards: Algorithms and Architectures*, Kluwer Academic Publications, 1995 (BK95). A good Internet connection with a shared Ti line has a maximum bandwidth of 1.5 Mbps. Even with compromised video frame rate, quality and frame size, the bit rate is often high for average and low bandwidth connections. For example, a 10/320×240 video typically has a bit rate of 100 Kbps to 400 Kbps with MPEG compression. Currently a home user with dial-up or ISDN service can get a typical bit rate in the range from 14 Kbps to 128 Kbps.

Unreliable Nature of the Internet The Internet is inherently a packet switched, best effort, unreliable network. Research is being conducted toward a network with guaranteed quality of service (QoS). See, D. D. Clark, S. Shenker, and L. Zhang. "Supporting real-time application in an integrated services packet network: Architecture and mechanism" In Proc. of SIGCOM'92, 1992 (CSZ92); H. T. Kung, T. Blackwell, and A. Chapman. "Credit-based ow control for ATM networks: Credit update protocol, adaptive credit allocation, and statistical multiplexing", In Proc SIGCOM'94, 1994 (KBC94); C. Partridge. Gigabit Networking, Addison-Wesley, 1993 (Par93); and L. Zhang, S. Deering, D. Estrin, and D. Zappala. "RSVP: A New Resource ReSerVation Protocol", IEEE Network, September 1993 (ZDEZ93). However, there is no QoS guarantee on the current Internet. Packets on the Internet can get delayed, duplicated, or lost during the delivery process. Existing flow control and error handling schemes like those implemented in TCP (See, e.g., D. Comer and D. Stevens. *Internetworking with TCP/IP Volume 1 Principles. Protocols. and Architecture*, Prentice Hall, Englewood Cliffs, N.J., 1991

(CS91); and [Jac88] V. Jacobson. Congestion Avoidance and Control. In Proc. ACM Sigcom'88, pages 314–329, Stanford, Calif., August 1988 (Jac88)) ensure 100% reliability; however, they do not consider timely delivery. Therefore, they are only suitable for reliable non-realtime text and image transmission. As discussed below, these flow control and error handling schemes cause an unnecessarily large delay for delivery and are not suitable for video and other media. Internet video transmission has to deal with delay, jitter and packet losses. While delay and jitter can be effectively dealt with for on-demand services (CTCL95), packet loss is the major source of problems for Internet video transmission and playback. Dealing with packet losses requires both robust video coding and efficient transmission.

Internet video transmission must overcome the difficulties caused by the bit rate bandwidth gap and the unreliable nature of the Internet. The bit rate and Internet bandwidth gap requires efficient video compression schemes with very low bit rate. The unreliable nature of the Internet demands video coding and transmission schemes be robust enough to tolerate packet loss. The problem becomes more complicated because these two requirements often conflict with each other. An efficient compression algorithm that produces video streams with very low bit rate often renders the bitstream vulnerable to bit error and packet losses. A robust scheme that is resilient to error and packet losses often results in a high bit rate.

The reason behind this conflict is the way compression works. Video compression algorithms achieve compression by exploiting the similarities in the uncompressed video stream and removing redundancy. Similarities in video take two forms, spatial redundancy and temporal redundancy. Within one video frame, neighboring pixels tend to be similar in intensity and color values. Across video frames, frames tend to be similar because of the slow, continuous movement and change in the video sequence. As discussed later herein, spatial redundancy is often removed by transformation and variable length coding. When variable length encoding introduces state information in the bitstream, a bit error can cause the decoder to lose synchronization with the correct decoding state and consequently the decoding process may collapse. Temporal redundancy is removed by predictive coding, which codes only the difference between the current frame and its reference frame. When a frame is to be coded, it uses a coded frame from the past and/or the future as the reference frame. Only the difference between the frame and its reference frame is coded. Difference coding is a major factor for achieving compression. For example, for a sequence of 10 frames of H.263 encoded video, the display order of frames is from left to right and from top to bottom. The first frame is coded as an independent frame that does not use any reference frame. Each of the subsequent 9 frames uses its immediately previous frame as a reference frame. The size for the independently coded frame may be, e.g., 1236 bytes; the average size for the difference coded 9 frames may be 258 bytes. Using difference coding can achieve a size reduction of 70% for this sequence.

Although difference coding is essential in achieving efficient compression, it also introduces dependencies between frames, since a difference coded frame needs its reference frame for correct decoding. Loss of the reference frame will cause damage to the decoding of the difference encoded frame. Sometimes, since the reference frame is also difference coded, the dependencies among the frames form a chain, propagating damage. E.g., if the sixth frame in the ten frame sequence discussed above is lost in transmission, the decoder uses frame 5 as a replacement, damaging the decoding of frame 6. Since frames 7–10 all depend on their immediate predecessors, the damage caused by the loss of frame 6 propagates to all these frames.

Low bit rate video coding relies on efficient compression, which is achieved by introducing dependencies between different parts of the encoded bitstream. When one part of the stream is lost, the parts which depend on it are damaged. Sometimes the damage can be propagated. Assuming an accurate similarity measurement and assessment, typically the more dependency a compression scheme introduces into the bitstream, the more efficient the compression scheme is and the lower bit rate it can generate. However, the more dependencies in the bitstream, the more damage results when part of the stream is lost. In other words, the aforementioned efficient compression is less robust because it is susceptible to packet loss. Thus, there is a conflict between low bit rate and robustness. For effective Internet video delivery, meeting either one of these requirements does not necessarily improve the overall performance.

The existing research on Internet video transmission is divided into two camps with two different approaches to addressing the conflict between coding efficiency and coding robustness. The first one, best exemplified by the Mbone (e.g, see M. Macedonia and D. Brutzman, "Mbone, the multicast backbone", IEEE Computer, 27(4):30–36, April 1994 (MB94)) video conferencing tools like NV and VIC (See, e.g., Ron Frederick, "Experiences with software real time video compression", Technical report, Xerox Palo Alto Research Center, July 1992, available on the WWW via ftp://parcftp.xerox.com/pub/net-research/nv-paper.ps (Ron92); INRIA-RODEO, Inria videoconferencing system, http://www.inria.fr/rodeo/ivs.html (IR); and S. McCanne and V. Jacobson, "vic: A Flexible Framework for Packet Video", In ACM Multimedia'95, pp. 511–522, November 1995 (MJ95)), stresses coding and transmission robustness and focuses less on the coding efficiency. The coding schemes, which are normally robust to packet loss, use no or primitive difference coding and introduce little dependency into the bitstream. As a result, the coding scheme is robust but the coding efficiency is poor. Often the resulting bit rate is too high for low bit rate connections. Another approach is taken by on-demand Internet video transmission. See, e.g., Brian Smith, "Implementation Techniques for Continuous Media System and Applications", PhD thesis, University of Calif., Berkeley, 1993 (Smi93); Shanwei Cen, Calton Pu, Richard Staehli, Crispin Cowan, and Jonathan Walpole, "Demonstrating the Effect of Software Feedback on a Distributed Real-Time MPEG Video", In ACM 1995 Multimedia Conference, San Francisco, Calif., November 1995 (CPS+95); and CTCL95, tends to use existing standard efficient compression schemes like MPEG and tailors the transmission scheme for loss handling. Since most traditional video coding schemes use only coding efficiency as an optimization criteria, a pervasive dependency structure is introduced into the bitstream making the bitstream extremely vulnerable to transmission errors. As a result, packet loss handling in these schemes is difficult.

Existing Internet based video transmission systems tend to go to extremes when dealing with the tension between compression efficiency and error handling. There are traditional video coding and error handling schemes like Forward Error Correction. N. Ohta, "Packet Video Modeling and Signal Processing", Artech House, 1994 (Oht94); and E. Ayanoglu, P. Pancha, A. Reibman, and S. Talwar, "Forward Error Control for MPEG-2 Video Transport in a Wireless ATM LAN", In Proc. of ICIP'96, Lausanne, Switzerland, 1996 (APRT96). These error handling schemes often have different assumptions and are designed for environments that are very different from the Internet. For example, Forward Error Correction(FEC) has been studied extensively and has been used in wireless and ATM environments to deal with bit error. However, in the Internet environment, bit error due to bit corruption during transmission is insignificant compared to packet loss. See, e.g., CS91 and Par93 above, and W. Stevens, *UNIX Network programming*, Prentice Hall, 1990 (Ste90). Though a bit error can cause loss of synchronization between the encoder and decoder because variable length coding is used, usually a bit error is corrected in the IP layer and therefore encapsulated from the applications.

Another popular approach to dealing with error and loss is layered coding. R. Aravind, M. Civanlar, and A. Reibman, "Packet Loss Resilience of MPEG-2 Scalable Video Coding Algorithms", IEEE Trans. on Circuits and Systems for Video Technology, 6(5), October 1996 (ACR96); E. Amir, S. McCanne, and M. Vetterli, "A. Layered DCT Coder for Internet Video", In Proc. of ICIP'96, Lausanne, Switzerland, 1996 (AMV96); and Oht94 cited above. Video data is partitioned into important data, like a lower frequency band, and unimportant data like a higher frequency enhancement band. Different partitions are coded into different layers so that important layers can be sent with a channel that has a better transmission behavior like low delay and low loss rate. The enhancing layer is sent through a channel that has fewer quality of service guarantees. This approach is very suitable for networks where packets can be assigned different priorities and ensured different quality of service. In the Internet environment, however, quality of service guarantees do not exist and no distinctions are made between packet types. Improving the coding efficiency has been the focus for most traditional video compression research. See BK95 cited above; J. Mitchell, W. Pennebaker, C. Fogg, and D. LeGall, *MPEG Video Compression Standard*, Chapman & Hall, New York, N.Y., 1997 (MPFL97); G. Wallace, "The JPEG Still Picture Compression Standard", Communications of the ACM, 34(4):30–44, April 1991 (G. 91); The International Telecommunication Unino, ITU-T Recommendation H.261: Video Codec for Audiovisual Services at px64 kbit/s, 1990 (Uni90); and The International Telecommunication Union, Draft ITU-T Recommendation H.263, July 1995 (Uni95). Coding robustness has been less of an issue. For example, the use of the I frame in the MPEG coding scheme provides a resynchronization point and increases robustness; however, the original intention of the I frame is to provide a random access point rather than error resilience. The recent H.263 (Uni95) and MPEG 4 (See, e.g., L. Chiariglione, "Mpeg-4: Coding of audio-visual objects", http://drogo.cselt.stet.it/mpeg/mpeg 4.htm, July 1996 (Chi96)) efforts have been particularly focused on low bit rate video coding but error handling has not be a major concern. As a result, transmitting H.263 based video over the unreliable Internet is difficult.

A delicate balance is required between the conflicting requirements of low bit rate and robustness of Internet video transmission. Traditional coding methods are optimized for compression ratio and rely on transmission schemes to provide robustness. The current Internet environment cannot provide desired robustness without sacrificing low delay and other real time requirements.

SUMMARY OF THE INVENTION

The present invention provides a practical solution to the above problems, based on a comprehensive Internet traffic behavior study and with the results used as guidelines for the design and implementation of low bit rate and robust video coding and transmission schemes. The invention addresses problems in both coding and transmission. For coding, a hybrid coding scheme is proposed to increase the robustness. For transmission, an effective dependency isolation algorithm is designed to minimize the propagation of packet loss damage. A low bit rate and robust Internet video coding and transmission scheme can thus be realized by properly balancing the bit rate and robustness through improved I frame coding and efficient frame packetization.

The invention is based on three major components: a comprehensive Internet video traffic experiment to study packet loss and delay behavior, a hybrid wavelet H.263 coding scheme that improves robustness while keeping the bit rate low, and an efficient packetization scheme which minimizes packet loss damage.

The video traffic experiment is used to study the unreliable nature of the Internet. Delay and loss behavior are studied and analysis of their impact are used to guide the design and implementation of the coding and transmission schemes.

For a robust low bit rate coding, we propose a hybrid wavelet/H.263 coding. Coding standards like H.263 dramatically improve the predictive coding but coding of the I frame remains the same. A robust coding requires that more I frames be inserted in the bitstream for loss damage prevention and recovery. However, the large I frame size makes this impractical. Wavelet is ideal for still image coding because of its nice space locality feature; however, extensive use of wavelet is difficult because of its complexity and inability to do inter-frame difference coding. In this thesis we describe a hybrid coding scheme with wavelet I frame coding and H.263 predictive coding to produce a robust, low bit rate video coding scheme.

Predictive coding is essential to the coding efficiency. The Internet low bit rate requirement prohibits the use of such robust, high bit rate coding schemes as in Mbone tools like NV and IVS (Ron92, and IR, cited above). However, predictive coding introduces dependency into the bitstream, which propagates packet loss damage. In the present application we propose a novel dependency isolation packetization method that effectively minimizes the loss damage and its propagation. The new packetization method analyzes macroblock level dependency structure and packetizes the bitstream so as to minimize dependencies between packets. Through experiments and analysis, we show that by using the hybrid wavelet and H.263 coding scheme and the dependency isolation packetization method, a large range of packet loss rates can be tolerated.

BRIEF DESCRIPTION OF THE DRAWINGS

FIGS. 7A–7C are plots of consecutive loss vs. packet for a first group of experiments for a given site.

FIG. 14 is a view of one coding process.

FIG. 15 is a view of another coding process.

FIGS. 21 and 22 illustrate grouping of dependency trees.

FIG. 23 is an illustration of a sort and merge algorithm for packetization.

FIG. 25 is an illustration of an organization algorithm.

DETAILED DESCRIPTION OF THE INVENTION

Figure 1:
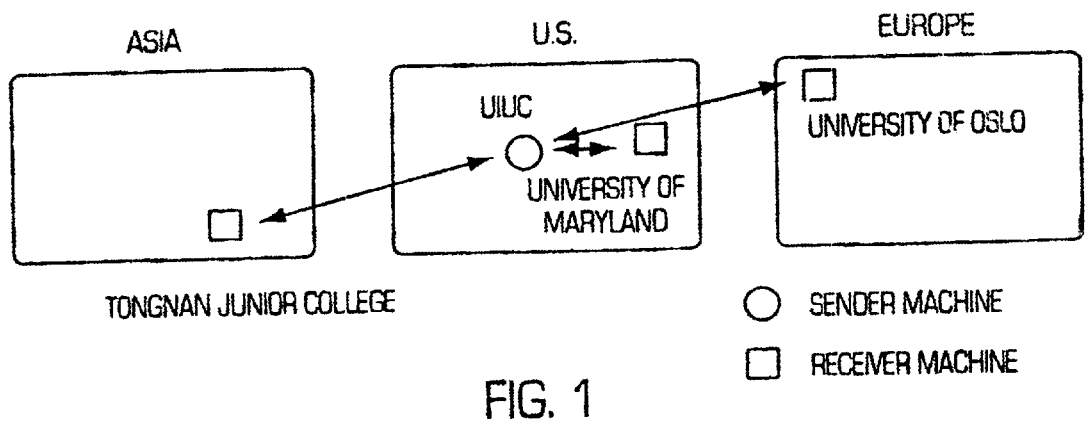
FIG. 1 is a schematic diagram of an experimental configuration of a sender machine and three receiver machines.

For a detailed discussion of basic background, including basic video compression notations and techniques, Internet services and protocols, and a survey of existing work related to the present invention, reference is made to "Coding and Transmission of Digital Video On the Internet", Zhigang Chen, doctoral thesis, University of Illinois at Urbana-Champaign, August 1997, available on the internet at http://www.cs.uiuc.edu/Dienst/UI/2.0/Describe/ncstrl.uiuc_cs/UIUCDCS-R-97-2016, which thesis is incorporated herein by reference.

Internet Video Traffic Experiments

The experiment is conducted in a wide area network involving a wide range of Internet connectivities. The experimental results are analyzed and their implications for video coding and transmission are presented.

The unreliable nature of the Internet is well known, as discussed in CS91 and Ste90, cited above. Packets can get delayed, duplicated or lost. Reliable transmission of textual data is achieved through retransmission provided by TCP. The flow control and retransmission scheme in TCP is designed to work for all network situations with different levels of unreliability. Transmitted data is 100% correct despite the delay and loss rate. The requirement of 100% correctness but exible delay tolerance makes it possible to have a conservative, universal error correction and handling scheme. The Internet's delivery of video, on the other hand, is much more flexible in term of correctness, but delay is less tolerated. That video delivery can tolerate some loss opens a set of error handling schemes including retransmission, layered coding, and FEC. These schemes are applicable in different loss and delay situations. For example, when the packet loss rate is always lower that 0:1%, an error recovery scheme based on forward error correction (FEC) will be very effective. If the error rate is very high, however, a scheme based on retransmission may be more suitable. Understanding the loss and delay behavior of video traffic is essential in designing an efficient coding and transmission scheme. Consider the relationship between packet size and packet loss rate. If it is known that packet size does not affect the loss rate, then using small packet size will increase the bit rate overhead caused by the packet headers and a large packet will be ideal in preserving the bandwidth. Just knowing that the Internet is unreliable is not enough for designing an efficient video delivery scheme. This chapter presents a video traffic experiment tries to identify the loss and delay behavior and the relationship between them. The goal of this experiment is to provide useful guidelines for designing an error and delay handling scheme. The experiment is targeted at identifying the following:

Characteristics of packet loss: How serious the packet loss is and in what range of rate the packet loss occur.

Packet loss pattern: Is there a pattern of packet loss? Is the packet loss bursty?

Loss rate vs. packet size: Is there a relationship between packet loss and packet size?

Loss rate vs. sending rate: How is packet loss rate related to sending rate?

Packet loss vs. delay: Does packet delay always precede packet losses? Is there a relationship between these two phenomena?

Experiment Setup

Host Selection: Most existing Internet video transmission systems use Internet connections that are limited mainly to the continental U.S. This experiment covers the U.S. as well as transcontinental connections. Table 1 shows the hosts involved in the experiments. The University of Maryland site is chosen to represent typical Internet connections between educational institutions in the U.S. The host from University of Oslo represents transatlantic connections between America and Europe and the Tongnan Junior College site represents typical network connections from U.S. to Asia.

TABLE 1

Hosts involved in the video traffic experiment

| Host Name | IP Address | Location | Platform |
| --- | --- | --- | --- |
| indy1.cs.uiuc.edu | 128.174.240.90 | University of Illinois | SGI Indy |
| voyager.src.umd.edu | 128.8.111.39 | University of Maryland | Sun Sparc 20 |

TABLE 1-continued

Hosts involved in the video traffic experiment

| Host Name | IP Address | Location | Platform |
|---|---|---|---|
| nipling.ifi.uio.no | 129.240.82.18 | University of Oslo, Norway | SGI Indy |
| peacock.tnjc.edu.tw | 140.129.142.200 | Tongnan Junoir College, Taiwan | Sun Sparc 20 |

Experiment Configuration: The experiments are conducted between the sender machine and the receiver machine. During experiments, the sender periodically sends out video packets to the receiver machine, the receiver machine records the arrival time of each packet. After each experiment, the result from the receiver machine is sent back to the sender machine by reliable transmission for result analysis. Throughout the experiment, sender and receiver maintain two connections: one is a reliable TCP connection, the other is a regular UDP connection. The TCP connection is used for reliable communication like initial setup and final transfer of experiment results. The UDP connection is used for the actual experiment data transfer. Each experiment has three phases: setup, experiment, and result transfer. During setup, the sender contacts the receiver and establishes the two connections. The sender also sends the parameters for the current experiment to the receiver. The setup phase is followed by the experiment phase, during which the actual experiment is conducted. Finally when the experiment is done, the result is sent back from the receiver to the sender. The host machine in DCL, UIUC is designated as the sender machine. The other three machines are designated as receiver machines. FIG. 1 shows this configuration. The sender machine conducts experiments with one of the receiver machines at a time. The experiments are done in groups at different times during work days. Each group consists of 20 to 32 individual experiments with different settings. They are carried out one by one with a 5 minute interval. The interval is designed to let the network settle down so that experiments will not affect each other.

Experiment Parameter Configuration: The main parameters for each individual experiment are packet size and sending interval. Packet size specifies how large one packet is. This size does not count the extra header bytes that the IP and UDP layers add. Sending interval specifies how often a packet is injected into the network. The combination of packet size and sending interval determines the bandwidth usage. Packet sizes are chosen from 500, 1024, 2048, 5120, 8000 bytes to simulate MPEG B, P and I frame sizes. Sending interval simulates the periodic real time behavior of video. The sending intervals are chosen from 50, 100, 200, 500 milliseconds to simulate 20, 10, 5 and 2 frames per second video sequence. Besides the data segment, each packet has a 4 byte header filed with a sequence number. The sequence number is extracted by the receiver machine and is used to identify which packet is lost. The arrival time at the server side is recorded. This information is sent back to the sender machine at the end of the experiment by reliable TCP connection for analysis. Based on this information, the sender machine measures packet loss rate, inter-arrival delay, and bandwidth usage.

Experiment Results and Analysis

About 5 to 10 groups of experiments have been conducted for each site. Each group consists of 20 experiments. We selected 3 typical groups from each site for analysis. Table 2-4 show the loss rate vs. different packet size and sending intervals for the three sites. The results of delay and loss pattern are also

TABLE 2

Packet loss rates for the Maryland site

| Packet Size | Sending Interval | Loss Rate % | | |
|---|---|---|---|---|
| (byte) | (ms) | Group 1 | Group 2 | Group 3 |
| 500 | 50 | 1 | 1 | 13 |
| 500 | 100 | 1 | 1 | 0 |
| 500 | 200 | 3 | 4 | 0 |
| 500 | 500 | 3 | 2 | 2 |
| 1024 | 50 | 0 | 2 | 4 |
| 1024 | 100 | 4 | 8 | 5 |
| 1024 | 200 | 5 | 3 | 3 |
| 1024 | 500 | 5 | 2 | 0 |
| 2048 | 50 | 7 | 22 | 9 |
| 2048 | 100 | 9 | 8 | 3 |
| 2048 | 200 | 9 | 6 | 5 |
| 2048 | 500 | 2 | 5 | 5 |
| 5120 | 50 | 13 | 11 | 15 |
| 5120 | 100 | 16 | 7 | 31 |
| 5120 | 200 | 17 | 11 | 14 |
| 5120 | 500 | 6 | 12 | 15 |
| 8000 | 50 | 40 | 27 | 18 |
| 8000 | 100 | 21 | 20 | 15 |
| 8000 | 200 | 23 | 8 | 18 |

TABLE 3

Packet loss rates for the Norway site

| Packet Size | Sending Interval | Loss Rate % | | |
|---|---|---|---|---|
| (byte) | (ms) | Group 1 | Group 2 | Group 3 |
| 500 | 50 | 11 | 6 | 8 |
| 500 | 100 | 11 | 9 | 8 |
| 500 | 200 | 6 | 12 | 8 |
| 500 | 500 | 7 | 5 | 5 |
| 1024 | 50 | 11 | 18 | 5 |
| 1024 | 100 | 19 | 9 | 10 |
| 1024 | 200 | 8 | 9 | 15 |
| 1024 | 500 | 14 | 8 | 7 |
| 2048 | 50 | 18 | 20 | 20 |
| 2048 | 100 | 16 | 19 | 7 |
| 2048 | 200 | 19 | 10 | 15 |
| 2048 | 500 | 21 | 14 | 17 |
| 5120 | 50 | 39 | 37 | 27 |
| 5120 | 100 | 30 | 32 | 34 |
| 5120 | 200 | 26 | 31 | 34 |
| 5120 | 500 | 35 | 35 | 36 |
| 8000 | 50 | 49 | 85 | 85 |
| 8000 | 100 | 40 | 56 | 36 |
| 8000 | 200 | 51 | 77 | 85 |

TABLE 4

Packet loss rates for the Taiwan site

| Packet Size | Sending Interval | Loss Rate % | | |
|---|---|---|---|---|
| (byte) | (ms) | Group 1 | Group 2 | Group 3 |
| 500 | 50 | 83 | 21 | 10 |
| 500 | 100 | 27 | 11 | 20 |
| 500 | 200 | 20 | 15 | 18 |
| 500 | 500 | 14 | 13 | 12 |

TABLE 4-continued

Packet loss rates for the Taiwan site

| Packet Size (byte) | Sending Interval (ms) | Loss Rate % Group 1 | Group 2 | Group 3 |
|---|---|---|---|---|
| 1024 | 50 | 54 | 72 | 17 |
| 1024 | 100 | 15 | 13 | 14 |
| 1024 | 200 | 19 | 13 | 27 |
| 1024 | 500 | 25 | 15 | 5 |
| 2048 | 50 | 64 | 95 | 61 |
| 2048 | 100 | 39 | 23 | 19 |
| 2048 | 200 | 41 | 20 | 22 |
| 2048 | 500 | 95 | 29 | 25 |
| 5120 | 50 | 44 | 97 | 47 |
| 5120 | 100 | 40 | 68 | 43 |
| 5120 | 200 | 50 | 43 | 97 |
| 5120 | 500 | 53 | 52 | 34 |
| 8000 | 50 | 97 | 86 | 76 |
| 8000 | 100 | 77 | 52 | 57 |
| 8000 | 200 | 81 | 97 | 66 |

Overall Loss Behavior: A preliminary observation of the results shows that packet loss is common. Nearly all the selected experiments have exhibited packet losses. Of the 180 selected experiments, only 4 experiments from the Maryland site had zero packet loss. The packet loss rates range from 0% to 97%, i.e., from no loss to nearly total loss. Without considering the packet size and sending interval, the Maryland site has the fewest overall packet losses, with the overall average packet loss rate of 9:1%. The University of Oslo site has a higher loss rate of 24:3%. The Tongnan Junior College site has the highest loss rate of 42:9%. The following sections examine the relationship between packet loss rate and packet size, as well as packet loss rate and sending interval. The arrival intervals and packet loss patterns are also studied.

Figure 2A:
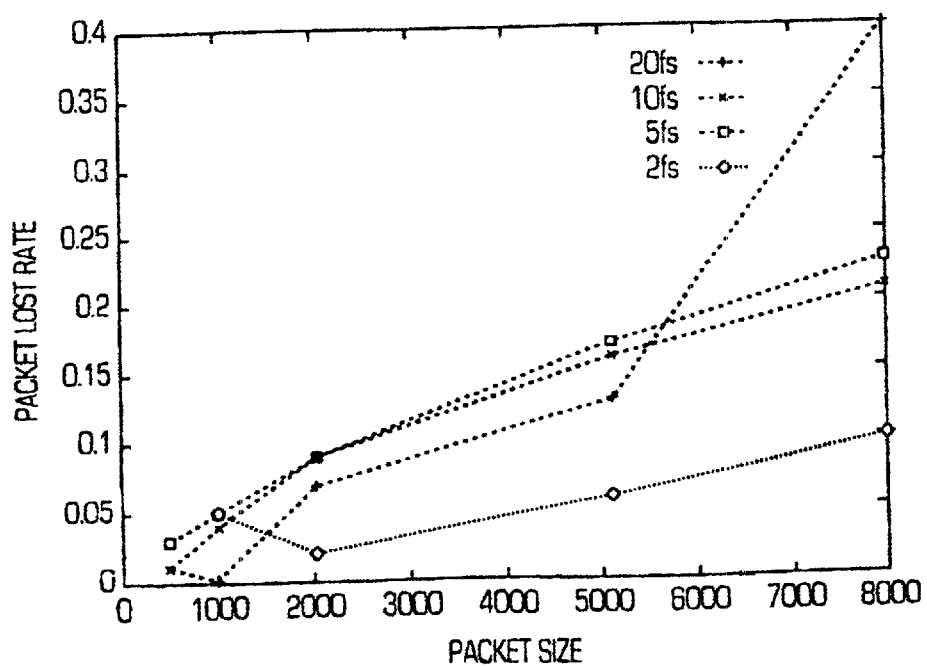
FIGS. 2A–2C are plots of loss rate vs. packet size.
Figure 2B:
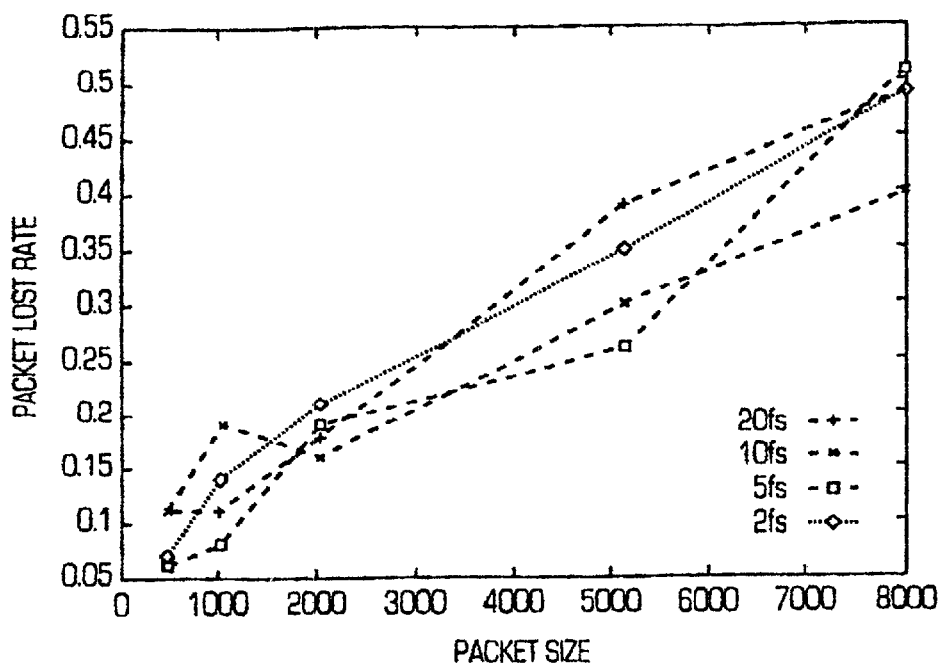
Figure 2C:
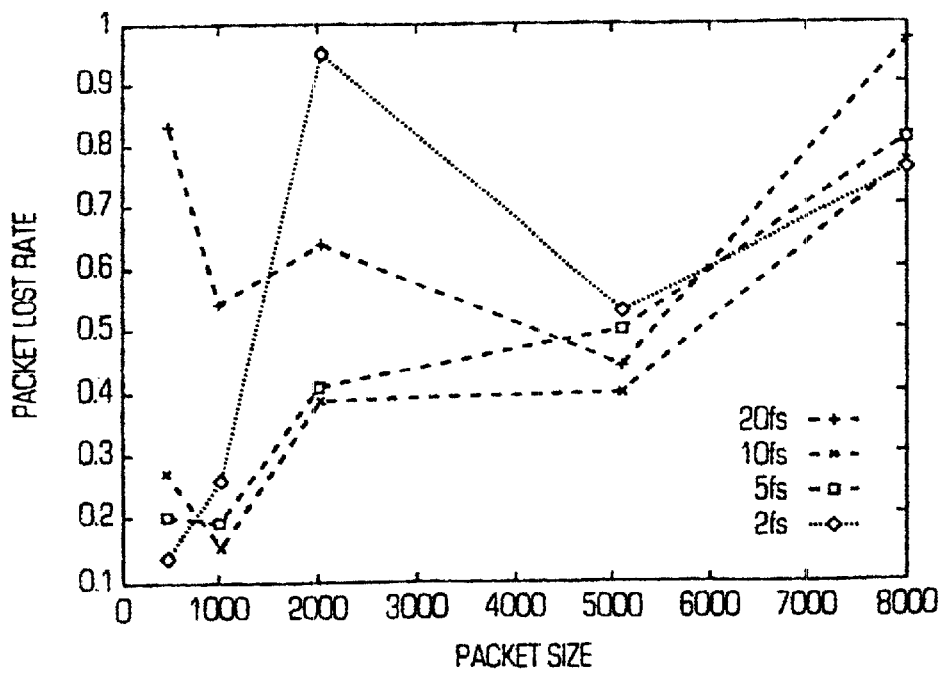
Figure 3A:
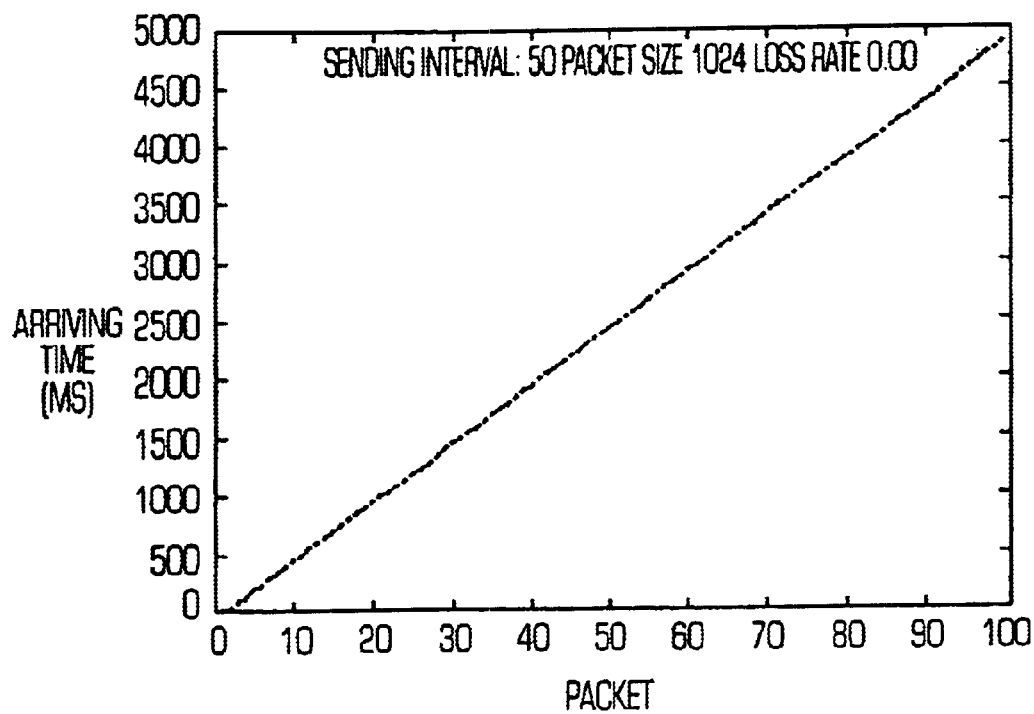
FIGS. 3A–3D are plots of arrival interval vs. packet for one receiving site.
Figure 3B:
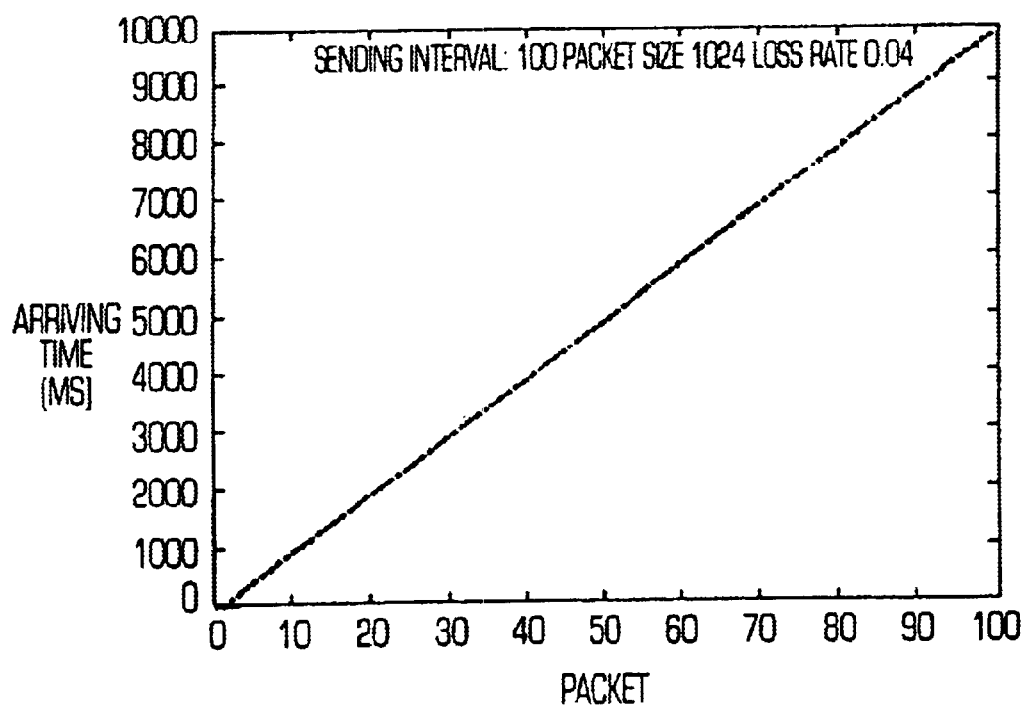
Figure 3C:
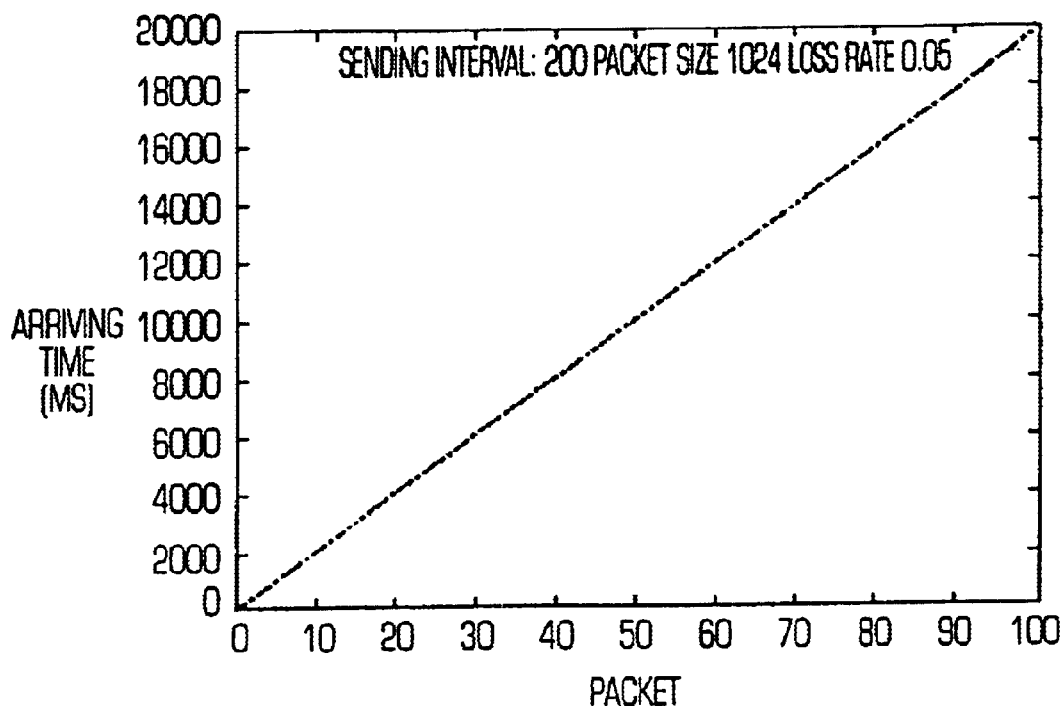
Figure 3D:
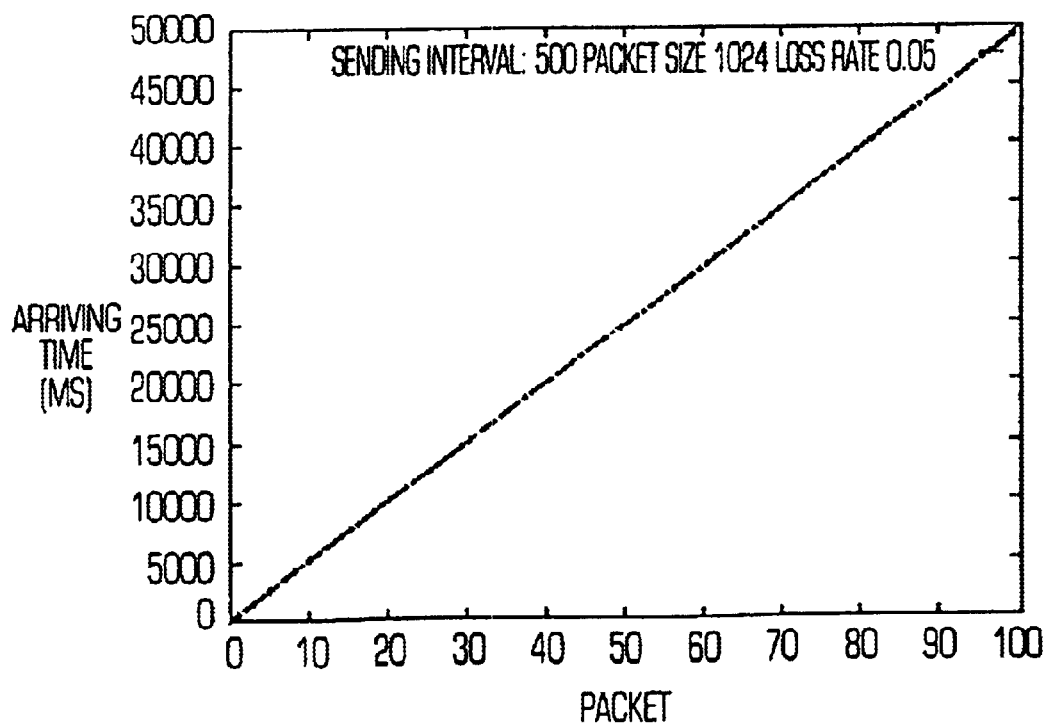
Figure 4A:
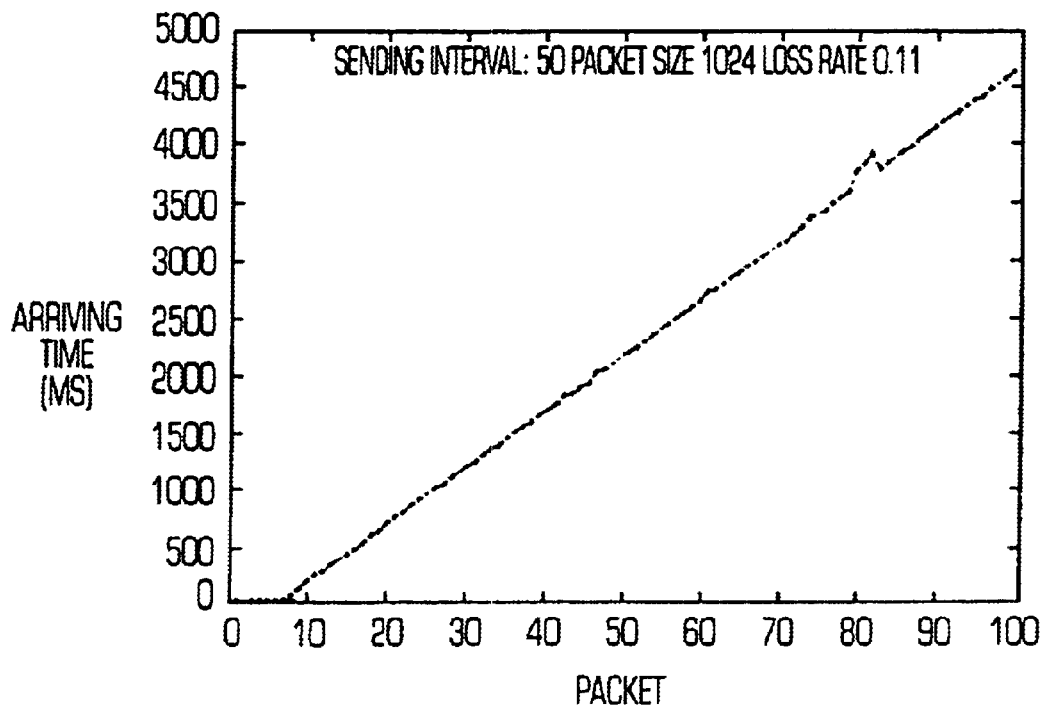
FIGS. 4A–4D are plots of arrival interval vs. packet for another receiving site.
Figure 4B:
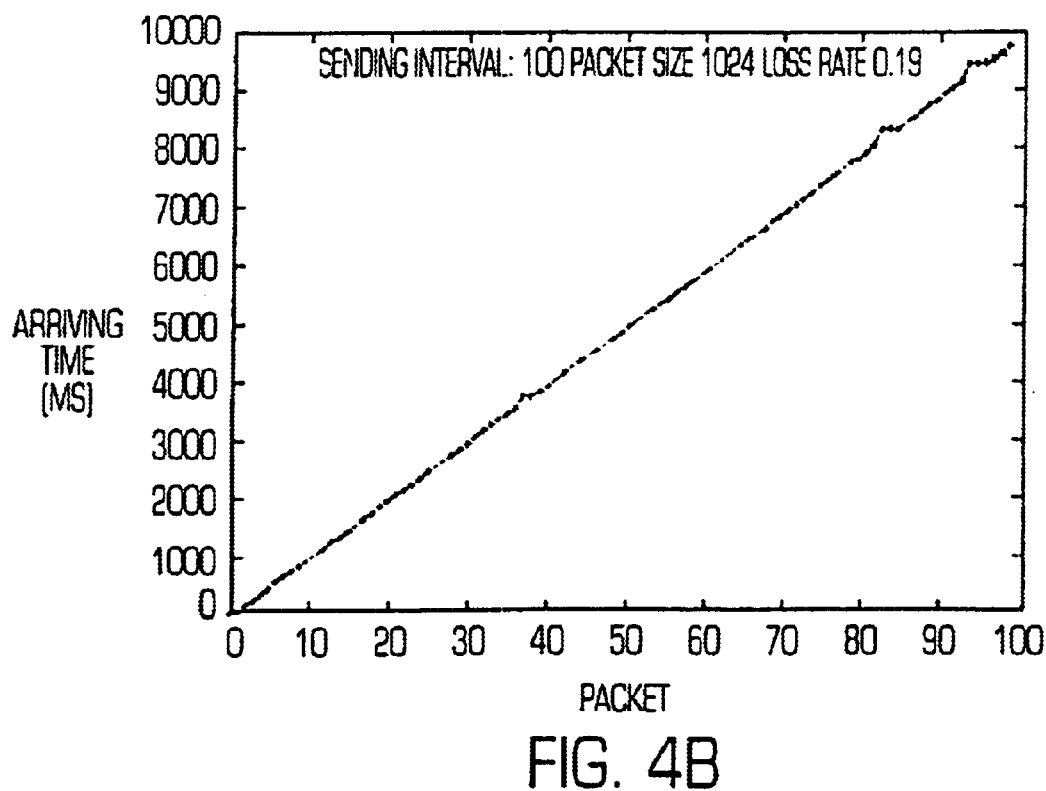
Figure 4C:
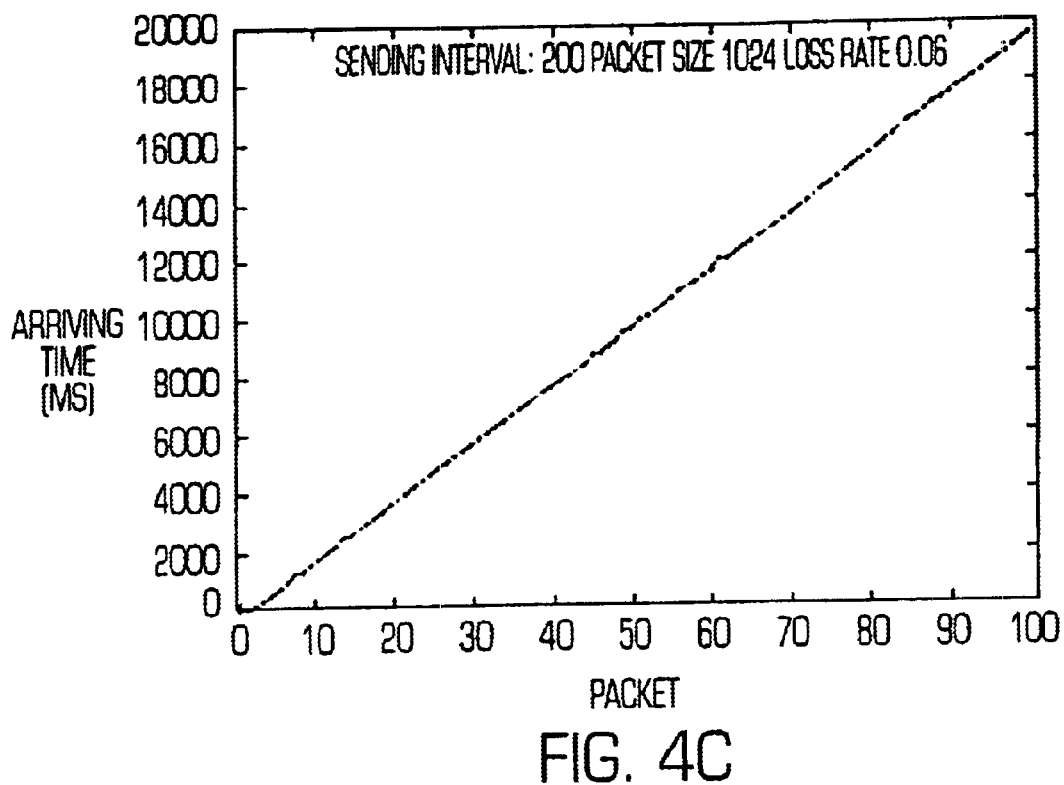
Figure 4D:
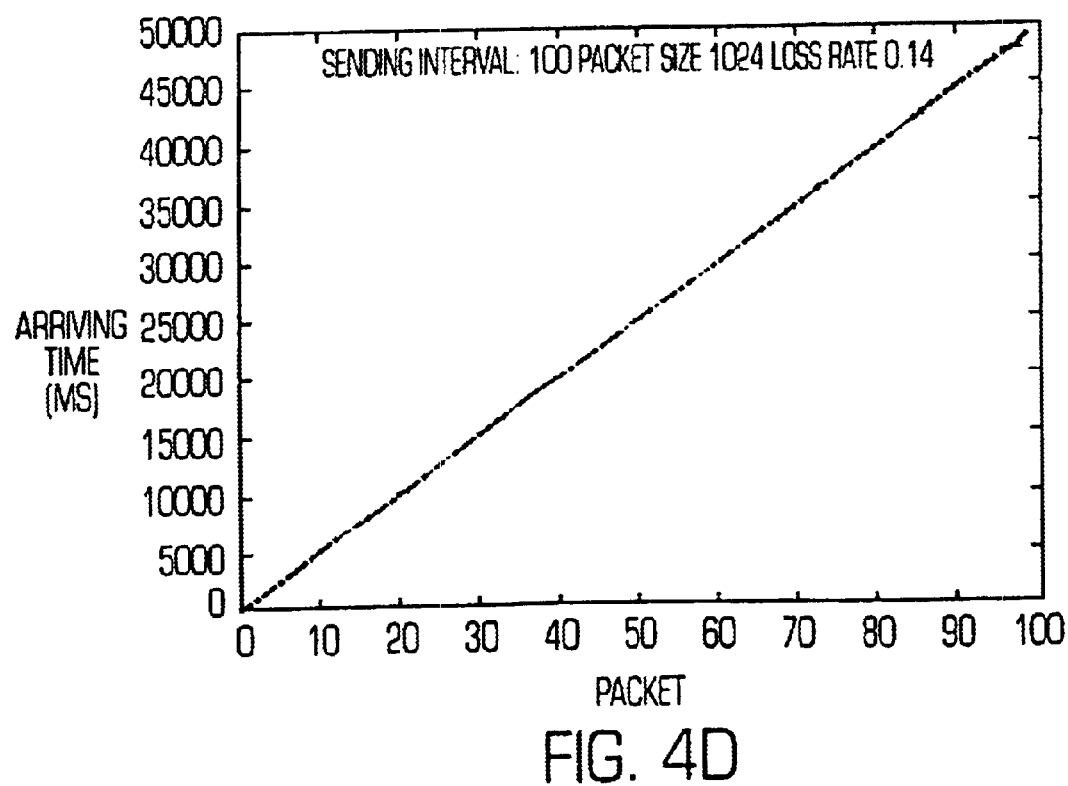
Figure 5A:
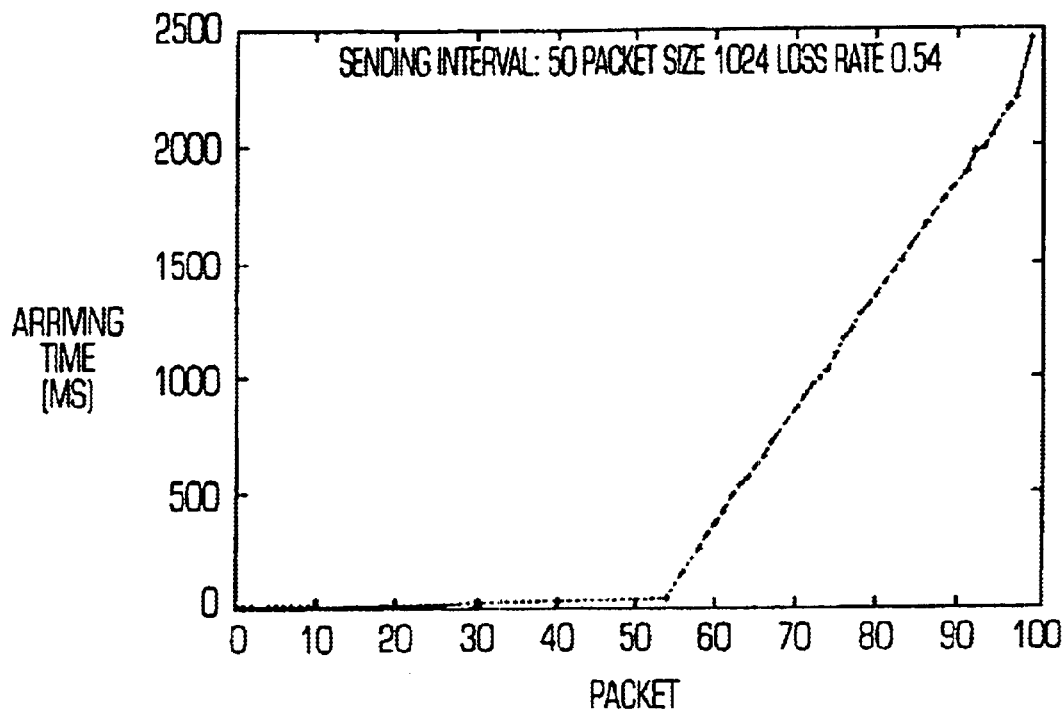
FIGS. 5A–5D are plots of arrival interval vs. packet for yet another receiving site.
Figure 5B:
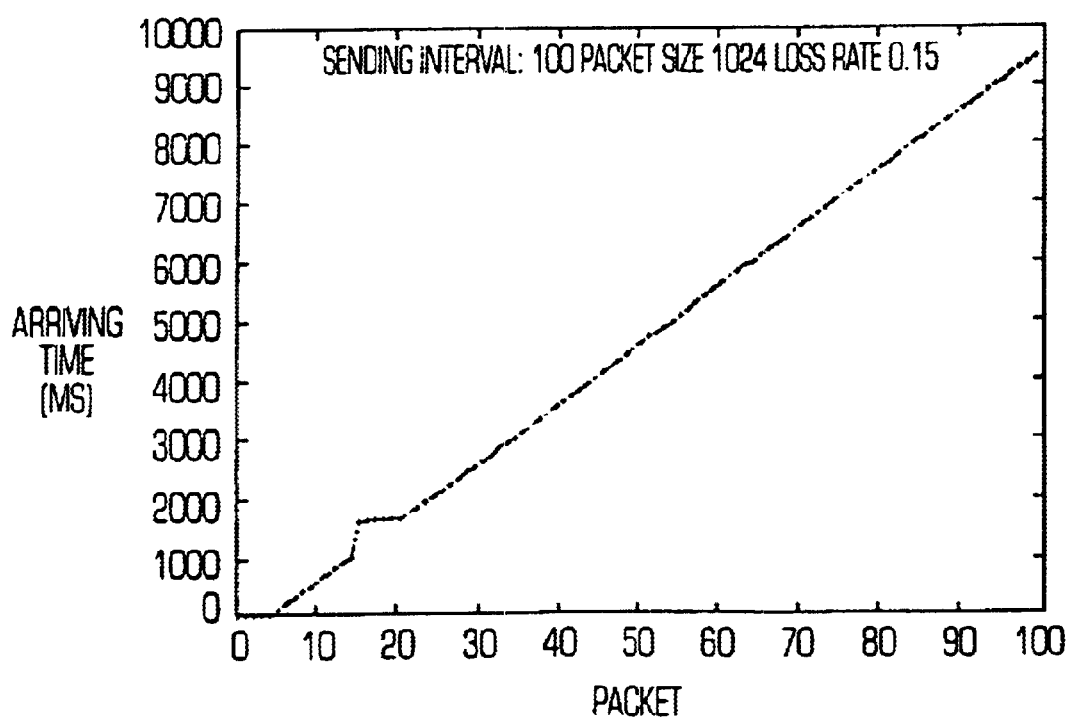
Figure 5C:
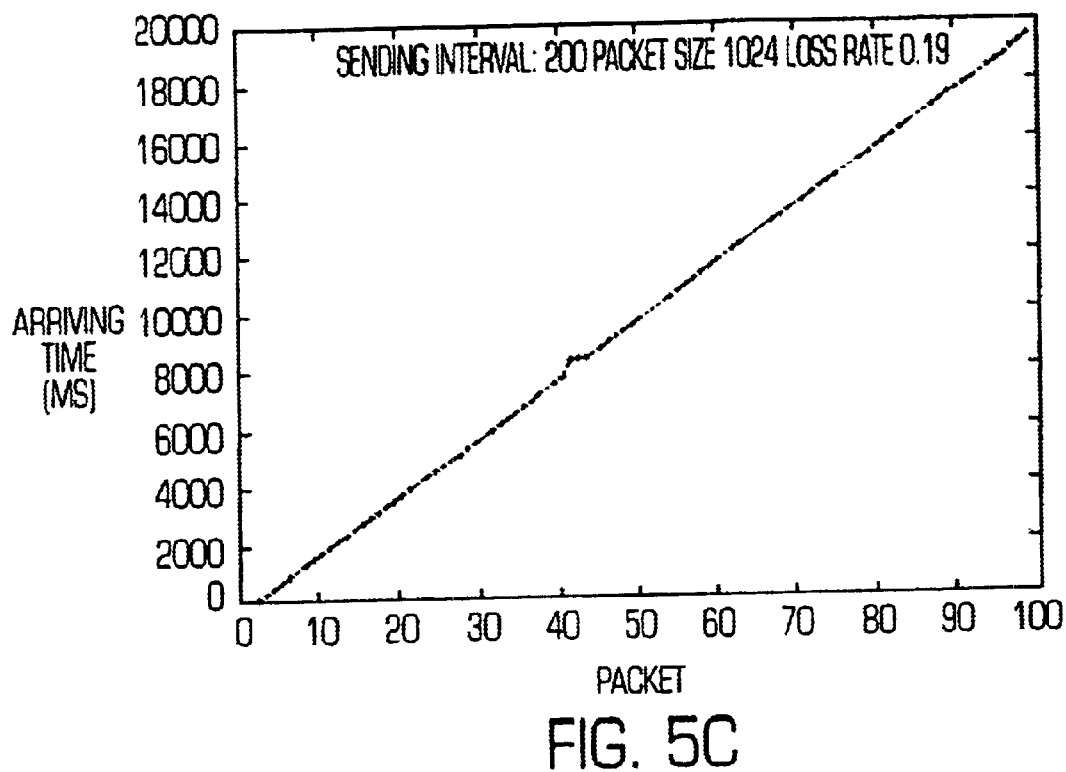
Figure 5D:
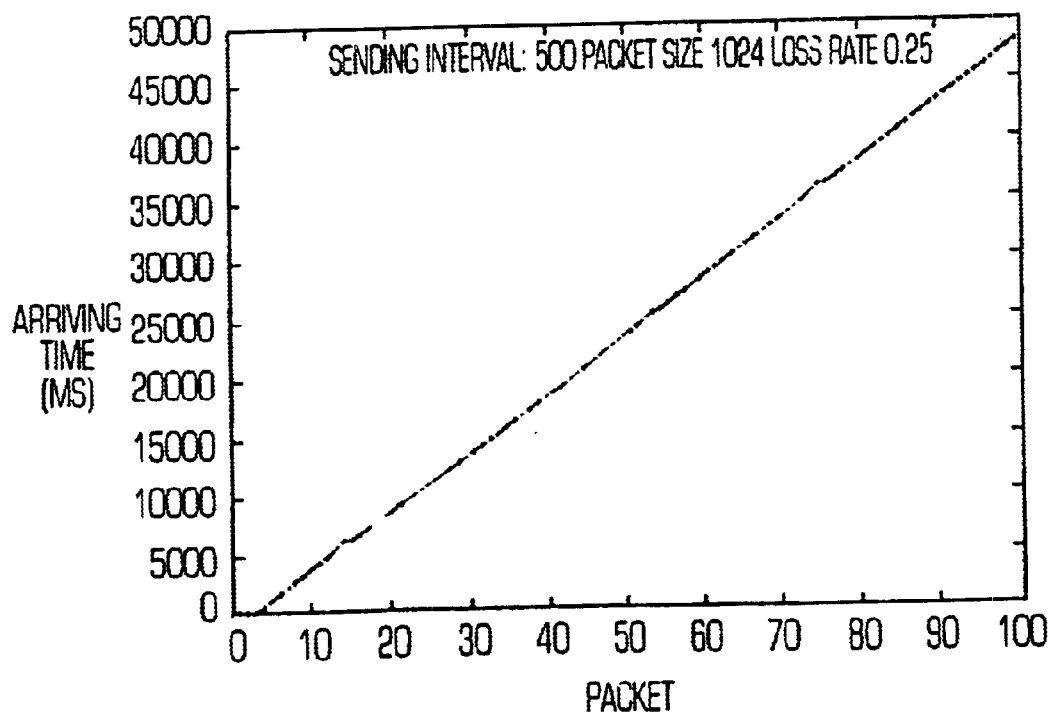

Loss Rate vs. Packet Size: FIG. 2 plots the loss rate vs. packet size and sending interval of the first group of each site. The experiments show a clear correlation between packet size and packet loss rate: the loss rate increases with packet size. This correlation can be explained as follows. The experimental video traffic packet is sent through UDP by the sender. When it reaches the IP layer, it is assembled into IP packets. The IP layer can accommodate packets as large as 64 Kbytes (see, Step 90, cited above). Therefore the IP layer does not perform any fragmentation since our experiment packet size ranges from 500 to 8000 bytes. However, when the IP packet is traversing through networks, the packet is broken down into smaller transmission units suitable for different networks. For example, the maximum transmission unit (MTU) on the Ethernet is 1500 bytes. Therefore, en route to the destination, a large IP packet will be decomposed into unit packets when entering a network. The size of the packet is determined by the MTU of the specific network, the smaller packets are reassembled back into the original IP packet when exiting the network. Given that the probability of a unit packet being lost is fixed, then the more unit packets a IP packet needs to be decomposed to, the more likely it will be lost. Therefore, large packet size results in higher loss rate.

Further examination of the result complies with the analysis. Assuming that most of the networks on the Internet are Ethernet using an MTU of 1500 bytes, a video packet with size of 8000 bytes will be broken down into about 6 packets. Let the possibility of one packet getting lost be x, then the probability for at least one of the 6 packets to be lost is $1-(1-x)6$. The average loss rates for a packet size of 1024 bytes for each site are 3:5%, 12%, and 24%. The expected loss rates therefore are 19%, 57%, and 80%, respectively. The average loss rate from the experiment shows an actual average loss rates of 21%, 62% and 76%, which are very close to the expected loss rates.

Loss vs. Sending Interval: It is commonly believed that packet loss is primarily caused by buffer overflow (see, e.g., CS91, Ste90 and Jac88, cited above). As the traffic load exceeds the switching capacity of a switch, the traffic builds up in the switch's queues. The queue will eventually overflow, so that newly arrived packets will be dropped. Reducing the sending rate can potentially reduce the chance of the switches to overflow. This leads to a conclusion that a lower sending rate results in a lower packet loss rate. In the experiment, for a given packet size, we changed the sending rate by varying its sending interval. For example, with a packet size of 1024 bytes, a sending interval of 50 and 100 milliseconds produces a traffic rate of 160 and 80 Kbps. Under the assumption that a lower rate results in less loss, the loss rate from using an interval of 100 milliseconds should be lower than that of 50 milliseconds. However, the experiment results show no obvious relationship between the sending rate and loss rate. This is illustrated by FIG. 2. The loss rate goes up with packet size in a predictable way. However, for the same packet size, the loss rate of different sending intervals seems to be irrelevant. For example, in the first graph of FIG. 2 showing the Maryland results, for a packet size of 1024, an interval of 50 milliseconds has the lowest loss rate, followed by 100, 200, and 500 milliseconds, in increasing order. With a packet size of 2048, an interval of 500 milliseconds has the lowest loss rate, followed by 50, 100 and 200 milliseconds. There is no fixed order for loss rates at different sending rates. This shows that lowering the sending rate does not necessarily lower the loss rate. One possible explanation is that since the experiment is conducted in a wide area network, the packets go through major Internet backbones. The switch that causes a packet loss is probably one handling a lot of traffic, so reducing the sending rate in one stream does not improve the overall effect very much.

Packet Loss vs. Arrival Interval: In an ideal situation, in which packets are not lost and the network delay is the same for all packets, packets will arrive at the receiver side in a fixed interval that is equal to the sending interval. However, in a packet switched network like the Internet, different packets may experience different network delays. As congestion begins to build up, packets are likely to experience increased delay until a packet is lost. This prediction of congestion has been used in some transmission systems (I. Busse, B. Deffner, and H. Schulzrinne, "Dynamic QoS control of multimedia applications based on RTP", Computer Communications, January 1996 (BDS96). Our experiment, however, shows no noticeable increase in delay before loss. FIGS. 3 to 5 plot the arriving interval for a packet size of 1024 for the first group of experiments at each site. The majority of the losses happen without any increase in the arriving interval of the previous packets. This result confirms the findings in some other traffic behavior studies, as described in Sanghi, A. Agrawala, O. Gudmundsson, and B. Jain, "Experimental assessment of end-to-end behavior on internet". In Proc. IEEE Infocom'93, San Francisco, Calif., 1993 (SAGJ93). There are two possible reasons for this rather random loss behavior:

The experiments are for wide area networks with many switches. Although some switches are congested, which can cause delays, the delayed packets have a chance to get switched quickly in following switches.

Switch delays or queuing delays are not the dominant delays. If propagation delays and processing delays are dominant, the queuing delay would not be reflected in the final arrival interval.

Figure 6:
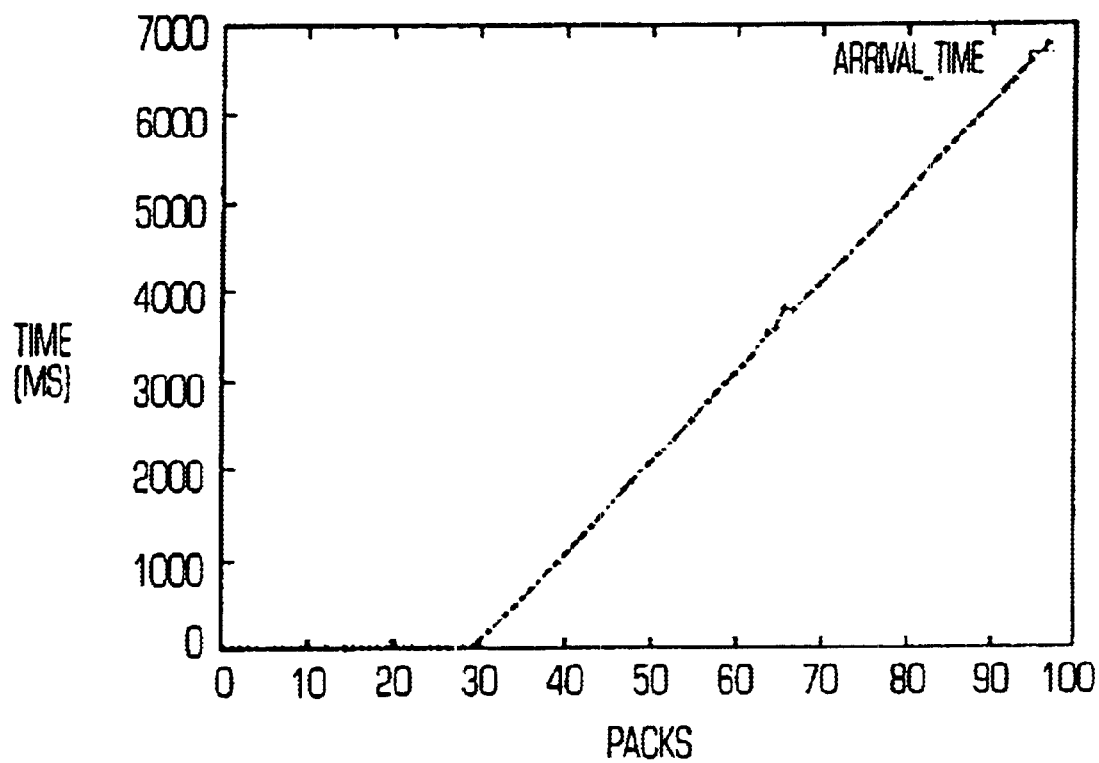
FIG. 6 is a plot of arrival time vs. number of packets.

We observed that in some experiments the first few packets reached the server at the same time. This is shown in FIG. 6. The first 30 packets arrived at the server side at the same time. This occasional phenomenon can be explained by looking at the packet route set up. Once the client and server established UDP connections, the probe packets were injected into the network. The first packet, when traversing through the network, required the routers to perform destination lookup. See, e.g., CS91, Ste90 and Par93 (cited above), as well as A. Tanenbaum, *Computer Networks*, Prentice Hall, Englewood Cliffs, N.J., 1989 (Tan89). In the Internet routing implementation, the lookup result is cached for later packets, thus the later packets can get through quickly and eventually catch up with the first packet. Therefore the initial series of packets arrive at the same time at the destination.

Loss Pattern: FIGS. 7A–7C shows the loss pattern of the first group of experiments from the Maryland site. The number of consecutive losses is plotted. In all experiments except the one with packet size of 8000 bytes and sending interval 50 milliseconds, the number of lost packets that occurs in N consecutive losses is always greater than that in M consecutive losses where N<M. The majority of the packet losses happen independently. Two consecutive losses are small and it is rare to lose more than 2 packets. Packets are most likely lost in a random fashion rather than in a burst.

However, packet loss is usually assumed to result from bursty loss behavior. This is because when an intermediate switch becomes congested, the congestion will last for a while before the situation restores to normal condition. Packets arriving during this period of time will be dropped. Therefore, packet drop can potentially happen in a burst. However, in the experiment conducted here in a wide area network, the bursty effect is not so obvious. Packet loss behaves in a random fashion. Again this may be caused by the many switches that are involved in this experiment. Congestion can happen in many switches and many of the switches are handling large volume of traffic, the combined effect makes the loss behavior of individual traffic random.

Impact on Video Coding and Transmission: Our major focus is not to develop a rigid and accurate explanation of the packet loss and delay behavior. Accurate traffic modeling and the investigation of loss and delay behavior deserve in-depth studies of their own. Rather, we focus on understanding what kind of video traffic loss and delay behavior we can experience in the current wide area Internet environment. Some of the results of this experiment agree with the findings in some other Internet traffic study in different contexts, e.g., see J-C. Bolot, "End-to-end packet delay and loss behavior in the internet", In Proc. SIGCOMM'93, San Francisco, Calif., September 1993 (Bol93), and SAGJ93 (cited above). The video traffic experiment yield results that are very useful in designing efficient video coding and transmission schemes:

Packet loss is pervasive. The loss rate ranges from 0% to nearly 100%.

There is a strong relationship between packet loss and packet size.

Packet loss seems to happen randomly, regardless of sending rate.

Lost packets are not preceded by packets with increased delay. Initial packets tend to arrive at the destination in a small interval.

Packet loss is not so bursty, as typically assumed. In the following discussion, we examine the impact of these results on video coding and transmission.

Overall Coding Robustness: Because packet loss is so common, a coding scheme suitable for the Internet should be very robust. It needs to accommodate a wide range of loss rates, from very light loss to heavy losses. Use of temporal dependency in the video bit stream should be controlled.

Packet Size: The experiment shows that the loss rate increases with large packet size. The increase in loss rate confirms the result analysis by packet segmentation. It is reasonable to use large packets since the statistical loss rate is the same with small packets. Additionally, using large packets can reduce the overall header overhead imposed by IP and UDP header on each packet. However, using large packet size increases the bandwidth usage if a retransmission based scheme is used for loss recovery. This is explained by the following simple example. Suppose we have an 8 Kbyte video frame. It can be sent as one 8 Kbyte packet or 8 packets of 1 Kbyte. Under the same loss rate, the chance for the 8 Kbyte frame to arrive equals the chance of all 8 small packets to arrive. So to the IP layer, the amount of data that will be transferred by sending one large packet is equivalent to the amount of data sent by 8 small packets. However, at the application level, when a packet is lost, the application can still get some packets when using small packets. But the application will probably get none if using large packets. Under the same loss rate, when using small packets, the application can see at least some of the packets instead of seeing none. Under a retransmission scheme, the application using small packets needs only to request those lost small packets. While using large packets the application needs to resend the whole packet. From this example, it is more reasonable to use small packets as long as the header overhead is tolerable to the application.

Video Bit Rate: The experiments show that in the wide area network environment, the loss rate of a particular traffic stream is not directly related to the sending rate. This might be explained by the fact that some intermediate switches are handling so many traffic streams that the change in one stream has little impact on the overall result. This observation may encourage higher bandwidth usage. However, an excessively high bit rate is neither feasible nor desirable. It is not feasible because the bottleneck for the majority of low bit rate connections are from their modems or ISP entry points. The entry point to the network could become congested before the stream reaches the wide area networks. Excessive bit rate is not desirable because the majority of the current Internet traffic is reliable TCP traffic. This traffic behaves very well because of the rigid TCP flow and congestion avoidance controls [Jac88]. The congestion can be worsened by the increased number of bandwidth excessive streams.

Packet Loss Handling: An ideal coding and transmission scheme should have good recovery scheme for the random loss. Errors are typically recovered by retransmission or redundancy in the bit stream. Retransmission will increase the delay and use of redundancy increases the bit rate and may not work well under very high loss rate. These recovery schemes may not work in situations with strict time requirements and limited bit rates. When unrecoverable losses occur, the coding scheme and transmission scheme should be flexible enough to recover the video to the best possible quality with partially arrived messages.

Hybrid Wavelet and H.263 Video Codec

We now describe a hybrid wavelet and h.263 video codec. The codec is designed to enhance the robustness of the bitstream against packet losses while keeping the bit rate reasonably low. It takes advantage of the improved predictive coding in H.263 and low bit rate I frame coding provided by wavelet.

H.263 Low Bit rate Coding H.263 (described in Uni95, cited above, and in Telenor, "Telenor H.263 Implementations Version 1.7", http://www.fou.telenor.no/brukere/DVC/, 1996 (Tel96); and Telenor Research, "Video Codec Test Model, TMN5", http://www.fou.telenor.no/brukere/DVC/, January 1995 (Res95)) is based on H.261 [Uni90]. It is targeted at low bit video coding applications with bit rate low enough to get through phone lines (Plain Old Telephone) with bit rate in the range of 10 to 30 kb/s. Prototype H.263 systems [Tel96, Res95] have demonstrated that its coding is very efficient. H.263 is a 16×16 macroblock, 8×8 subblocks DCT-based coding scheme with motion estimation and motion compensation. It supports standard ITU formats. There are three kinds of frames defined in the standard. Two of them, I frame and P frame, are inherited from H.261. H.263 introduces the PB frame as the third frame type. PB frame combines two frames in one: a P frame in the future and the current B bidirectional frames using the previous P frame the P frame in the future. I frame encoding is a DCT-based coding similar to that used in MPEG. Some new features in the H.263 standard are essential to the improvement of performance over traditional H.261 and MPEG codec. These new features mainly improve the predictive coding, i.e., improve the efficiency of motion estimation and compensation. These new features are:

Unrestricted motion vector mode: Motion vector can point across a frame to allow more accurate motion estimation.

Syntax-based arithmetic coding mode: Arithmetic coding (e.g., see I. Witten, R. Neal, and J. Cleary, "Arithmetic coding for data compression", Commun. ACM, 30(6) :520–540, June 1987 (WNC87)) can be used to replace the variable length coding.

Advanced prediction mode: 8×8 blocks can be used instead of 16×16 macroblocks for motion estimation, allowing more accurate motion estimation. The overhead is that four pairs of motion vectors are needed instead of one.

Half-pel motion estimation: Instead of basing on integral pixel, motion is estimated to an accuracy of a half pixel.

These improvements make H.263 very effective in predictive coding and allow it to produce very low bit rate bitstreams. The coding of the I frame remains similar to the other standards like H.261 and MPEG except that arithmetic coding can be used instead of the traditional variable length coding.

I Frame Size vs. P Frame Size

In the H.263 codec, coding of the I frames is still similar to traditional I frame coding. Therefore the difference between the size of the I frame and P frame is large. Table 5 shows a comparison between I frame size and P frame size for several video sequences.

TABLE 5

Comparison of I frame and P frame sizes

| Video sequence | Format | Motion | Avg. I size | Avg. P size | I/P ratio |
|---|---|---|---|---|---|
| Miss America | QCIF | low | 916 | 60 | 15.3 |
| Jesus to a Child | QCIF | medium | 1182 | 178 | 6.6 |

Under the assumption of reliable transmission, a large I frame size is not significant since an I frame coding is only used once at the beginning of the bitstream as an initial reference frame. All the subsequent frames are coded predictively. I frame coding does not need to be improved under such circumstances.

In an unreliable transmissions environment like the Internet, P frame coding can propagate the damage caused by one lost frame. For a video sequence composed of one initial I frame and subsequent P frames, loss of the first P frame damages the decoding of the second P frame. Since the third frame uses the second P frame as a reference frame, the damaged second frame causes the third frame to be incorrectly decoded. The initial damage by the loss of the first P frame propagates to the rest of the sequence. One way to remedy this damage propagation is to provide a resynchronization point where all the damage propagation can stop. Insertion of I frames can effectively provide this kind of resynchronization. The more I frames that are introduced into the sequence, the more resistant the bitstream is against frame losses. For example, for the Miss America video sequence, assuming a packet loss rate of 10%, packet loss happens once in every ten packets. If a frame rate of 10 f/s is used and an I frame is inserted every 10 frames, then loss of a packet will cause an average of 5 frames to be damaged, and the effect lasts half a second before an I frame repairs the damages. More I frames need to be inserted to reduce the number of frames that can be affected. The above analysis makes it reasonable to add more I frames into the bitstream. However adding more I frames increases the bit rate. One way to deal with this problem is to reduce the I frame size. Reducing the I frame size is not easy with traditional DCT-based coding schemes. At very low bit rate, DCT discards high frequency coefficients. Since most of the edge information is represented by high frequency and edge information is significant for visual perception, discarding these coefficients makes the image blurred and very blocky. Wavelet codings, on the other hand, tend to preserve some of the high frequency information at even very low bit rate. Therefore, wavelet compression produces better images at very low bit rate. This motivates a hybrid coding scheme using wavelet for I frame coding and DCT-based motion estimation and motion compensation for P frame coding. This combination is feasible with the existing H.263 coding scheme since the motion estimation and motion compensation are based on reconstructed images. In other words, motion estimation and compensation are done independently of the coding of the I frames. As long as a reconstructed image is provided as the reference frame, the motion estimation and compensation can be carried out. To summarize, a hybrid coding scheme is recommended for the following reasons:

Packet loss requires more I frames to be inserted in the video sequence to make the transmission robust. However, introduction of more I frames can increase the bit rate, requiring the I frame size to be reduced.

DCT-based I frame coding for low bit rate produces blocky picture.

Wavelet I frame coding produces low bit rate compression and does not affect motion estimation and motion compensation processes of the predictive frame coding.

Pure wavelet video coding is difficult. (1) Motion estimation and compensation is difficult for wavelet. This is because a small shift in the spatial space will produce large change in the wavelet frequency domains (e.g., see S. Servetto, personal communication, November 1996 (Ser96). On the other hand, motion compensation is easy and effective for DCT-base coding. (2) Because wavelet coding is expensive, pure wavelet video encoding is not very realistic. However, by using wavelet only for the I frames, the cost of wavelet transformation and coding can be compensated by the P frame processing.

We will now describe a hybrid wavelet/h.263 video coding scheme. First the basic ideas behind wavelet encoding are described, then an implementation of the wavelet I frame coder based on Zero-tree. The coding results and analysis are also provided.

Wavelet Based Still Image Coding

The structure of the wavelet transform-based image coder also complies with the generic structure described in FIG. 2.2 of Chapter 2 of the above-cited Chen thesis.

Figure 8:
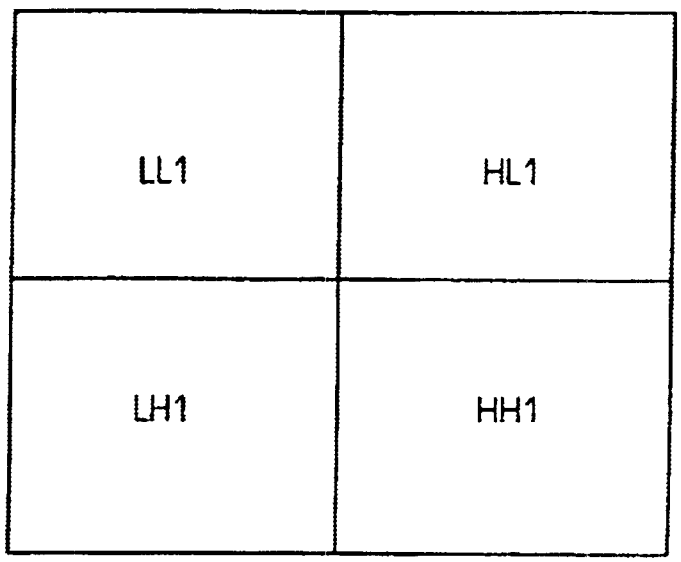
FIG. 8 is an illustration of four frequency subbands of a first, wavelet-based transformation.

Basic Wavelet Transformations: By using a combination of low-pass and high-pass filters, wavelet transformations successively convert an image from space domain to multiple frequency subbands. In a typical wavelet transformation, the image is first transformed into four frequency subbands as shown in FIG. 8. The four subbands, denoted by LL1, HL1, LH1 and HH1, correspond to the four subbands with combinations of low frequency and high frequency components along horizontal and vertical dimensions. For example, HL1 denotes a subband that has a high frequency component along the vertical direction and low frequency component along the horizontal direction.

Figure 9:
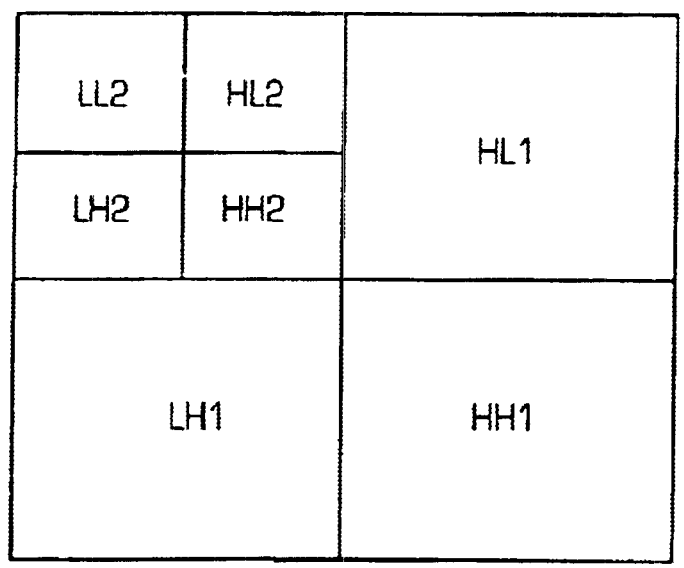
FIG. 9 is an illustration of a further transformation to a finer scale of the one of the subbands of FIG. 8.
Figure 10:
FIG. 10 is a computer-generated image example based on a three-level wavelet transformation.

Subband LL1 has the low frequency components for both dimensions. It is further transformed to get finer scale (see FIG. 9). This process continues until a desired scale is reached. FIG. 10 shows a 3 level wavelet transformation of an example image.

Figure 11:
FIG. 11 is a comparative illustration of two computer-generated images utilizing DCT transformation and wavelet transformation compression, respectively.

Wavelet Transformation vs. DCT Transformation: At a very low bit rate (less than 1 bit per pixel), DCT based transformation produces very blocky images while the wavelet based compression scheme gives reasonable results. The top of FIG. 11 shows a picture compressed with JPEG at 0:08 bit per pixel(bpp). The blocky effect is very noticeable. The lower part of FIG. 11 is the same image compressed with the zero-tree based wavelet compression algorithm detailed later in this chapter. The blocky effect at very low bit rate is inherent in the DCT based compression schemes. When an 8×8 block is transformed, the frequency domain is decomposed into 64 fixed-length frequency subbands. Each coefficient of the 64 subbands represents the overall energy level of that subband for the block. As a result, higher frequency components of the original block, like the edge information, are decomposed into multiple subbands and distributed to multiple coefficients. These coefficients are quantized by a quantization matrix. The quantization matrix is usually designed to give lower frequency bands higher priority in the bitstream. As a result, at very low bit rate, only the low frequency coefficients are preserved. Edge information tends to be quantized away. Therefore the image loses the high frequency component and looks blocky and blurred.

Wavelet based compression algorithms tend to allocate bits evenly to low and high frequency parts. This is because unlike DCT, wavelet has a nice space-time locality property, as described in S. Servetto, K. Ramchandran, and M. Orchard, "Image coding based on a morphological representation", Submitted to the IEEE Trans. on Image Processing, October 1996 (SRO96). After an image is transformed, coefficients with large magnitude within each frequency band tend to form clusters that correspond to the high energy edge locations in the original image. These clusters resemble the edges in the space domain. FIG. 10 shows the coefficients of the example Lena image after 3 levels of wavelet decomposition. For the purpose of illustration, the coefficients are normalized to be in the range of 0 to 255 for drawing. We can see from the figure that in each subband, large significant coefficients correspond to the edge of the original image. Therefore it gives an outline of the original image in each subband. This outline resembles each other across all the subbands. Wavelet coding algorithms take advantage of this clustering within each subband and resemblance across subbands offered by the time-frequency locality property. Therefore, even at very low bit rate, the wavelet compression algorithms can maintain both low and high frequency components.

There are a number of effective wavelet image coding methods. These include Shapiro's Zero-tree approach (J. Shapiro, "Embedded image coding using zerotrees of wavelet coefficients", IEEE Trans. on Signal Processing, 41(12), December 1993 (Sha93); Perlman and Said's improved Zero-tree method (A. Said and W. Pearlman, "A new, fast, and efficient image codec based on set partitioning in hierarchical trees", IEEE Trans.on Circuit and Systems for Video Technology, 6(3), June 1996 (SP96); and the more recent morphological representation method by Servetto et al [SRO96]. The zero-tree approach captures the clustering with subbands and resemblance between subbands by a tree-like data structure called zero-tree. In this structure, if a coefficient is insignificant with regard to a certain threshold, then the coefficients that represent the same spatial area in the higher frequency subbands are likely to be insignificant. The Zero-tree method introduces a special zero-tree symbol to denote such a tree. The morphological based approach uses morphological operations to capture the intra-band clustering. It uses the statistical model of one subband to guide the coding of another subband, taking advantage of the similarity between subbands.

A Zero-tree Based I Frame Coder

An I frame coder based on the Zero-tree approach is implemented. The implementation is kept simple and efficient. While image coding usually does not have very strict time constraints and can afford sophisticated computation, I frame coding and decoding in video have time restrictions. Also the computational complexity needs to be controlled since video is often accompanied by other timely media like audio. Excessive consumption of CPU cycles will cause degradation of the overall playback performance.

After the wavelet transformation, as shown in the previous sections, an image is transformed from a space representation to a frequency domain representation. Each subband represents a certain frequency band. Within each subband, coefficients form clusters corresponding to positions in the space domain. Across subbands, the outlines of the original image shape formed by the clusters resemble each other. Each coefficient in the lower frequency subbands has four coefficients in the next higher subband representing the same spatial area. We can define this relationship between lower frequency subbands and their higher frequency counterparts as a \parent-children" relationship. A coefficient in a lower frequency band is regarded as the parent of the four coefficients covering the same spatial area in the next higher frequency band.

Figure 12:
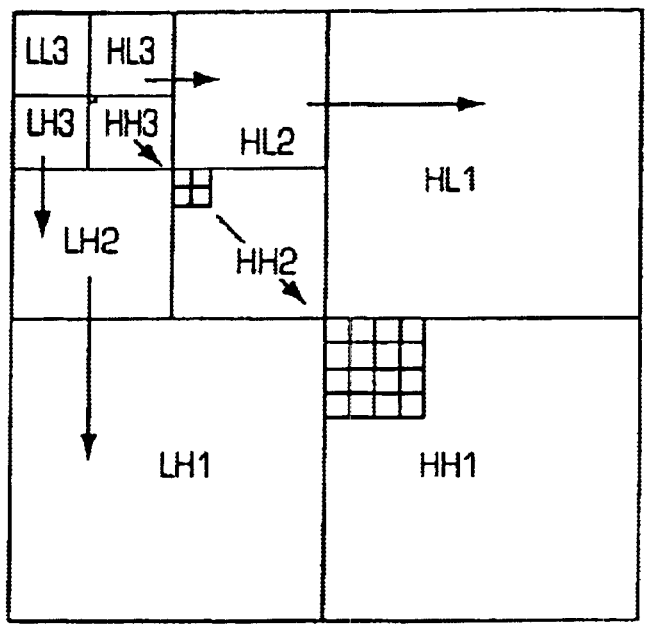
FIG. 12 illustrates a tree structure.

This parent-children relationship generates a tree structure representation of coefficients across subbands. Each coefficient has four descendents in the higher frequency subband and one parent in the lower subband. Exception to this rule is that coefficients in the last subband (representing the highest frequency subband) do not have any children and coefficients in the first subband (lowest frequency subband) do not have parents. FIG. 12 shows this tree structure.

The parent-children tree structure captures both the intra-band clustering and inter-band resemblance. Coefficients at the same level in a parent-children tree represent neighboring coefficients in the same subband. The tree also captures the resemblance across subbands. A coefficient and its children are likely to have similar energy levels because they represent the same spatial areas.

The zero-tree approach takes advantage of these properties by using a special data structure called zero-tree. The Zero-tree is a special parent-children tree in which all the nodes of the tree are insignificant to a certain threshold. For example, given a threshold 1024, a parent-children tree is said to be a zero-tree if all of its nodes have values less than 1024. The Zero-tree captures intra-band clustering and inter-band resemblance. If a coefficient is insignificant to a certain threshold, it is likely that all its children will be insignificant too. Therefore zero-tree can be represented by only one symbol (zero tree root) in the encoded bitstream.

The organization of the hierarchical structure of the subbands also enables progressive and embedded coding. Embedded coding has the property of being able to stop at any point in the bitstream for decoding with maximum contribution. It is ideal for rate control since the encoding or sending process can control precisely the sending rate by stopping whenever the rate exceeds the predefined rate.

Figure 13:
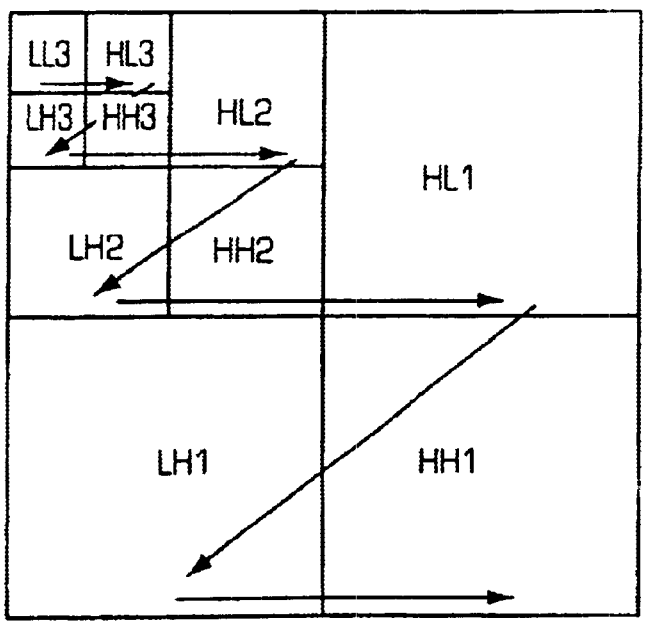
FIG. 13 illustrates scanning order.

Embedded coding in the zero-tree approach uses bit plane scanning and zig-zag subband scanning. Before the encoding process, a magnitude of the largest coefficient is determined and based on that value an initial threshold is determined. Then the coefficients are scanned to see which coefficients are significant to this threshold. The scanning order is shown in FIG. 13. Subbands are zig-zag scanned from the lowest to the highest frequency subbands. Significant coefficients are encoded. Once this is done, the threshold is updated and the scanning process is repeated until a bit rate limit is reached.

The embedded coding process can be viewed as two nested iterations (FIG. 14). The first is the iteration through the bit plane, from the largest coefficients to 0. The second iteration is within each bit plane scanning, subbands are scanned in a zig-zag manner.

Coding of each subband can be regarded as a two-step process. In the first step the significant coefficients and their positions are identified. This information is called the significance map. Coding of the significance map is followed by the refinement pass, which refines by one bit the coefficients of this subband that are previously found significant. When coding the significance map, each coefficient can have one of the following statuses:

Coefficient that is already determined to be significant: Determined to be significant by previous bit plane scanning, the coding of this node is deferred to the refinement pass.

Zero-tree node: Determined to be part of a coded zero-tree, then this coefficient is skipped.

Coefficient that is significant: If this coefficient is above the threshold, then the significance of this coefficient at this bit plane is coded.

Zero-tree root: This coefficient is insignificant with regard to this threshold and all its children are insignificant too. A zero-tree symbol is coded.

Isolated zero: This coefficient is insignificant but one or more of its children are significant. An isolated zero symbol is coded.

The individual symbols are coded using the adaptive arithmetic coder as described in [WNC87]. The refined coding algorithm is shown in FIG. 15. Results and Analysis The wavelet I frame codec includes both an encoder and a decoder. It is combined with the Telenor H.263 codec [Res95] to form a hybrid H.263 wavelet codec. The hybrid codec codes each video frame as an I frame or P frame according to a I frame distance factor. I frame distance factor specifies how often a frame needs to be coded as an I frame. For example, an I frame distance factor of 5 specifies that an I frame is coded in every 5 frames, generating a coding sequence of IPPPPIPPPP.... The performance is measured on a SGI Indy with 150 MHZ IP22 Processor with MIPS R4010 Floating Point Chip and MIPS R4400 Processor Chip. The compiler is the C++ compiler shipped with the Irix 5.3 Unix system. Compiler option −O (optimization)is used for compiling the codecs. Two video sequences are used for the measurements. A Miss America video is a talking head sequence with little motion. A Jesus to a Child sequence is a music video with higher motion. The video sequences are coded first using the regular H.263 codec [Res95, Tel96] and then using the hybrid wavelet H.263 codec. Two distance factors, 5 and 10, are used. The following sections present the coding efficiency and coding time of these two schemes. The performance is compared to the modified H.263 codec with support for the I frame distance in which the I frame is coded through regular H.263 I frame coding. For the following performance measurement and comparison, I frame distance factors of 5 and 10 are used.

Coding Efficiency: Tables 6 and 7 show the coding results using the modified H.263 coder with the conventional H.263 I frame coder with distance factors 10 and 5. Tables 8 and 9 show the coding results for the hybrid wavelet H.263 codec with wavelet I frame coder with the same distance factors.

TABLE 6

Coding result using the H.263 I frame coding with distance factor 10

| | Miss Am | Jesus to a Child |
|---|---|---|
| Total size(bytes) | 14500 | 27110 |
| Avg I frame size(bytes) | 919 | 1163 |
| Avg P frame size(bytes) | 59 | 172 |
| Average I frame Y PSNR(dB) | 35.4 | 33.1 |
| Average I frame Cb PSNR(dB) | 37.1 | 37.7 |
| Average I frame Cr PSNR(dB) | 35.0 | 39.1 |
| Average P frame Y PSNR(dB) | 35.5 | 32.7 |
| Average P frame Cb PSNR(dB) | 37.1 | 36.8 |
| Average P frame Cr PSNR(dB) | 34.8 | 37.8 |

TABLE 7

Coding result using the H.263 I frame coding with distance factor 5

|  | Miss Am | Jesus to a Child |
|---|---|---|
| Total size(bytes) | 22900 | 36040 |
| Avg I frame size(bytes) | 917 | 1158 |
| Avg P frame size(bytes) | 57 | 161 |
| Average I frame Y PSNR(dB) | 35.4 | 33.2 |
| Average I frame Cb PSNR(dB) | 37.2 | 37.7 |
| Average I frame Cr PSNR(dB) | 35.0 | 39.0 |
| Average P frame Y PSNR(dB) | 35.5 | 32.8 |
| Average P frame Cb PSNR(dB) | 37.1 | 36.7 |
| Average P frame Cr PSNR(dB) | 34.9 | 37.9 |

TABLE 8

Coding result using hybrid codec with distance factor 10

|  | Miss Am | Jesus to a Child |
|---|---|---|
| Total size | 11800 | 23100 |
| Avg I frame size | 568 | 708 |
| Avg P frame size | 68 | 178 |
| Average I frame Y PSNR(dB) | 35.6 | 33.2 |
| Average I frame Cb PSNR(dB) | 36.0 | 37.6 |
| Average I frame Cr PSNR(dB) | 34.9 | 39.2 |
| Average P frame Y PSNR(dB) | 35.5 | 32.8 |
| Average P frame Cb PSNR(dB) | 36.9 | 36.6 |
| Average P frame Cr PSNR(dB) | 34.9 | 37.9 |

TABLE 9

Coding result using hybrid codes with distance factor 5

|  | Miss Am | Jesus to a Child |
|---|---|---|
| Total size | 16880 | 28040 |
| Avg I frame size | 564 | 702 |
| Avg P frame size | 70 | 175 |
| Average I frame Y PSNR(dB) | 35.2 | 33.1 |
| Average I frame Cb PSNR(dB) | 36.9 | 37.7 |
| Average I frame Cr PSNR(dB) | 39.2 | 39.1 |
| Average P frame Y PSNR(dB) | 35.4 | 32.8 |
| Average P frame Cb PSNR(dB) | 37.0 | 36.4 |
| Average P frame Cr PSNR(dB) | 34.9 | 37.8 |

The measurements in the tables show the number of I and P frames, total I frame sizes and P frame sizes, the average Peak Signal to Noise Ratio of the luminance and two chrominance planes, and total size. With the hybrid codec, I frame sizes are reduced by about 38% and 39% for the two video sequences. The overall size reductions are 19% and 26% for the Miss America video sequence with distance factors 10 and 5. The size reductions for the Jesus to a Child video are 15% and 22%.

The reduction of the video sequence size (therefore bit rate) does not degrade the video quality. As the measurement shows that the PSNR of all the three component coded with the hybrid codec is equal or higher than the conventional H.263 I frame codec.

With the hybrid wavelet and H.263 codec, more I frames can be inserted in the bitstream, enhancing its robustness.

Computation Cost: The computational cost of the hybrid wavelet H.263 codec is measured and analyzed in this section. Nearly all three stages in the wavelet I frame coding are more computationally involved than in the DCT transformation.

At the transformation stage, Wavelet transformation is more expensive since it uses floating point operations while DCT transformation uses integer operations.

At the quantization step, the bit plane scanning and zigzag subband scanning of the wavelet coding has more organizational complexity than the simple division based quantization matrix used in DCT. Finally, wavelet uses adaptive arithmetic coding at the final compression stage, which is more expensive comparing to the Huffman coding in DCT, which has been implemented efficiently as table lookup.

Because a video sequence encoded and decoded entirely using wavelet will be more computationally expensive, wavelet compression has been used mainly for still image coding. However, in our hybrid codec, the cost of the wavelet coding can be amortized since wavelet encoding and decoding happen only at fixed interval specified by the distance factor, during which inexpensive DCT-based coding is used.

Tables 10 and 11 show the encoding time of the H.263 I frame codec with distance factors 10 and 5. Tables 12 and 13 present the encoding time of the hybrid codec with the same distance factors 10 and 5. The table shows that the I frame takes about 2.5 times longer to code when the hybrid codec replaces the conventional H.263 I frame codec. However the overall encoding frame rate is decreased by only about 2% to 12%. This is because coding of the P frames, with extensive and sophisticated motion estimation and motion compensation, dominates the total coding time. As a result, the increased coding time caused by wavelet I frame coding does not severely degrade the overall encoding performance.

TABLE 10

Encoding time with H.263 I frame coding with distance factor 10

|  | Miss Am | Jesus to a Child |
|---|---|---|
| Avg I frame coding time(ms) | 254 | 258 |
| Avg P frame coding time(ms) | 1019 | 1012 |
| Frame rate(f/s) | 1.06 | 1.06 |

TABLE 11

Encoding time with H.263 I frame coding with distance factor 5

|  | Miss Am | Jesus to a Child |
|---|---|---|
| Avg I frame coding time(ms) | 250 | 265 |
| Avg P frame coding time(ms) | 1024 | 1005 |
| Frame rate(f/s) | 1.15 | 1.16 |

TABLE 12

Encoding time of hybrid codec with distance factor 10

|  | Miss Am | Jesus to a Child |
|---|---|---|
| Avg I frame coding time(ms) | 616 | 667 |
| Avg P frame coding time(ms) | 1060 | 1004 |
| Frame rate(f/s) | 0.98 | 1.03 |

TABLE 13

Encoding time of hybrid codes with distance factor 5

|  | Miss Am | Jesus to a Child |
|---|---|---|
| Avg I frame coding time(ms) | 638 | 697 |
| Avg P frame coding time(ms) | 1082 | 1004 |
| Frame rate(f/s) | 1.01 | 1.06 |

Tables 14 and 15 present the decoding time of the H.263 codec with distance factor 10 and 5. Tables 16 and 17 show the decoding time of the hybrid codec. The decoding time of a wavelet I frame is about 5 times greater than that of a H.263 I frame decoding. The decoding frame rate drops from 25 to 30 f/s to 12 to 18 f/s. The degradation is large, but, 12 to 18 f/s is still an acceptable playback rate for low bit rate connections.

TABLE 14

Decoding time with H.263 I frame coding with distance factor 10

|  | Miss Am | Jesus to a Child |
| --- | --- | --- |
| Avg I frame decoding time(ms) | 48 | 54 |
| Avg P frame decoding time(ms) | 31 | 34 |
| Frame rate(f/s) | 31.2 | 27.8 |

TABLE 15

Decoding time with H.263 I frame coding with distance factor 5

|  | Miss Am | Jesus to a Child |
| --- | --- | --- |
| Avg I frame decoding time(ms) | 46 | 52 |
| Avg P frame decoding time(ms) | 30 | 35 |
| Frame rate(f/s) | 30.1 | 26.4 |

TABLE 16

Decoding time of hybrid codec with distance factor 10

|  | Miss Am | Jesus to a Child |
| --- | --- | --- |
| Avg I frame decoding time(ms) | 250 | 264 |
| Avg P frame decoding time(ms) | 32 | 34 |
| Frame rate(f/s) | 18.6 | 17.5 |

TABLE 17

Decoding time of hybrid codec with distance factor 5

|  | Miss Am | Jesus to a Child |
| --- | --- | --- |
| Avg I frame decoding time(ms) | 260 | 267 |
| Avg P frame decoding time(ms) | 31 | 35 |
| Frame rate(ms) | 13.0 | 12.3 |

A hybrid coding scheme has been described based on H.263 and wavelet. H.263 offers excellent prediction frame coding and is ideal for low bit rate coding. However, pervasive use of predictive coding makes it vulnerable to packet loss. Loss of frames can cause damage that can propagate. More I frames are needed in video bitstreams to provide a resynchronization point and to increase the robustness. Traditional DCT I frame coding generates large I frames, reducing I frame size results in blocky images. Wavelet based transformation coding has proven to produce visually acceptable results at very low bit rate. By using wavelet coding for I frames, more I frames can be inserted into the bitstream. Implementation of a basic Zero-tree based wavelet I frame coder is described and it proves to be effective in increasing robustness while keeping the bit rate low.

Dependency Isolation Packetization

We now describe a novel packetization scheme for packet loss damage control. The packetization method utilizes the macroblock level dependency structure and packetizes macroblocks to minimize dependency between packets. We describe the design and implementation of this packetization method and measure its efficiency and improvement over traditional packetization method.

Objectives: Traditional low bit rate video coding schemes optimize bit rate and consider less coding robustness. Predictive coding introduces an extensive dependency structure into the bitstream. Consequently, the bitstream is extremely vulnerable to packet loss. FIG. 1.2 of Chapter 1 of the above-cited Chen thesis shows the effect of cascade damage caused by the loss of one P frame in an H.263 inter-frame coded sequence. One way to improve the robustness is to introduce more intra-coded macroblocks and frames. Intra-coded frames provide resynchronization points and prevent the damage from propagating. This method has been adopted in traditional coding schemes as in NV and IVS [Ron92, IR] where all blocks are intra-coded to achieve maximum robustness. However, using exclusive intra-coded frames results in high bit rate. We have described above a proposed hybrid H.263 wavelet codec which utilizes the wavelet for I frame coding to lower I frame size. Regularly inserting frames maintains reasonably low bit rate.

Improvement of the I frame coding alone does not solve the problem. Even with the improved wavelet I frame coding, the I frame vs. P frame size ratio is still large. For example, the wavelet coded I frame size drops about 40% as described above. I frame size is still big compared to the small P frame. The bit rate increase from distance factor of 10 is manageable, but, the very small distance factor will increase the bit rate dramatically. Therefore, efficient predictive coding is still needed to meet the low bit rate requirement.

Dependencies in the bitstream commonly form chains. Suppose three parts (sections) of a bitstream A, B, and C are inter-coded macroblocks or frames. Suppose C depends on B and B references A, then A, B and C form a dependency chain. Damage propagates when A B C are separated in different packets. Losing A damages B and the damage propagates to C. This problem can be solved by keeping the dependent parts in the same packet. Traditional packetization schemes, which are often based on frame or simple macroblock groupings like those used in [Smi93, MJ95, CTCL95], do not consider the dependency structure. An objective of the present invention is to analyze the dependency structure and to isolate and minimize the dependency between packets. In the following discussion, we investigate the P frame macroblock level dependency structure and propose a new packetization scheme that minimizes dependency between packets. The dependency isolation scheme prevents damage propagation, minimizing packet loss damage.

Dependency Structure and Dependency Isolation: The DCT-based transform coding scheme has two types of basic frames: intra-coded frame (I frame) and inter-coded frame (P frame). An intra-coded frame is coded independently of other frames. A predictive coded frame uses an I frame or another P frame as its reference frame. Only the difference is coded between the P frame and its reference frame. Correct decoding of a P frame relies on the availability of the reference frame.

At macroblock level, the dependency between two frames is actually a dependency between the macroblocks of the two frames. In a DCT-based video coding scheme like H.263, video frames are partitioned into macroblocks. Usually a macroblock covers a 16×16 pixel area. A macroblock is considered as one unit when coded. There are three different kinds of macroblocks in an H.263 sequence.

I block: I blocks are coded independently of other blocks. The macroblock is transformed, coded using DCT transform and entropy coding. I frames are made of I blocks. I blocks also appear in P frames when the motion estimation process cannot fend a good match with blocks in the reference frame.

Coded P block: P block is encoded by the difference between this block and blocks it references, along with its motion vectors.

Skipped P block: The block is skipped. The difference between this block and the block in the same position in the reference frame is measured by motion estimation to be below a threshold and the difference is regarded as zero. The decoding process simply copies the reconstructed image data from the corresponding block in the reference frame.

Decoding an I block is a decoding process which performs variable length decoding, inverse quantization and inverse inverse DCT transformation. For a P block, on the other hand, is a two-step process with a regular decoding and a reconstruction process. First the difference and motion vectors are decoded (decoding process), then the image data from the corresponding block in the reference frame is copied and added to the decoded difference (reconstruction process).

Figure 16:
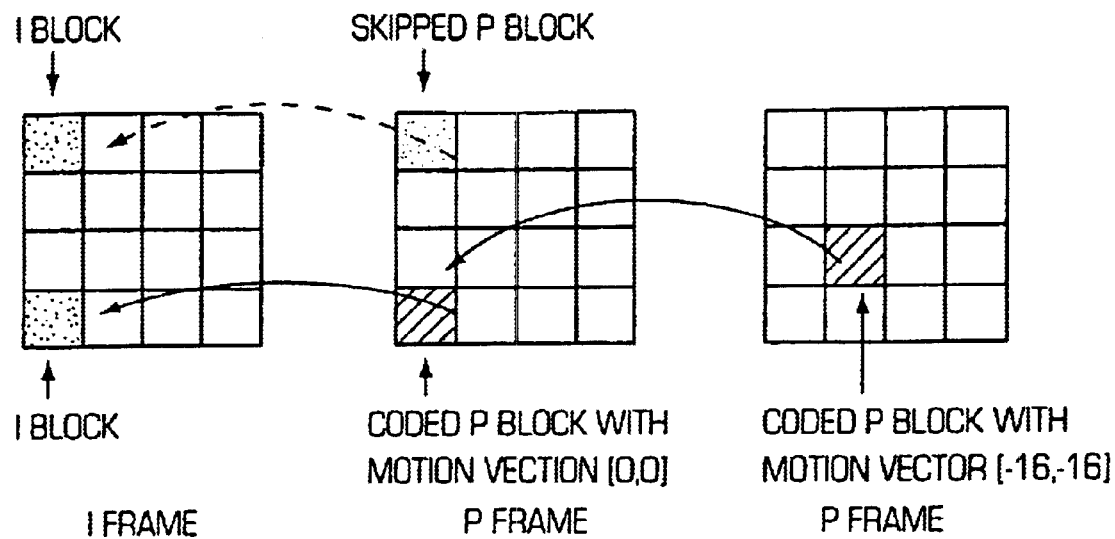
FIG. 16 is an illustration of a macroblock dependency structure.

FIG. 16 shows the macroblock dependency structure. Two blocks in the I frame are coded as I blocks and are used by two P blocks in the first P frame. The skipped P block in the first P frame does not have anything to be coded. It has only an indication bit specifying that it is a skipped P block and the decoding process can just copy the previous P block in the same position. The skipped P block also has zero difference and zero as motion vector. The coded P block in the first P frame codes the difference and has a motion vector [0; 0]. The coded P block in the second P frame has non-zero motion vectors and it depends on the coded P block in the first P frame. When the motion vector does not point to a macroblock boundary, the reference area can cover up to 4 macroblocks. Therefore, it references a range of blocks from 1 to 4. For example, in FIG. 17, a coded P block with motion vector [−8, −8] references to a area that covers four macro blocks in the reference frame.

Figure 17:
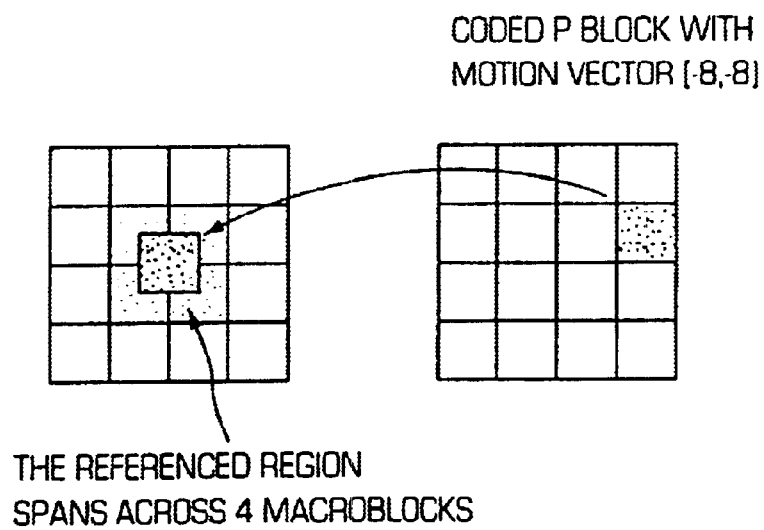
FIG. 17 is an illustration of a coded P block.
Figure 18:
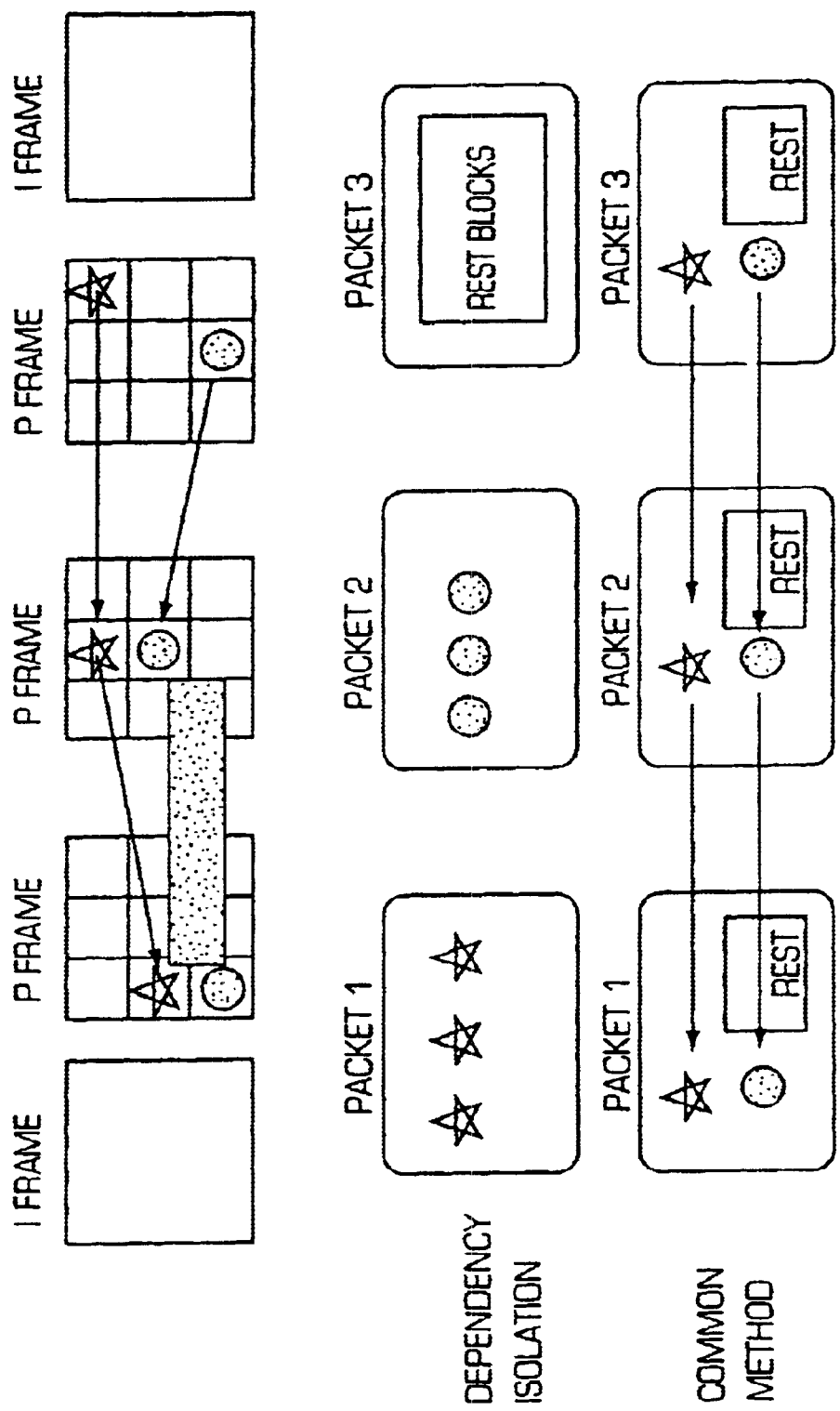
FIG. 18 is a comparative illustration of different packetization schemes.
Figure 19:
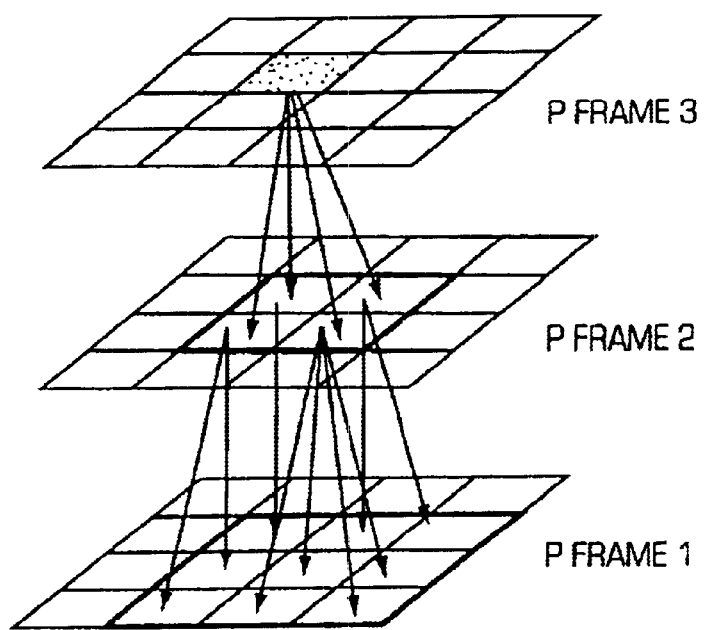
FIG. 19 is an illustration of the dependency relationship between macroblocks across frames as a tree.

At the macroblock level packetization can take into consideration the dependency structure and can minimize the damage caused by the packet loss. Under the same packet loss rate, a packetization scheme produces packets independent. The damage resulting from packet loss is localized to the lost macroblocks. This is better than arbitrary packetization scheme where loss of one packet not only renders its own macroblocks not decodable, but also damages to macroblocks that depend on it. FIG. 18 shows this concept. Assuming a simplified dependency structure as shown at the top part of the figure, two packetization methods are shown. The first, labeled "Common method" at the bottom of the figure, packetizes each P frame as one packet. The star and the dot elements in the original sequence still depends upon each other. Packet 3 relies on Packet 2 for correct decoding and packet 2 relies on Packet 1. In this packetization method, when Packet 1 is dropped, Packets 2 and 3 will be damaged. The second method, labeled as "Dependency isolation", packetizes the macroblocks according to their dependency relationships. All the star and dot elements are put into two separate packets. The packets preserve the dependency within the packet and eliminate dependency between packets. Therefore, the packets are independent of each other, so loss of one packet will not affect others. Unlike the first scheme, this method allows the same number of packets to get through under the same loss rate. Using the dependency isolation method all packets that arrive can be decoded correctly, while the packets delivered by the common method suffer from damage caused by the lost packets. Sort and Merge Packetization: The previous discussion involves the dependency isolation packetization method for a simplified dependency structure. The macroblock dependency structure of video coding schemes like 91 H.263 is much more complex. This is because motion vectors point to a macroblock region in the reference frame which may be across macroblock boundaries. Therefore a block may depend on multiple macroblocks, as shown in FIG. 17. When a group of P frames are to be analyzed, the dependency relationship between macroblocks across frames can be effectively described as a tree, as depicted in FIG. 19. The coded P block in frame 3 references 4 blocks in frame 2. The 4 blocks in frame 2 reference 9 blocks in frame 1. The coded P block in frame 3 represents a tree root and each of the other blocks involved can be regarded as a node in the dependency tree.

Figure 20:
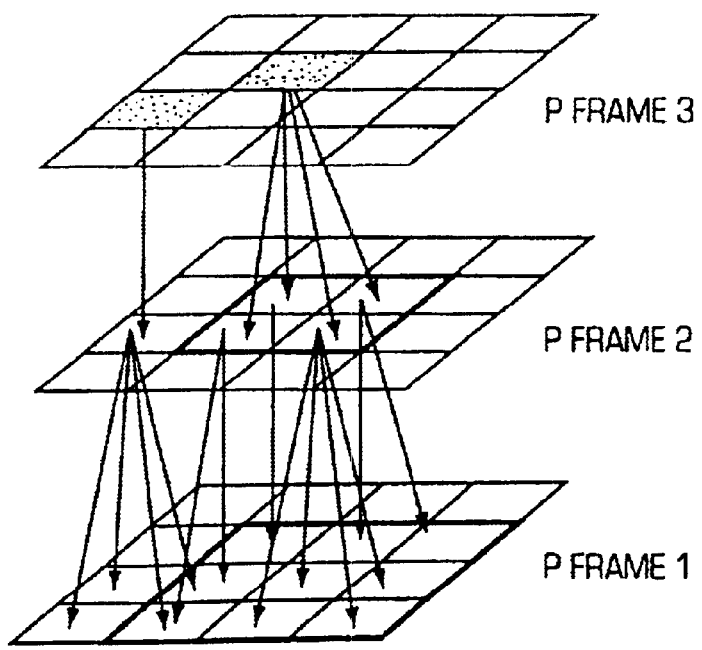
FIG. 20 is an illustration of some reference blocks being packetized multiple times.

The objective for the packetization algorithm is to packetize the trees so that losing one tree will not affect others. For a given group of P frames to be packetized, each macroblock of the last P frames may have a dependency tree. In an ideal situation, each dependency tree can be collected as one packet. For example, in FIG. 19, one packet can be organized from the dependency tree consisting of one macroblock in frame 3, four macroblocks in frame 2, and six macroblocks in frame 1. The decoding of the macroblock in the tree is self sufficient since the reference block of any block is within the packet. According to this scheme, each dependency tree will be put in one separate packet, resulting in simple packetization, completely eliminating dependency between packets. The disadvantage is that dependency trees may share nodes at their lower levels, causing some reference blocks to be packetized multiple times. This is shown in FIG. 20. Two dependency trees are formed for the two illustrated macroblocks in frame 3. While the two trees have distinct reference macroblocks at frame 2, they share two common reference blocks at frame 1. Packetizing each tree as one packet causes maximum redundancy. The solution in the other spectrum is to packetize all the trees in one packet to eliminate dependency and redundancy. This is not feasible because the packet has size limitation. The right packetization must lie between these two extreme cases to minimize dependency while maintaining small packet size.

Figure 21:
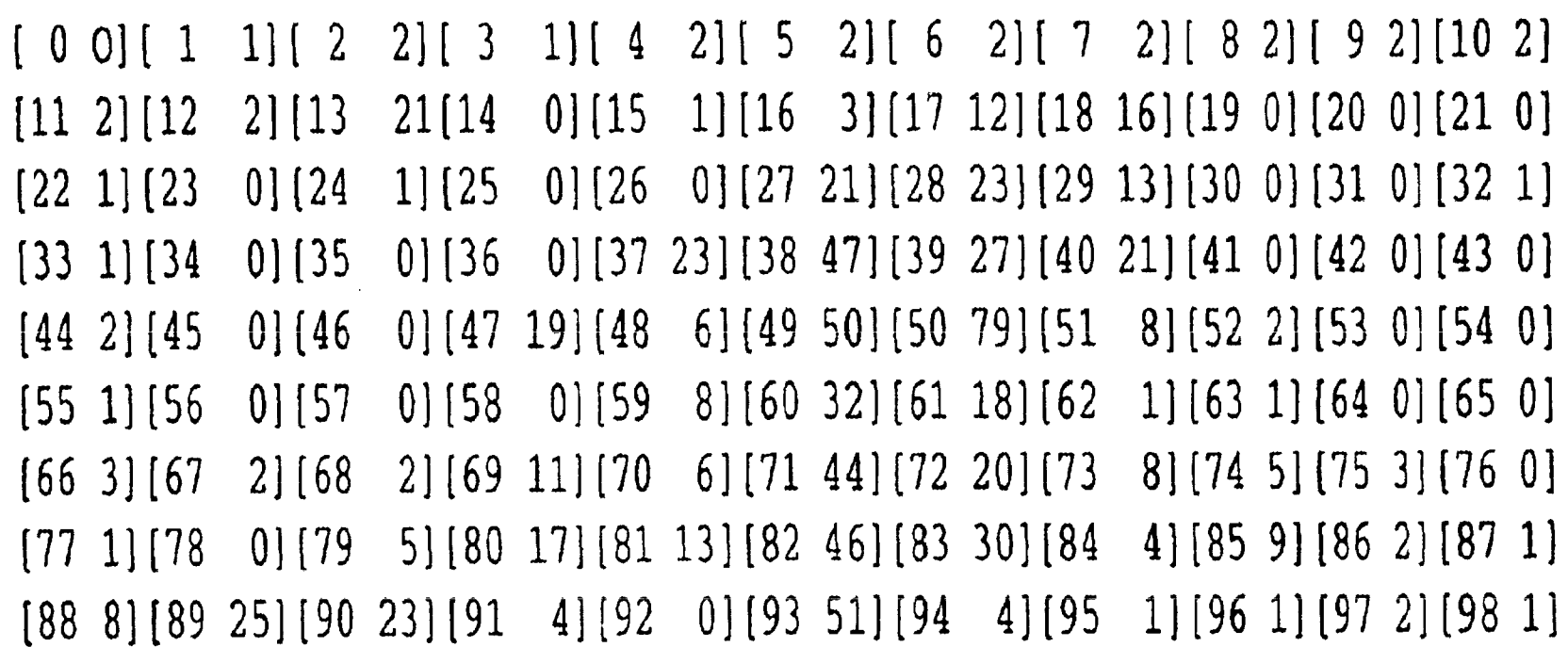
Figure 22:
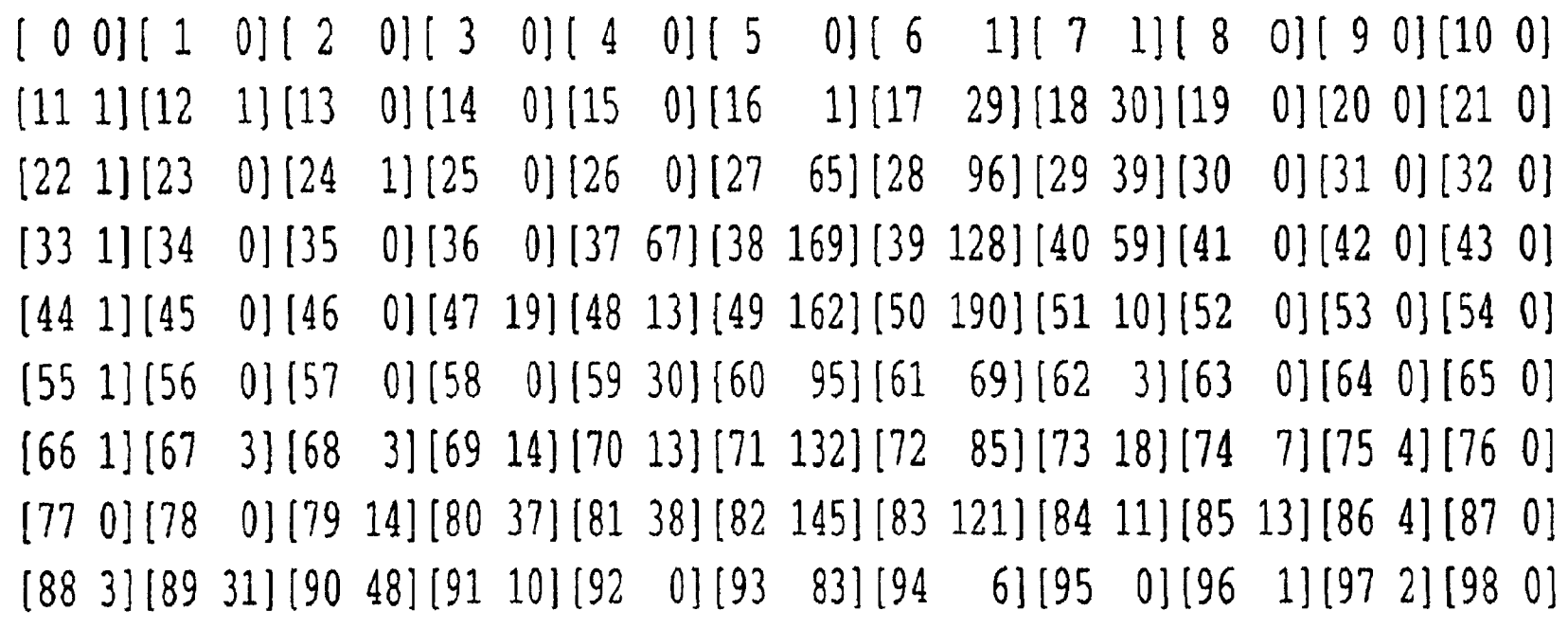

The number of common nodes between two dependency trees can be regarded as the number of dependencies between them. Given dependency trees A and B sharing m common nodes, if A and B are put into two different packets and redundant packetization is not allowed, then the dependencies between the two packets increase by m. Losing the packet with these common nodes will damage the other packet. The more common nodes A and B share, the more severe the damage will be. If A and B are put in one packet, then m dependencies between the two packets are eliminated. To minimize dependencies between packets, an intuitive approach would combine dependency trees with the largest number of common nodes into the same packet, eliminating the largest number of dependencies first. This is based on the observation that the most dynamic part of the frames, for example a moving object, tends to cause the largest dependency among the macroblocks that cover the movement. Grouping these dependency trees will eliminate most of the dependencies. This is illustrated by FIG. 21 and FIG. 22. In the first 10 frames of a Miss America video sequence coded in H.263 described above, the moving parts of the sequence may be the head and shoulders of the talking person. These moving parts are reflected in FIG. 21, where the macroblocks with large number of nodes in their dependency tree denote the motion. The motion is also captured in FIG. 22, where macroblock trees with more nodes in common with its neighbors indicate the moving parts.

According to the previous discussion, a packetization algorithm can eliminate most dependency if it can capture the moving objects and group the dependency trees covering the motion together into one packet. Since the number of nodes a tree holds in common with neighboring trees is a good indication of motion, a packetization algorithm can be designed to group dependency trees according to their common nodes. This motivates a sort and merge algorithm.

The sort and merge algorithm for packetization is shown in FIG. 23. The input is the dependency trees of macroblocks for the last P frame. The output is an array of packets, each consisting of one or more dependency trees. Each packet does not exceed a predefined packet size. At the beginning, each dependency tree is initialized as one packet. The main step of the algorithm is a loop of sort and merge until no more packets can be combined. During the execution of each loop, first the number of common nodes with neighbors for each packet are calculated, then the packets are sorted and the pair of packets is picked up for a merge. Two packets may be merged if they have the largest possible number of common nodes and their merge will not create a packet exceeding the predefined maximum size. The last step in the loop body is the update of neighboring relationships. After two packets are merged, they become one packet and their neighbors are combined. Packets neighboring either or both of the two merged packets are updated with the new neighboring relationship.

The packetization algorithm is a greedy algorithm, It picks packets to merge which have the largest number of dependencies, eliminating most dependencies between two trees first. Another feature of this algorithm is that it can capture the moving objects into packets. This is because dependency trees that form a moving object have the most common nodes between them. The packetization algorithm merges these trees together first, as a result, the dependency trees that form a moving object are merged and captured in one packet.

Implementation:

The packetization algorithm is applied to the H.263 coding scheme. The video sequence is segmented into groups. Each group has an I frame and a number of P frames determined by the distance factor. For example, a video sequence coded by the hybrid codec with distance factor of 10 will have one wavelet I frame and 9 H.263 P frames. The coded wavelet I frame as described above serves as a resynchronization point to limit the packet loss damage within each frame groups. In order to implement the sort and merge packetization, which essentially packetizes the macroblock along the horizontal direction, the H.263 video coding and decoding algorithms must be modified. These include:

Removing intra-frame dependency.
Coding the macroblock positions.
Decoding macroblock and reconstructing order.
Decoding skipped and lost macroblocks.

The modifications essentially change the coder and decoder of the H.263 coding algorithm from frame based encoding and decoding to macroblock based.

In the original H.263 codec, macroblocks within each frame are dependent because the motion vectors are predictively coded. This dependency makes horizontal packetization difficult as it presents dependencies between same level nodes for all the trees. Therefore trees cannot be separated without introducing dependencies between them.

The original H.263 is frame based and macroblocks are ordered according to their original position in the frame. The encoding process sequentially encodes each block and arranges them in a certain order in the coded bitstream. Once the frame size and macro block size information is available to the decoding process, it accordingly decodes each block and determines the block's position from the order of the blocks in the encoded bitstream. In such a scheme, the coding of macroblock position is implicit. When macroblocks are separated from each frame and reorganized into different packets, their original frame positions need to be carried to the decoder.

In the original H.263 algorithm, reconstruction of a macroblock follows immediately the decoding process. This is possible because in an orderly decoding of macroblocks, when a macroblock is decoded, all the macroblocks it needs for reconstruction are decoded already. This is a problem for a network based decoding scheme since when a macroblock is decoded, the macroblocks it needs might not have arrived yet.

In frame based encoding and decoding, a skipped P block is represented by 1 bit in the bitstream to preserve its position since there is no explicit coding of macroblock positions. This might not be necessary if there is another way to code the macroblock positions. The following subsections detail all of these modifications.

Figures 24, 26:
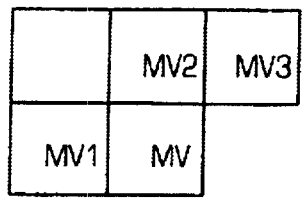
FIG. 24 is an illustration of coding of a motion vector using a predictor.
FIG. 26 is an illustration of the organization of macroblocks for one example dependency tree.

Removal of Intra-frame Dependency: The H.263 coding algorithm is highly optimized, in addition to improvements and fine tunings over the inter-frame frame coding. The coding of macroblocks within one frame is also improved. The motion vectors for neighboring macroblocks are coded with differential prediction. For each vector, a predictor is computed according to the motion vectors of its neighboring macroblocks. Then the difference between the motion vector and its predictor is coded. This is shown in FIG. 24 adopted from [Uni95], coding of MV, the current motion vector uses a predictor of the median of three other motion vectors of the neighboring macroblocks.

Predictive coding of motion vectors Predictive coding of motion vectors is validated because motion vectors for neighboring macroblocks tend to be similar. When an object is moving in one direction, all the macroblocks it covers have similar movement and similar motion vectors. Although predictive coding improves compression, it introduces more dependency between macroblocks. A macroblock has to rely on the neighboring macroblock for correct decoding. This can complicate the dependency tree packetization since macroblocks at the same frame can not be separated easily into different dependency trees.

To ease this problem, the H.263 coder is modified to disable the predictive coding of motion vectors. The overhead caused by this modification is not so significant. For the Miss America video sequence, the overhead for disabling the predictive coding of motion vector is less than 4%. Coding of Macroblock Positions: In traditional H.263 frame based coding, the macroblocks are coded and arranged in a row major manner. Skipped P macroblocks are represented in the bitstream by a one-bit indicator COD to retain its position information. The original implicit macroblock order is broken, when macroblocks from a group of P frames are horizontally packetized. The positions of each macroblock need to be coded and the position information needs to be represented. A naive way to code the position of each macroblock causes too much overhead. This is because for a typical 176×144 QCIF H.263 video stream, there are 11×9 macroblocks. The position will require 7 bits to encode. The total bits for coding the positions of macroblock of one frame is more than 86 bytes. This is significant because the average size for the P frame in the Miss America video sequence is 97 bytes. Predictive coding of the positions can be used, but the overhead is still too large.

The sort and merge packetization algorithm takes dependency trees as packetization unit. For each dependency tree to be packetized, the position of each macroblock can also be implicitly coded. Rather than relying on the orderly encoding and decoding of macroblocks in the frame based encoding and decoding scheme, this algorithm relies on the knowledge of the motion vectors. When a dependency tree is to be packetized, the motion vector of first macroblock on the top of tree is used to determine which macroblocks are needed from the next level. These macroblocks are inserted to the second level. For each macroblock present in the subsequent level, the macroblocks it depends on in the next level are inserted in the next level queue according to their order. When macroblocks are inserted into the queue, they are checked if the same macroblock is already in the queue. They are discarded if the macroblocks are already in the queue. FIG. 25 demonstrates such an organization algorithm and FIG. 26 shows the organization of macroblocks for one example dependency tree.

The positions of the macroblocks are implicitly coded in such an organization scheme and can be recovered at the decoder side. When given such a packet, can reverse the sorting and organization process to recover the macroblock order. The decoder needs only the position of the topmost block (root block), from which it can derive the positions for all other macroblocks by executing the same sort and insert algorithm. Therefore the position information is implicitly carried in the motion vector and the organization process.

When two or more merged dependency trees are to be put in one packet, the same algorithm can be used except that the position of each top level macroblock must be stored for starting position calculation. After the first dependency tree is packetized, a queue similar to that shown in FIG. 26 is constructed. When a macroblock from a subsequent dependency trees is to be packetized, the algorithm checks the queue to see if it has already been packetized, the macroblock is discarded if it has been packetized. Otherwise it is inserted into the queue and the macroblock is added to the packet. The depacketization and decoding is a reverse of the packetization process where the queues can be reconstructed.

This algorithm is notable for using its execution path as a means of compression. The macroblock positions are not carried by the natural ordering of blocks as used in the conventional H.263 scheme. The position information is not coded either to avoid the large overhead of extra data. Instead the information is carried in the sorting algorithm assisted by the availability of the motion vectors. The decoder and encoder use the same sorting algorithm. Packetization and depacketization algorithms are the reverse of each other. Consequently, the macroblock positions are carried in the sorting algorithm execution path. This is a means of compression using computation process rather than computation result. Conventional compression involves computation as well as computation results. Take DCT transformation for example: the compression is carried out in the transformation and quantization, but the computation path is not necessarily known to the decoding process. This is because the computation process produces a bitstream and the decoding process can look up its dictionary and recover from the bitstream. The compression of the macroblock positions, on the other hand, does not produce a bitstream; there is no information transmitted to the decoder for a dictionary lookup. Instead the information is all carried in the sorting algorithm.

Macroblock Decoding and Reconstruction Order: As stated previously, the decoding of the coded P macroblock is a two step process. First the difference between the macroblock and its reference blocks is decoded, then a reconstruct process occurs when the difference is added to the reference block pointed to by the motion vectors. Frame based H.263 decoding bundles these two steps together because all the reference blocks are available immediately after decoding. Packetizing the macroblocks horizontally eliminates the natural decoding order of the macroblocks. Since packets can be delivered out of order, reference macroblocks may not arrive in time for decoding. In such situations, the reconstruction step has to be delayed; decoding and reconstruction in the frame based decoding process must be separated. In the implementation reported in this thesis, all macroblocks are decoded (first step) when they arrive, however, the reconstruction process does not start until the frame is complete or a preset timeout happens when the frame is needed for display. The major modification of decoding process is the maintenance of the state information after decoding.

Decoding of Lost and Skipped Macroblocks: As mentioned earlier, when a macroblock is lost, the macroblock occupying the same position in the reference frame is copied to replace the lost one. This is preferable to leaving the lost macroblock blank; often the block in the same position of the reference frame more closely resembles the current block in both perceptual and numerical measurements than other blocks.

Figure 27:
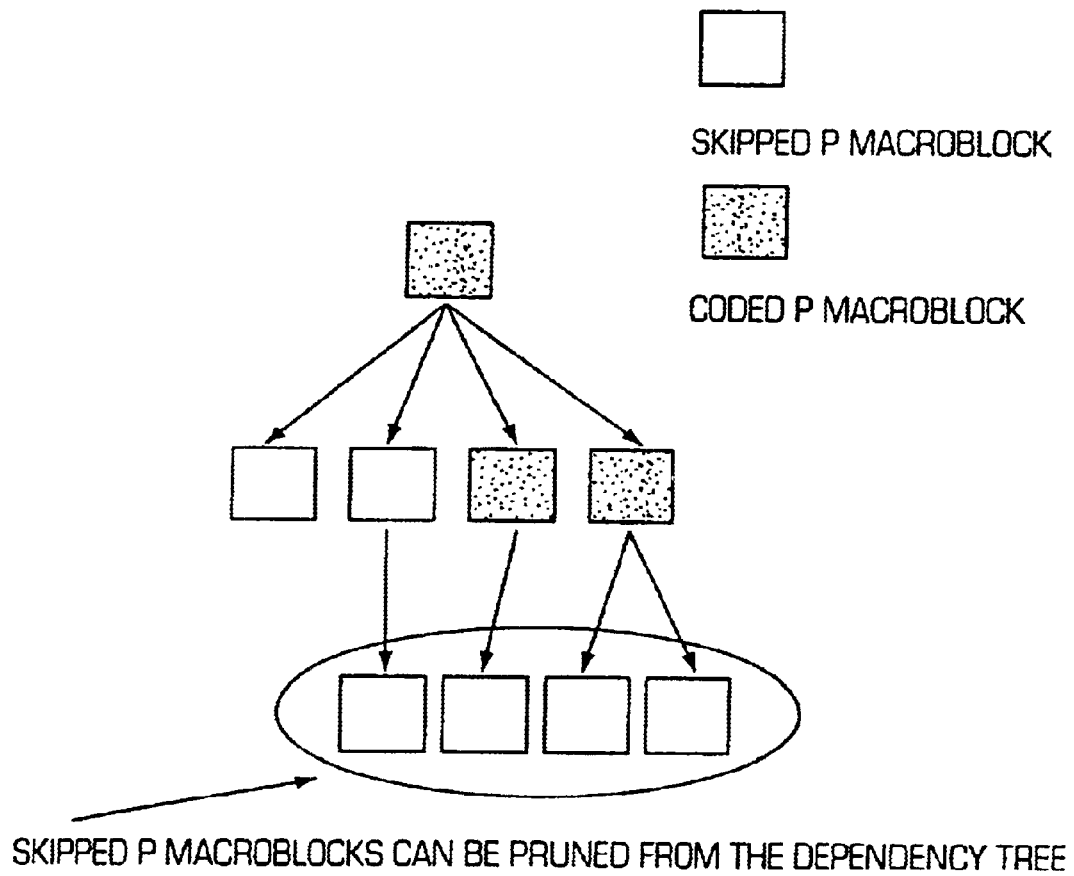
FIG. 27 is an illustration of how skipped macroblocks can be pruned from the dependency tree.

The skipped blocks in the frame based H.263 coding scheme are represented by one COD bit, signaling that these macroblocks are not coded. Reconstruction simply copies the corresponding macroblocks in the reference frame. These skipped macroblocks, when present in a dependency tree, still need to be coded to represent the macroblock position in the dependency tree. However, skipped macroblocks that are not part of the dependency tree can be discarded. Discarded macroblocks can be treated as lost macroblocks, so accuracy is not affected. FIG. 27 shows how skipped macroblocks can be pruned from the dependency tree. The circled nodes in the figure are skipped P blocks, since they are leaf nodes and do not carry position information, they can be pruned from the dependency tree and the decoder can treat them as lost blocks.

Results and Analysis

Video Sequence Selection: To test the efficiency of the packetization scheme, we selected 10 video sequences: 5 video sequences from the standard H.263 test sequence from bonde.nta.no, and 5 from the Vosaic (see, e.g., Vosaic LLC, "Vosaic Internet Video Delivery Products", http://www.vosaic.com/, 1996 (LLC96)) video library. The video sequences are selected intuitively by visual appearance to cover a wide range of videos, from low motion talking head videos to rapid motion music video and movie previews. Table 18 presents the selected video sequences and their descriptions.

TABLE 18

Collection of video sequences

| Video Sequence | # of Frames | Description |
| --- | --- | --- |
| Claire | 494 | News anchor talking |
| Miss America | 100 | A person talking |
| Suzie | 150 | A person talking on the phone |
| Trevor | 150 | Newscast with scene change |
| Jesus to a Child | 100 | Smooth music video |
| Forman | 400 | Talking with movement |
| Startrek | 300 | Planet view from a flying spaceship |
| Only Happy | 150 | Rapid changing music video |
| Fargo | 200 | Rapid motion movie preview |
| Energy | 250 | Illustration video with rapid scene changes |

The video sequences are analyzed and categorized according to their motion levels. We employ a simple and effective motion measure method. First we code the video sequence using the regular H.263 codec. Except for the first frame, every frame is motion estimated and coded as interframe, just as a regular H.263 P frame. Then we examine the blocks of each frame to see how they are coded. If a block is coded as a skipped P block, it means that the block has little or no change from the same block of the previous frame. If a block is coded as a regular P block, the change from last frame is small enough to be difference coded. If a block is coded as an I block, the block has changed so much that the motion estimation process failed to fend a similar enough block in the previous frame. The number of the blocks of each kind are counted and averaged. Finally the average P frame size is used to reflect the overall motion level; small frame size indicates dominant number of skipped P blocks. Large size results from a large number of coded P blocks and I blocks. In video sequences with similar P frame size, the average number of coded P blocks and I blocks are regarded as at the same motion level. Table 19 shows the result of this motion level measurement. The categorization confirms the visual perception.

TABLE 19

Categorization of the video sequences

| Sequence | Frames | Avg. P frame size (bytes) | Avg. # of P Blocks per frame | Avg. # of I blocks per frame |
| --- | --- | --- | --- | --- |
| Claire | 494 | 57 | 15.0 | 0.002 |
| Miss America | 100 | 61 | 21.4 | 0.0 |
| Suzie | 150 | 130 | 28.6 | 0.08 |
| Trevor | 150 | 175 | 42.99 | 0.57 |
| Jesus to a Child | 100 | 186 | 51.1 | 0.29 |
| Forman | 400 | 291 | 72.7 | 0.48 |
| Startrek | 300 | 588 | 60.7 | 13.03 |
| Only Happy | 150 | 597 | 40.9 | 22.64 |
| Fargo | 200 | 618 | 54.2 | 10.66 |
| Energy | 250 | 651 | 54.1 | 16.34 |

The measurement method divides the video sequences into three categories. The first three video sequences are talking head videos with low motion. P frame sizes are below 150 bytes, and no or very few blocks are coded as I blocks, indicating no scene change. The average number of P blocks is below 30, suggesting that the movement is slow. The second group of videos also has few I blocks, but it has substantially more coded P blocks than the first group. Although this group has no or few scene changes, each scene exhibits more motion. The videos in the third group have numerous I blocks and P blocks indicating many scene changes and high motion levels within each scene.

Figure 28:
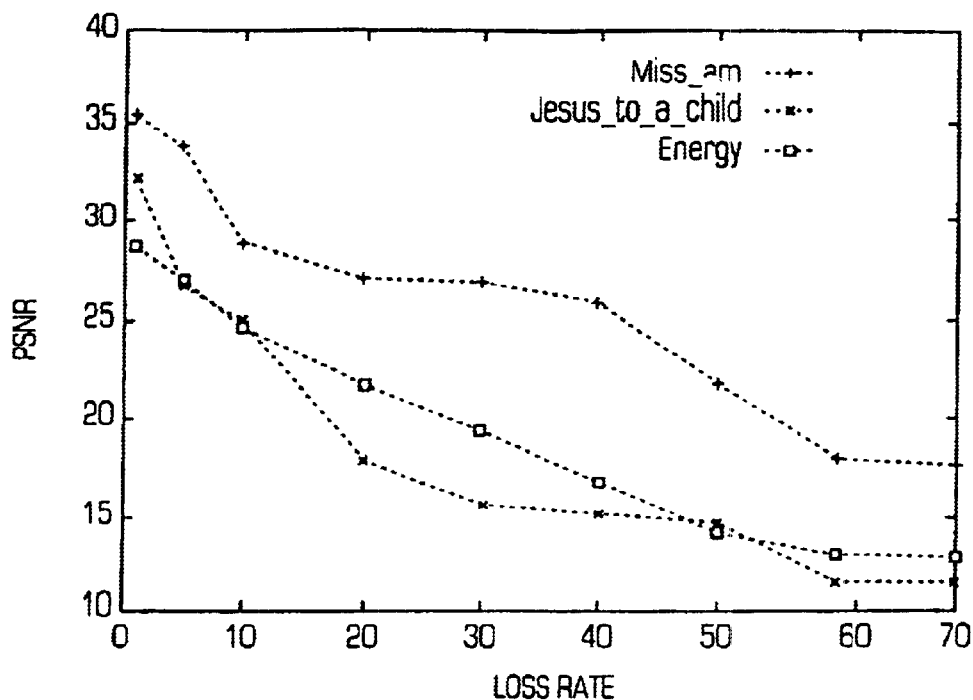
FIG. 28 is a plot of PSNR vs. loss rate.

We picked three videos from each category for test and measurement, including the Miss America sequence from the low motion category, the Jesus to 25 a Child sequence from the medium motion category and the Energy sequence from the high motion group. The three selected video sequences are first coded with regular H.263 codec. The first frame is coded as an I frame and all subsequent frames are coded as P frames. A frame based packetization scheme is used and the robustness is measured under different packet loss rates. Table 20 gives the result PSNR values which are also plotted in FIG. 28.

TABLE 20

PSNR values of the original H.263 sequences under different loss rates

| | Miss America | Jesus to a Child | Energy |
| --- | --- | --- | --- |
| 1 | 35.29 | 32.13 | 28.79 |
| 5 | 33.8 | 26.93 | 27.19 |
| 10 | 28.9 | 25.08 | 24.80 |
| 20 | 27.22 | 18.03 | 21.80 |
| 30 | 27.06 | 15.61 | 19.52 |
| 40 | 26.04 | 15.20 | 16.98 |
| 50 | 21.9 | 14.71 | 14.28 |
| 60 | 18.15 | 11.77 | 13.10 |
| 70 | 17.7 | 11.72 | 13.02 |

Figure 29:
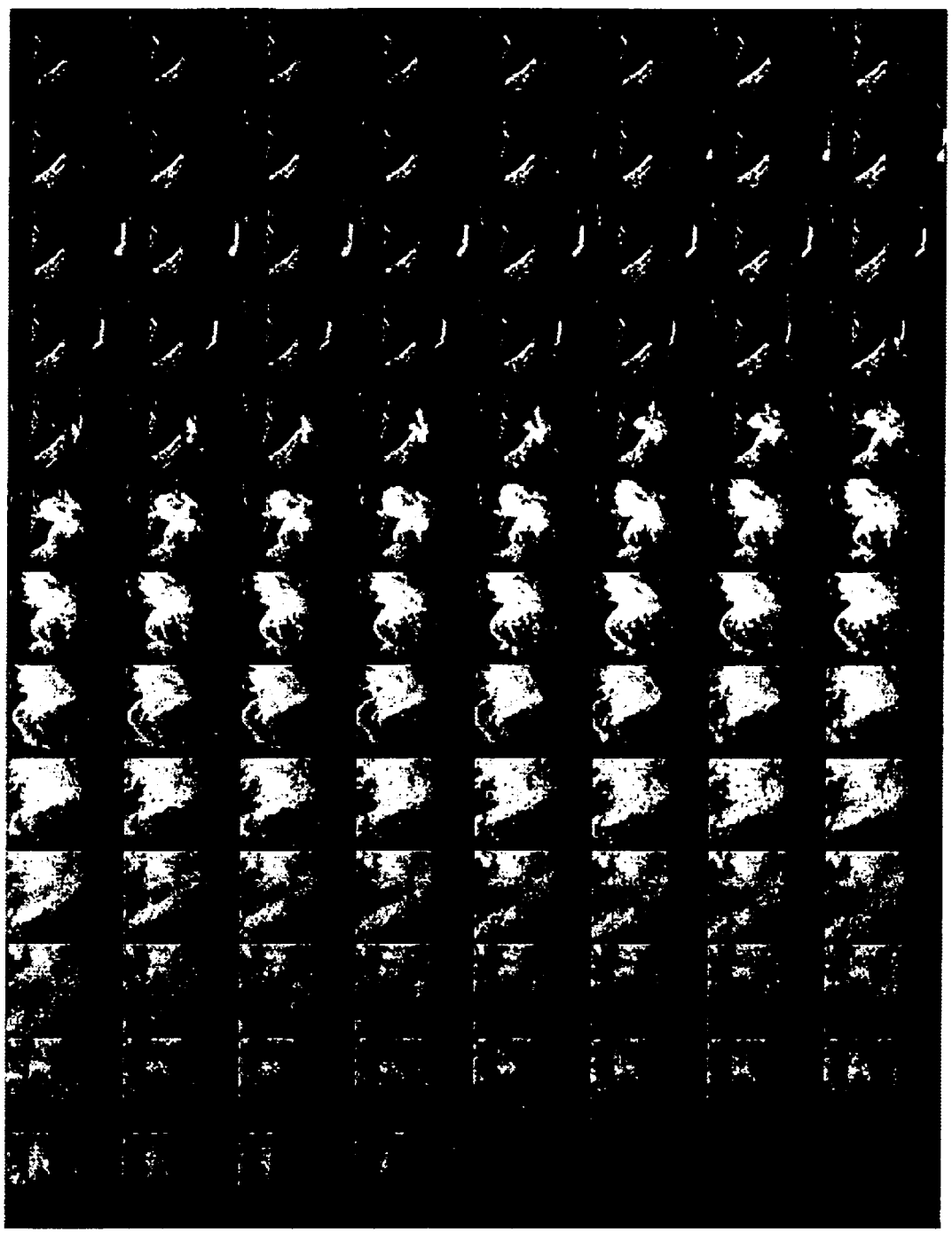
FIG. 29 is a sequence of computer-generated images.
Figure 30:
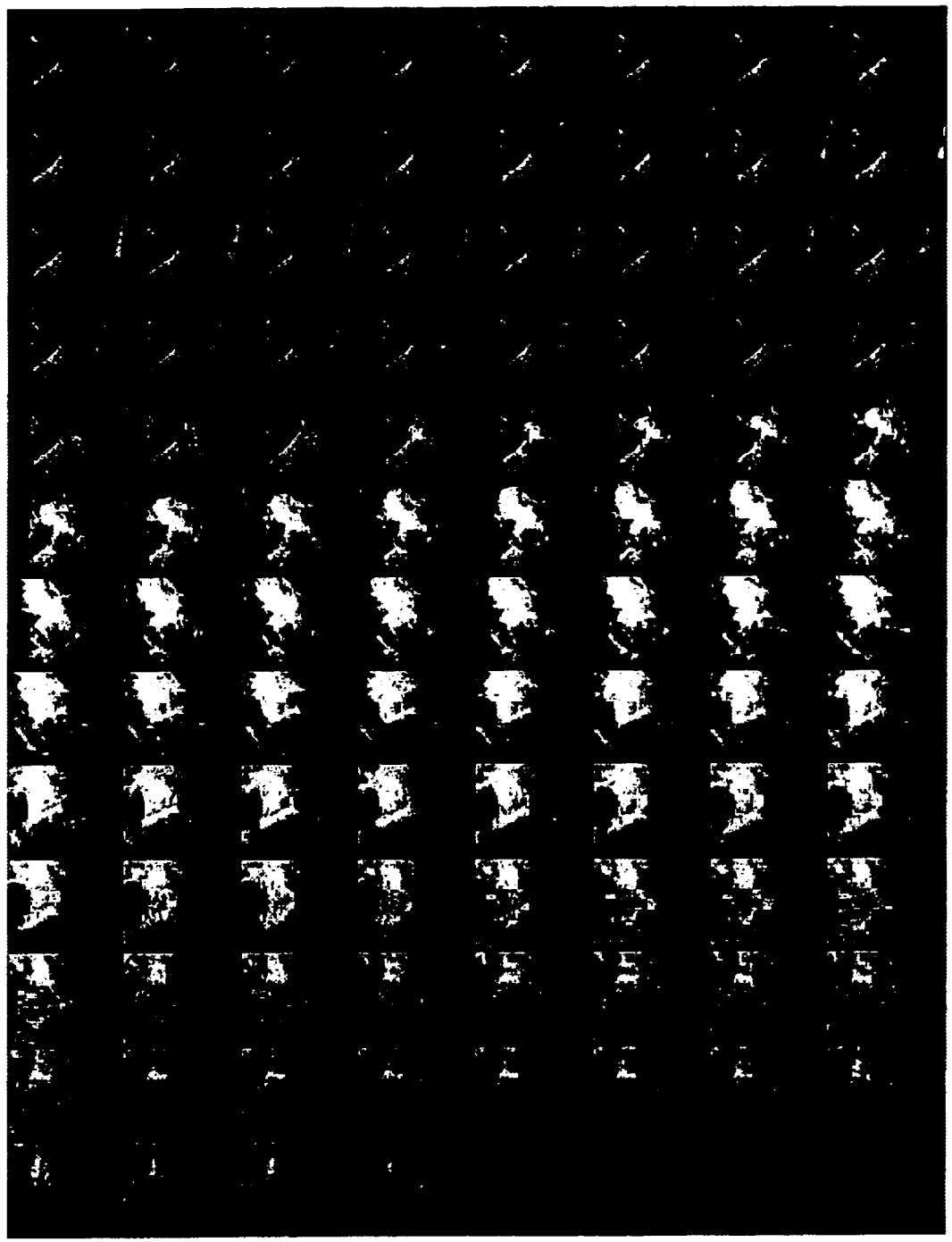
FIG. 30 is a sequence of computer-generated images.

The original coding and primitive packetization is extremely vulnerable to packet losses. Packet loss of more than 5% causes the medium and high motion level videos to deteriorate. The low motion video shows slightly better results but it still cannot tolerate packet loss of more than 10%. Of the three videos, the Miss America sequence shows the best quality for all the loss rates. Throughout the Miss America video sequence, the frames do not change much and the changes are not significant; therefore, loss of these updates has relatively less impact and the playback can maintain slightly better quality. For the medium and high motion videos, the two sequences have similar quality degradation for the loss rate in the range of 5% to 10%. However, for the loss rate in the range of 10% to 40%, the medium motion Jesus to a Child sequence has sharper quality degradation, which can be explained by the packet loss damage propagation. Propagation is most severe in this range, since medium motion video does not have many I blocks as in the high motion video. The Energy video sequence, meanwhile, exhibits consistent quality degradation because I blocks are distributed throughout the sequence. There is no dramatic curve as exhibited by the medium motion sequence. FIG. 29 shows the original Jesus to a Child video sequence. The result video sequence under 10% loss rate is shown in FIG. 30. The video sequence is severely damaged by the packet loss and propagation.

Figure 31:
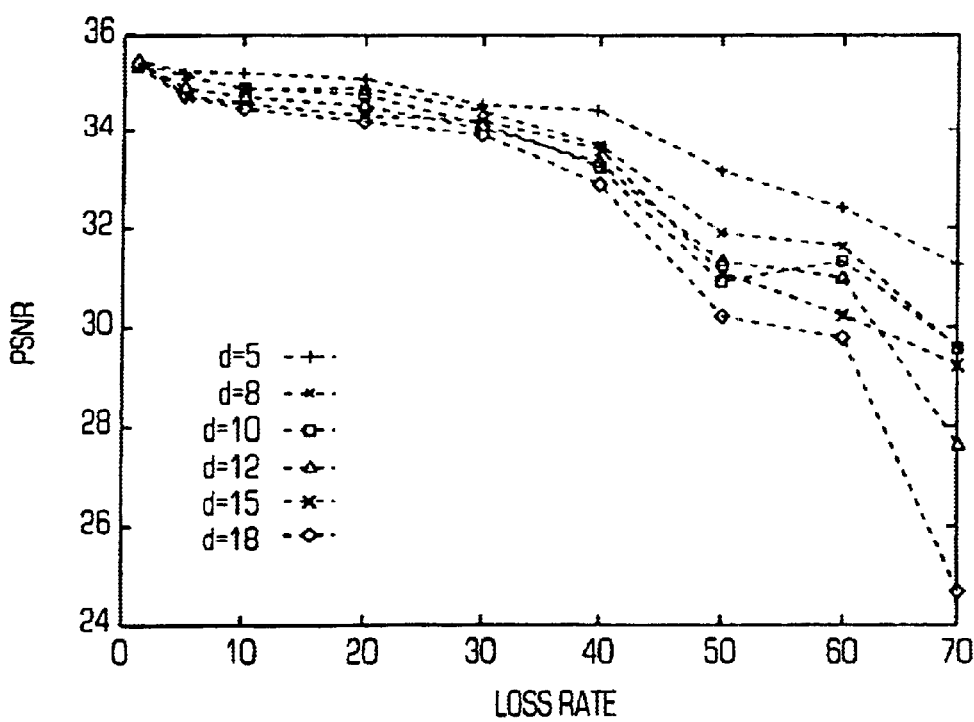
FIGS. 31–33 are plots of PSNR vs. loss rate for different distance factors.
Figure 32:
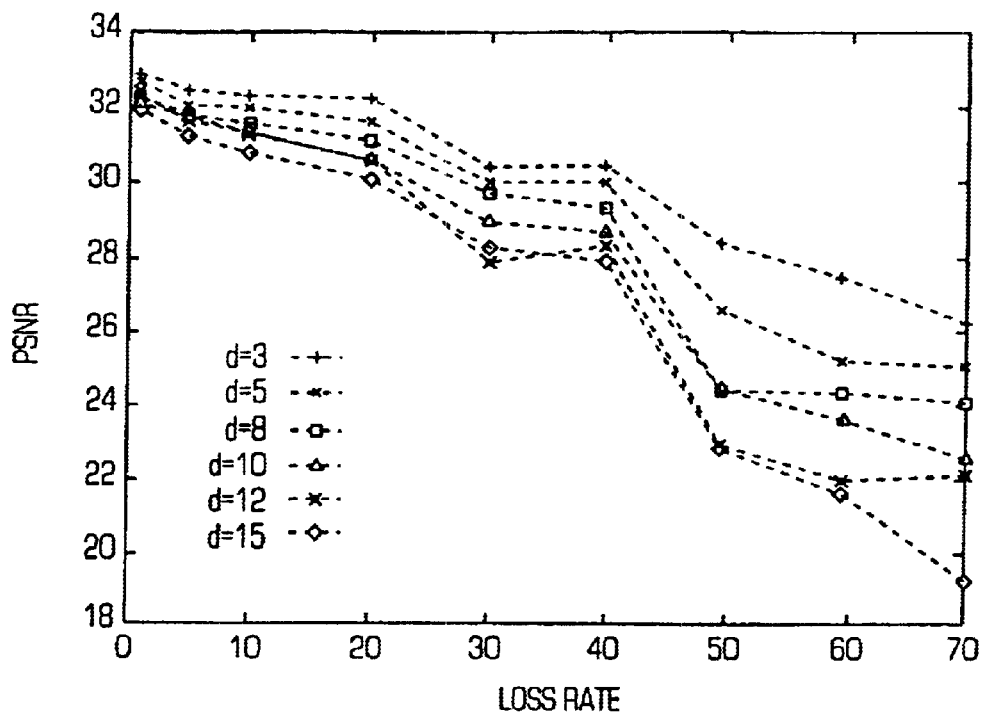
Figure 33:
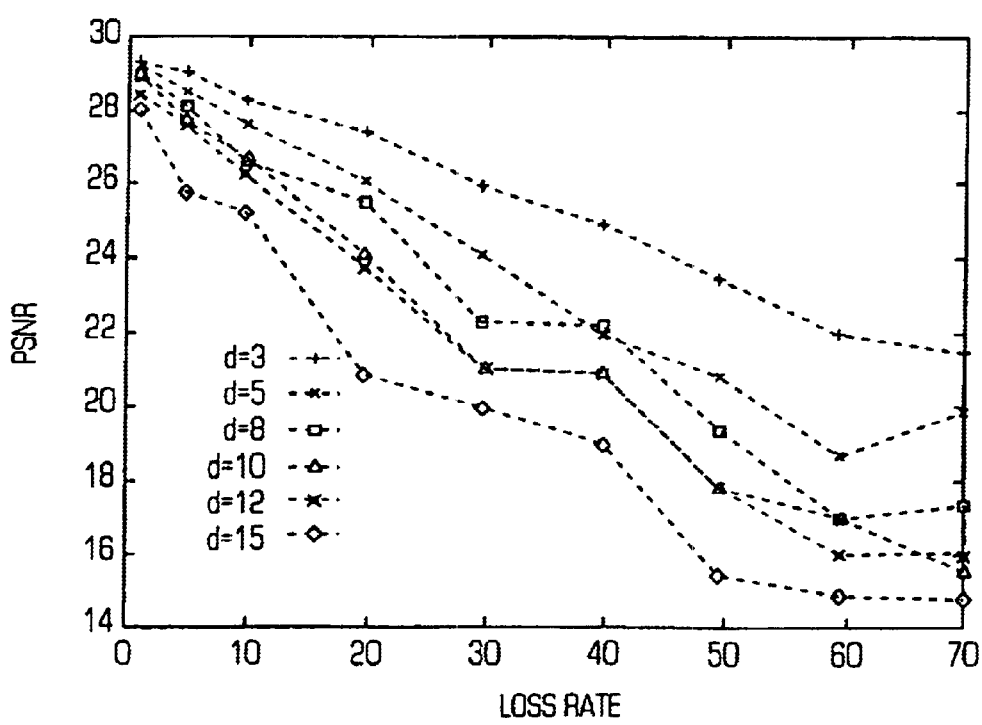

The three selected sequences are coded and tested using the new hybrid codec and dependency isolation packetization method. Different distance factors are used for each video. The video sequences are tested against different packet loss rates. For each test, since the video sequences have relatively few frames, for a certain loss rate and distance factor, the sequences are tested multiple times (10 times or more) with different random seed. The averaged results are presented in the following. Tables 21–23 show the results from using the hybrid coding scheme and the dependency isolation packetization scheme with different distance factors under different packet loss rates. FIGS. 31–33 plot these results. At each packet loss rate, the new scheme consistently outperforms the basic scheme by 2 dB to 10 dB. The new scheme shows better robustness and improves the overall playback quality dramatically.

TABLE 21

Result for the Miss America sequence

|   | 1 | 5 | 10 | 20 | 30 | 40 | 50 | 60 | 70 |
|---|---|---|----|----|----|----|----|----|----|
| D = 5  | 35.44 | 35.17 | 35.05 | 35.18 | 34.49 | 34.43 | 33.16 | 32.39 | 31.20 |
| D = 8  | 35.37 | 35.11 | 34.89 | 34.83 | 34.40 | 33.67 | 31.91 | 31.62 | 29.72 |
| D = 10 | 35.32 | 35.03 | 34.84 | 34.75 | 34.08 | 33.25 | 30.89 | 31.31 | 29.53 |
| D = 12 | 35.34 | 34.93 | 34.67 | 34.51 | 34.13 | 33.28 | 31.29 | 30.94 | 27.59 |
| D = 15 | 35.34 | 34.70 | 34.55 | 34.30 | 34.09 | 33.58 | 31.04 | 30.24 | 29.19 |
| D = 18 | 35.34 | 34.72 | 34.48 | 34.18 | 33.88 | 32.89 | 30.24 | 29.77 | 24.66 |

TABLE 22

Result for the Jesus sequence

|   | 1 | 5 | 10 | 20 | 30 | 40 | 50 | 60 | 70 |
|---|---|---|----|----|----|----|----|----|----|
| D = 3  | 32.88 | 32.44 | 32.29 | 32.19 | 30.36 | 30.35 | 28.23 | 27.29 | 26.01 |
| D = 5  | 32.67 | 32.05 | 31.95 | 31.57 | 29.95 | 29.90 | 26.43 | 25.05 | 24.87 |
| D = 8  | 32.28 | 31.78 | 31.52 | 31.06 | 29.65 | 29.22 | 24.25 | 24.15 | 23.88 |
| D = 10 | 32.35 | 31.61 | 31.35 | 30.49 | 28.92 | 28.57 | 24.19 | 23.47 | 22.37 |
| D = 12 | 32.08 | 31.70 | 31.28 | 30.53 | 27.85 | 28.23 | 22.75 | 21.80 | 21.92 |
| D = 15 | 31.94 | 31.24 | 30.80 | 30.01 | 28.21 | 27.82 | 22.70 | 21.47 | 19.07 |

TABLE 23

Result for the Energy sequence

|   | 1 | 5 | 10 | 20 | 30 | 40 | 50 | 60 | 70 |
|---|---|---|----|----|----|----|----|----|----|
| D = 3  | 29.32 | 29.05 | 28.32 | 27.43 | 25.89 | 24.89 | 23.41 | 21.97 | 21.48 |
| D = 5  | 29.17 | 28.50 | 27.59 | 26.06 | 24.05 | 21.99 | 20.80 | 18.65 | 19.87 |
| D = 8  | 28.93 | 28.14 | 26.57 | 25.50 | 22.28 | 22.16 | 19.34 | 16.94 | 17.35 |
| D = 10 | 29.09 | 27.62 | 26.63 | 24.02 | 21.03 | 20.86 | 17.85 | 16.95 | 15.53 |
| D = 12 | 28.39 | 27.72 | 26.19 | 23.72 | 21.02 | 20.88 | 17.85 | 16.01 | 15.96 |
| D = 15 | 28.08 | 25.71 | 25.17 | 20.84 | 19.94 | 18.97 | 15.38 | 14.94 | 14.83 |

Figure 34:
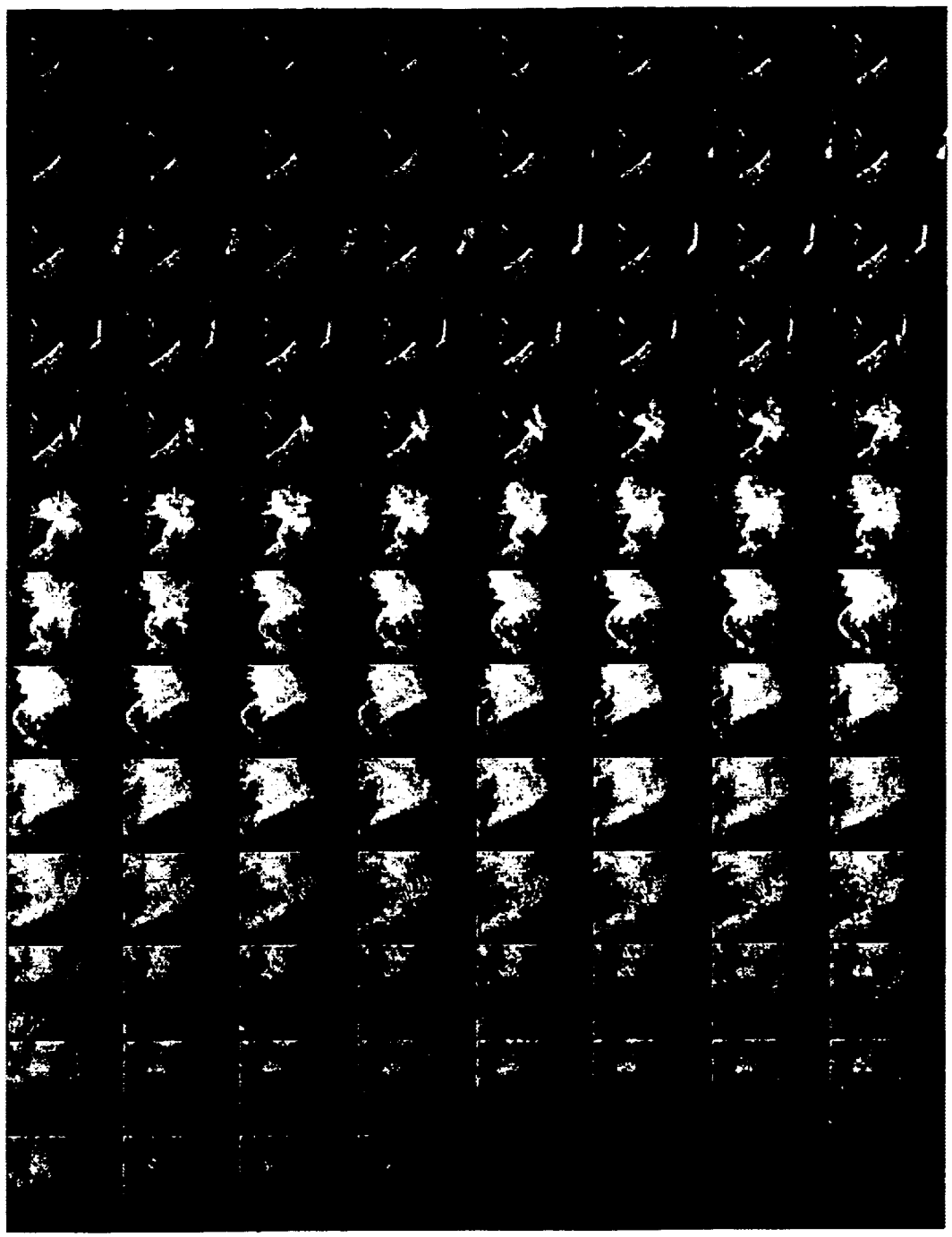
FIG. 34 is a sequence of computer-generated images.

With the new coding and packetization scheme, the tolerable packet loss rates are pushed up. With the basic scheme, the Miss America sequence can have reasonable quality at packet loss rate from 0% to less than 10%. With the new scheme, the range is extended from 0% to nearly 50%. For the medium motion Jesus to a Child sequence, the basic method experiences a sharp drop in quality for the packet loss range of 10% to 40%. The new scheme holds the quality drop up to 50%, so the acceptable playback quality can be achieved in the range from 0% to nearly 40%. FIG. 34 shows the effects to the Jesus to a Child sequence under 40% loss with the new scheme. This shows that the packetization scheme effectively controls the loss damage propagation. Even with the high motion video sequence Energy, reasonable playback quality can be achieved in the range of 0% to 20%, improving the original 0% to 5% interval.

Figure 35:
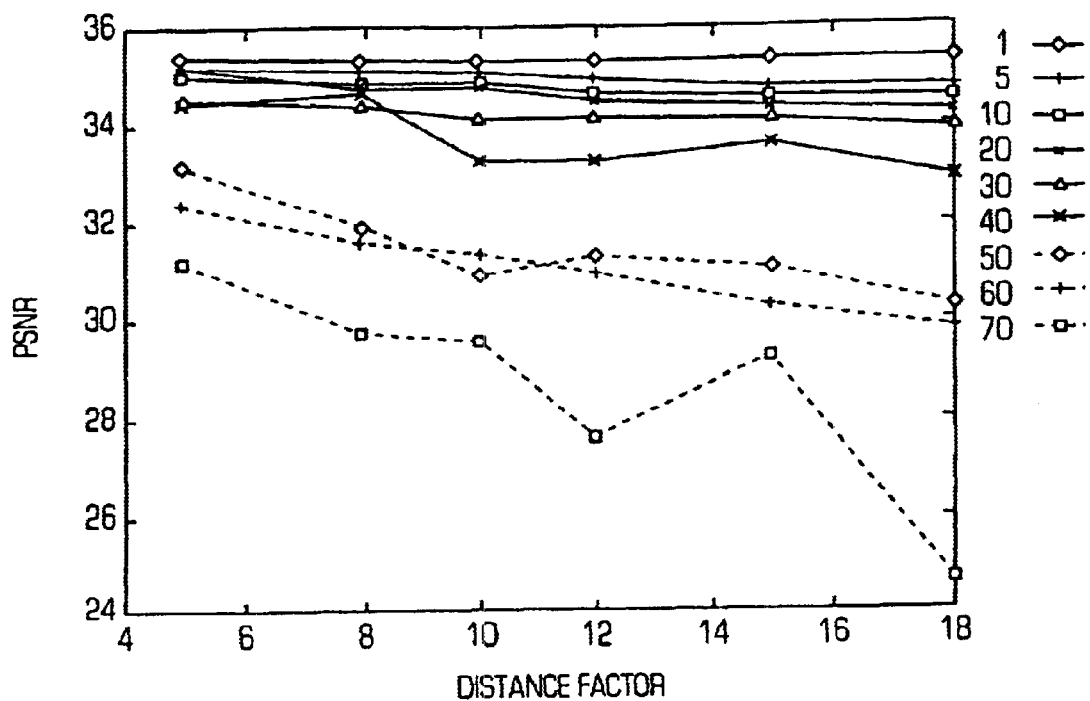
FIGS. 35–37 are plots of PSNR vs. distance factor.
Figure 36:
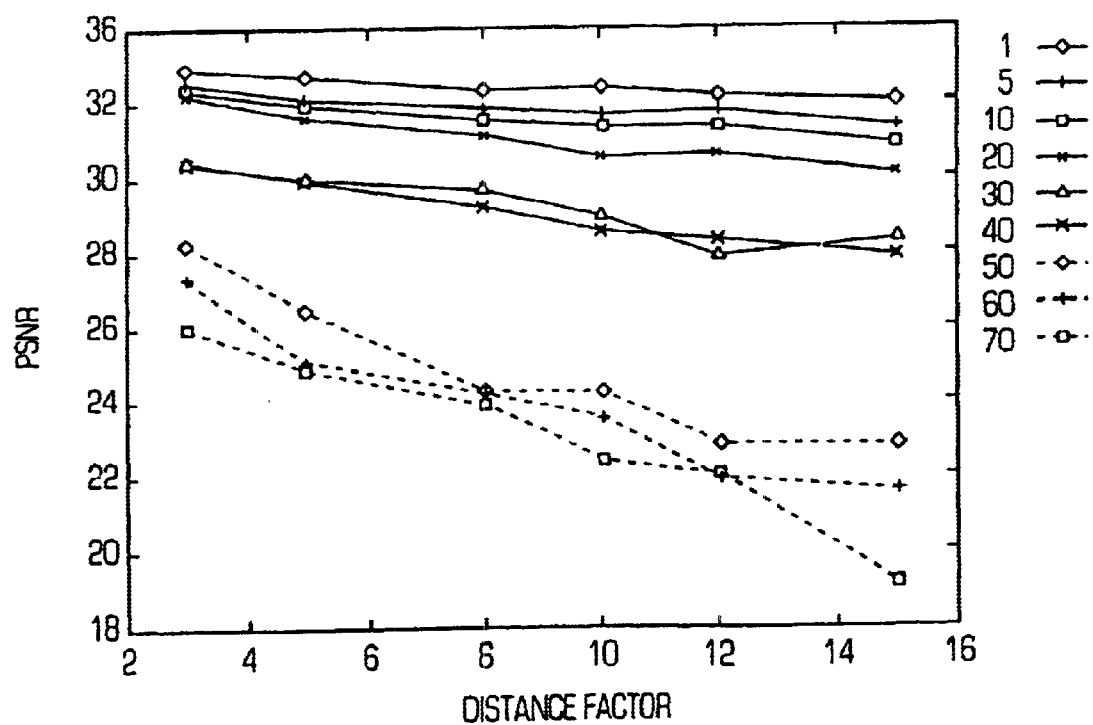
Figure 37:
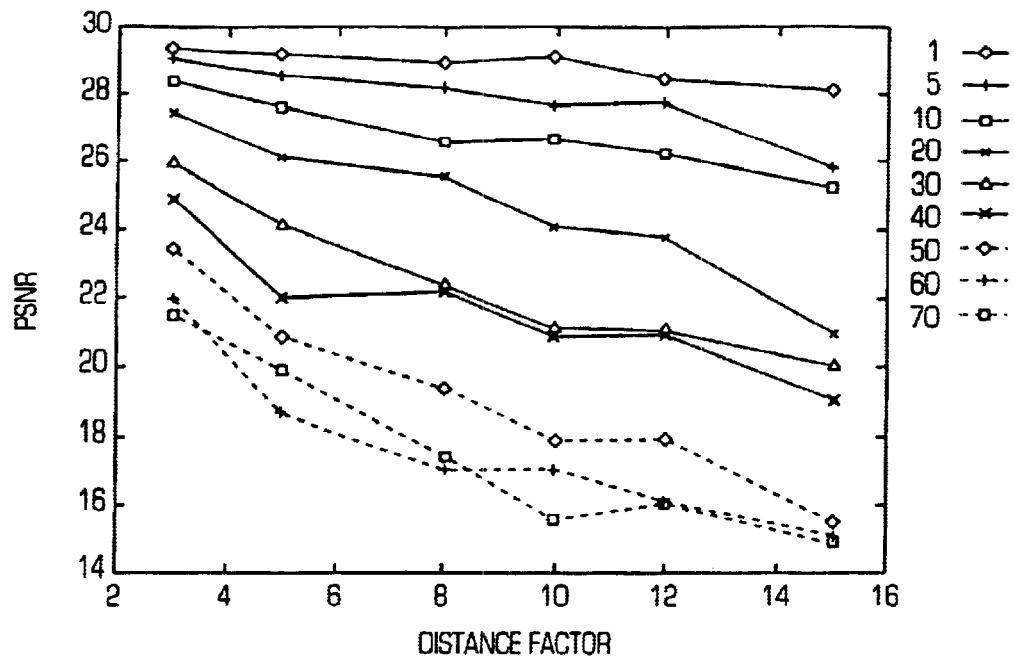

Distance Factor: Distance factor determines how often an I frame is coded in the bitstream: The more I frames in the bitstream, the more robust the bitstream is against packet loss. However, small distance factors increase the bit rate because I frames are larger than P frames. Therefore small distance factors yield large bit rates. For example, as described earlier, changing the distance factor in the Miss America video sequence from 10 to 5 increases the bit rate by 43%. Under certain bit rate restrictions, selecting a reasonable distance factor is important. FIGS. 35–37 show the PSNR measurements of the three test video under different loss rates as a function of the distance factors. For a given loss rate and a desirable PSNR value, a distance factor can be determined. For example, if a PSNR value of 34 is desired for the Miss America video sequence under 40% loss rate, the distance factor should be 9 or less. For the Energy video sequence, if we know that the network packet loss rate is around 10%, to get a desirable quality of 28, a distance factor of 4 or less should be used.

From FIG. 35 to FIG. 37, it can be seen that under some packet loss rates, especially low packet loss rates, the quality measurements are relatively similar for different distance factors. This is true for the Miss America video under a loss rate of 30%, and the Jesus to a Child video under a loss rate of 10%. As the motion level and loss rate increase, the difference in PSNR measurements is more and more obvious for different distance factors. From this analysis, we can conclude that given a video with low to medium motion level, under low packet loss rate, the distance factor can be chosen to be produce low bit rate bitstream. The relevance of distance factor and playback quality increase as the motion level of the video and the packet loss rate increase. Under such circumstances, the distance factor depends on motion level and packet loss rate.

A description has been given of effective macroblock packetization. Traditional packetization methods are frame or GOP based and may introduce a high degree of dependency between packets. When packets are lost, damage may propagate to other arrived packets. A new method, which is based on the macroblock level dependency analysis, packetizes macroblocks of a group of P frames horizontally. The resulting packets have minimal dependency between them, which minimizes loss damage.

Figure 38:
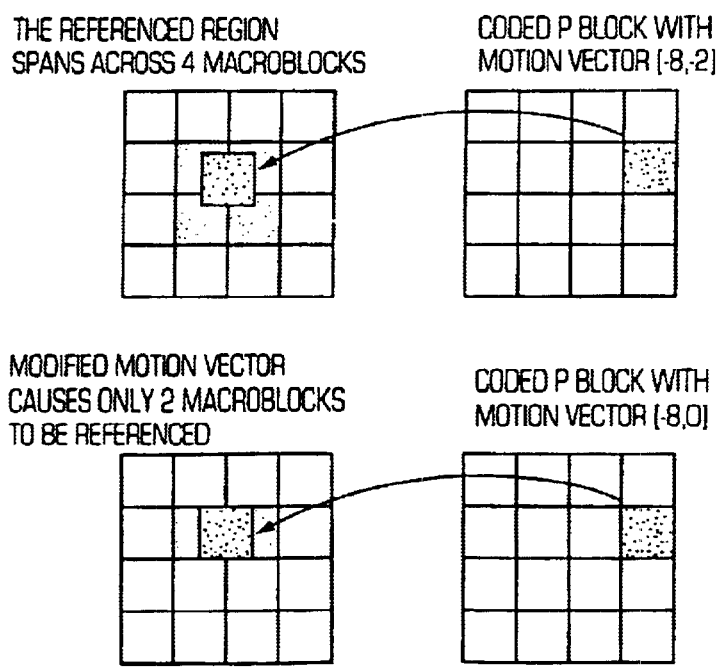
FIG. 38 is a comparative illustration of two different packetization schemes.

The packetization algorithm relies on the macroblock level dependency structure, which normally forms dependency trees. The more complex the tree structure, the more dependency it will introduce between packets. The dependency tree is maximum for one macroblock if its motion vector points to a region covering four macroblocks. Another possible way to reduce dependency between packets at the coding level is to restrict the motion vector so that fewer macroblocks in the reference frame will be involved, as shown in FIG. 38. However this restriction may result in non-optimal motion vectors for compression ratio. Again this is actually a tradeoff between compression ratio and facilitation of the coding scheme for packetization and transmission. This argues for an encoding scheme that takes the network transmission into consideration and provides flexibility for the packetization process.

Transmission of digital video over the Internet is important but difficult. It requires low bit rate and robust encoding and transmission. Traditional research in video coding has focused on compression ratio and compression efficiency. Achieving a higher compression ratio has been considered an important if not the exclusive objective in most coding schemes. As a result, most of the coding schemes are very vulnerable to transmission error and packet losses. Research and development in the network transmission of video over the Internet have either failed to meet the low bit rate requirement or have been limited by the traditionally efficient but less robust coding schemes. As a result, Internet video has suffered from poor transmission and playback quality.

A goal of the present invention is to produce a low bit rate and robust video coding and transmission scheme. This thesis makes three major contributions to the field. First, it proposes a practical approach to address the transmission problem by characterizing the behavior of Internet video traffic. Through WAN experiments, video traffic experiments are conducted to study the network transmission delay and loss behavior. The results are then used to guide the design and implementation of efficient coding and transmission schemes for digital video over the Internet.

A second major contribution of the present invention is an efficient macroblock level packetization scheme that minimizes the packet loss damage. Traditional packetization algorithms are frame or GOB based. They do not take into consideration the dependency between macroblocks. The resulting packets may be heavily dependent on each other. As a result, when some packets are lost during the transmission, the arrived packets may also be damaged since they may need to use the lost macroblocks as references. The packetization scheme described in this thesis breaks the natural macroblock ordering and packetizes them according to their dependency relationships. It packetizes macroblocks horizontally and minimizes the dependency between packets. When packets are lost, the damage is minimized. The packetization algorithm introduces minimum bit rate overhead by implicit coding of the macroblock positions, and also avoids transmitting skipped P macroblocks. The scheme overcomes a number of difficulties incurred by macroblock packetization and decoding by modifying of the original frame based encoding and decoding scheme to be more macroblock level based. By analyzing the video sequence at a macroblock level, we found that a coding scheme based on macroblocks provides efficiency, flexibility, and robustness for network transmission.

A third contribution of the present invention is the design and implementation of a hybrid wavelet/H.263 coding scheme. Robust transmission requires more I frames in the video sequence to provide resynchronization points. Through the use of more advanced options, H.263 is very efficient in inter-frame coding. However, the coding of the I frame has not been improved much and the I frame is usually large in size. The discrepancy between I frame size and P frame size prevents the insertion of the more I frames in the video sequence, since large I frame size increases the bit rate dramatically. Wavelet coding, on the other hand, is efficient for still image and intra-frame codings. However, it has difficulty performing the inter-frame and difference coding. Wavelet is also more computation intensive than simple DCT-based codings. This invention implements a hybrid coding scheme using wavelet for I frame coding and H.263 for inter-frame coding, which is ideal for low bit rate and robust transmission. The hybrid coding scheme is implemented to reduce the bit rate while increasing the robustness of the coding scheme.

There are a number of directions along which future work can be done. Macroblock level analysis and packetization provide an efficient way for packetization and transmission of video over the next generation network. Application to Priority Based Networks: The present application follows the path from characterizing Internet's video traffic to designing the coding and packetization schemes for transmitting video. Though the coding and packetization scheme have been specifically designed for the Internet, they are applicable to other situations as well.

The Internet is likely to evolve to a large capacity, bandwidth management network. Already RSVP [ZDEZ93] has proposed developments along this line. Because strict and total management of the global network will incur too much overhead, the Internet is likely to be a hybrid network whose bandwidth is to split into managed and best effort sections. In either or both the situations, the packetization scheme based on macroblock provides benefit for the split of the video stream into a higher priority layer where important information is carried and an enhancing layer where improvement resides. The prioritized portion can be transmitted in the allocation bandwidth band and the enhancing layer in the best effort channel. Macro block packetization can split the video stream into two parts, which can minimize the damage of the packet loss from the best effort band.

Macroblock Level Analysis in Object Identification: Macroblock dependency analysis as described above is useful in identifying moving objects and moving regions. The identification of the moving objects enables a number of interesting applications like video hyperlinks and layered object coding and transmissions.

Video hyperlinks allow interactive and non-linear access to video data. Macroblock level motion vector analysis allows the identification of object outlines. The outlines can be associated with a hyperlink, which upon mouse click leads to the another video or other hyper documents. Traditional video hyperlinks like those implemented in Hyper-G (see, e.g., K. Andrews, F. Kappe, and H. Maurer, "Hyper-G Network Information System", UCS, 1(4), April 1995, and CTCL95 cited above) rely on user assistance in identifying interesting objects. Usually the identification is primitive. Interesting objects, often moving objects, are given rectangle outlines to indicate they are hyper objects. The process for making these outlines is not easy. With the help of the macroblock level motion identification, it can assist the user and automate the process.

A second application is object layering. Current trends in video coding allow layering of objects in the video sequence. The object can be coded using different resolution and compression ratios [Chi96]. While this idea comes from the traditional video coding camp to increase compression ratio, it is also useful in video transmission. Layered object coding allows differentiation of objects and the packetization and transmission algorithm can assign different priority to the objects depending upon which are of current interest. It also preserves bandwidth. This can be exemplified by a situation where a person is talking in front of a black board. If the person is of current interest, the transmission algorithm can assign higher priority to the packets which capture the movement of the person. On the other hand, if the writing on the board is important, then packets capturing the board are assigned higher priority and the packets capturing the person can be dropped.

What is claimed is:

1. A method of transmitting video including a sequence of frames each containing a plurality of blocks, comprising the steps of:
    organizing said video into plural packets and transmitting said packets;
    selecting blocks in at least two of said frames which have coding dependencies; and
    transmitting said selected blocks within a single packet.
2. A method, comprising:
    providing video for transmission in a plurality of transmission packets, the video including a sequence of frames, the frames each including a plurality of blocks;
    identifying a dependency between two or more blocks of different frames; and
    transmitting the two or more blocks in a single one of the packets.
3. The method of claim 2, wherein the number of the blocks are selected based on a dependency tree.
4. The method of claim 3, further comprising sorting and merging the transmission packets based on the dependency tree.

5. The method of claim 2, wherein the frames are encoded into one of at least two different types including an I frame type and a P frame type, and the number of blocks are selected from two or more frames of the P frame type.

6. A method, comprising:
providing a sequence of several video frames for transmission;
classifying each of the video frames of the sequence into one of at least two different types, the different types including a first type and a second type;
coding the video frames of the first type with a wavelet transform-based coding scheme and the video frames of the second type with a DCT-based coding scheme to provide a coded video sequence; and
transmitting the coded video sequence.

7. The method of claim 1, further comprising coding the sequence of frames to provide an encoded video sequence and packetizing the encoded video sequence to provide the packets.

8. The method of claim 1, further comprising reconstructing the video from the packets including substituting a received block for a first one of the frames of the sequence for a lost or skipped block of a second one of the frames of the sequence.

9. The method of claim 1, further comprising evaluating interframe dependency from a plurality of the blocks selected from two or more frames and identifying a moving image object from said evaluating.

10. The method of claim 1, wherein said transmitting is performed on a network subject to loss of one or more of the packets and delivery of one or more of the packets in an order different than said transmitting.

11. The method of claim 10, wherein the network is the internet.

12. The method of claim 2, further comprising selecting the number of the blocks based on motion of an image object defined by the video.

13. The method of claim 2, further comprising reconstructing the video from the packets including substituting a received block for a first one of the frames of the sequence for a lost or skipped block of a second one of the frames of the sequence.

14. The method of claim 6, wherein the video frames of the second type are each coded with reference to content of at least one other of the video frames.

15. The method of claim 14, wherein the video frames of the first type are each coded independent of any other of the video frames and the video frames of the first type require transmission of more information than the video frames of the second type.

16. The method of claim 15, wherein the first type of the video frames are I frames and the second type of the video frames are P frames.

17. The method of claim 6, wherein the video frames of the first type are fewer in number than the video frames of the second type for the sequence of the video frames, and said classifying includes designating at least two of the video frames of the second type between each of the video frames of the first type relative to the sequence of the video frames.

18. The method of claim 6, wherein said coding of the video frames of the second type includes compensating for image motion.

19. The method of claim 6, further comprising relating a number of wavelet transform coefficients with a zero tree during performance of said coding of the video frames of the first type.

20. The method of claim 19, wherein said relating includes comparing each of a number of nodes of the zero tree to a threshold.

21. The method of claim 6, wherein the video frames each include a plurality of blocks, said coding includes selecting a first block of a first one of the frames and a second block of a second one of the frames based on a dependency between the first block and the second block, and said transmitting includes transmitting the first block and the second block within a single transmission packet.

22. The method of claim 21, wherein the first one of the frames and the second one of the frames are both of the second type.

23. A video transmission system, comprising: a sending device operable to encode video from a sequence of video frames into a plurality of transmission packets, the video frames each being comprised of a plurality of video blocks, said sending device being operable to identify a dependency between two or more of the video blocks of different frames of the sequence and transmit the two or more blocks in a common one of the transmission packets.

24. The system of claim 23, wherein said sending device is operable to select a number of the blocks based on a dependency tree.

25. The system of claim 24, wherein said sending device is operable to sort and merge the transmission packets based on the dependency tree.

26. The system of claim 23, wherein said sending device is operable to encode the frames into one of at least two different types including an I frame type and a P frame type, and the two or more blocks are selected from two or more frames of the P frame type.

27. The system of claim 23, wherein said sending device includes means for selecting the two or more blocks based on motion of an image object defined by the video.

28. The system of claim 23, wherein said sending device includes means for evaluating interframe dependency from a plurality of the blocks selected from two or more frames and identifying a moving image object.

29. The system of claim 23, further comprising a receiving device operable to reconstruct the video from the packets.

30. The system of claim 29, wherein said sending device and said receiving device are coupled together by a network.

31. The system of claim 30, wherein said network is subject to loss of one or more of the packets and delivery of one or more of the packets to said receiving device in a different order than transmitted by said sending device, and said receiving device includes means for substituting a missing block of one of the frames with a block from another of the frames.

32. The system of claim 31, wherein said network includes the internet.

33. The system of claim 23, wherein said sending device is operable to encode a first frame type based on a first transform type and a second frame type based on a second transform type.

34. The system of claim 33, wherein said sending device is operable to encode the video frames of the first type independent of any other of the video frames and the video frames of the second type with reference to content of at least one other of the video frames.

35. The system of claim 33, wherein said sending device is operable to designate at least two of the video frames of the second type between each of the video frames of the first type relative to the sequence of the video frames.

36. The system of claim 33, wherein the first transform type is wavelet based and the second transform type is DCT based.

37. A method, comprising:

receiving a number of transmission packets from a computer network, the computer network being subject to loss of one or more packets;

providing a sequence of video frames based on the transmission packets, the frames each including a number of video blocks, said providing including:

determining two or more video blocks of a common one of the transmission packets are for different frames of the sequence, the two or more video blocks being dependent on one another; and substituting a received video block for one of the frames in place of a missing video block of another of the frames.

38. The method of claim 37, wherein the transmission packets are received at a varying rate, and further comprising skipping one or more of the video frames to provide the sequence at a desired rate.

39. The method of claim 37, wherein said providing includes decoding the frames from at least two different types, a first type corresponding to a wavelet transform-based coding scheme and a second type corresponding to a DCT-based coding scheme.

40. The method of claim 37, wherein the number of the blocks for each of the transmission packets are selected based on a dependency tree.

* * * * *